US011825573B2

(12) United States Patent
Chaturvedi et al.

(10) Patent No.: US 11,825,573 B2
(45) Date of Patent: Nov. 21, 2023

(54) CONFIGURING COLOR CONTROL FOR LIGHTING DEVICES

(71) Applicant: Lutron Technology Company LLC, Coopersburg, PA (US)

(72) Inventors: Prashant Chaturvedi, Allentown, PA (US); Bryan R. Barnes, Lansdale, PA (US); Christopher M. Green, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/745,313

(22) Filed: May 16, 2022

(65) Prior Publication Data

US 2022/0279633 A1    Sep. 1, 2022

Related U.S. Application Data

(63) Continuation of application No. 16/939,027, filed on Jul. 26, 2020, now Pat. No. 11,375,591.
(Continued)

(51) Int. Cl.
*H05B 45/20* (2020.01)
*G06F 3/0481* (2022.01)
(Continued)

(52) U.S. Cl.
CPC .......... *H05B 45/20* (2020.01); *G06F 3/0481* (2013.01); *G06F 3/04842* (2013.01); *G06F 3/04847* (2013.01); *H05B 45/10* (2020.01)

(58) Field of Classification Search
None
See application file for complete search history.

(56) References Cited

U.S. PATENT DOCUMENTS 9,345,103 B1    5/2016 Letourneur
9,655,214 B1    5/2017 Sooch et al.
(Continued)

FOREIGN PATENT DOCUMENTS

EP    3099143 A1    11/2016
EP    3099143 B1    3/2020
(Continued)

OTHER PUBLICATIONS

""""Application Note Atmel AVR2060: BitCloud ZigBee Light Link Quick Start Guide Atmel 8-bit Microcontrollers Features @BULLET BitCloud? ZigBee?", Light Link package overview @BULLET Instructions for getting started with the package @BULLET Description of the Light Link demo application @BULLET Light, bri", XP055187354,, Apr. 29, 2013.
(Continued)

*Primary Examiner* — Anh Q Tran
(74) *Attorney, Agent, or Firm* — Flaster Greenberg P.C.

(57) ABSTRACT

In an auto vibrancy mode, a vibrancy value for a lighting load may be automatically determined based on a selected color setting for the lighting load. The automatically determined vibrancy value may also be configured to emit light from the lighting load at or above a target CRI value for the selected color setting. The selected color setting may be a CCT value on the black-body curve or an x-y chromaticity value. If the selected color setting is CCT value on the black-body curve, the automatically determined vibrancy value may be a pre-defined vibrancy value that is configured to emit light from the lighting load at or above the target CRI value for the selected CCT value. If the selected color setting is an x-y chromaticity value, the automatically determined vibrancy value may be based on the distance between the selected x-y chromaticity value and the black-body curve.

30 Claims, 21 Drawing Sheets

Related U.S. Application Data

(60) Provisional application No. 62/879,030, filed on Jul. 26, 2019.

(51) Int. Cl.
  *G06F 3/04847* (2022.01)
  *H05B 45/10* (2020.01)
  *G06F 3/04842* (2022.01)

(56) References Cited

U.S. PATENT DOCUMENTS

| | | | |
|---|---|---|---|
| 9,980,346 B2 | 5/2018 | Hidaka et al. | |
| 10,140,732 B2* | 11/2018 | Maksymczuk | G06T 11/001 |
| 10,240,732 B1 | 3/2019 | Ganick et al. | |
| 10,268,354 B2 | 4/2019 | Kim et al. | |
| 10,356,883 B2 | 7/2019 | Ueno et al. | |
| 10,448,486 B2 | 10/2019 | Baek et al. | |
| 2004/0124338 A1 | 7/2004 | Cloutier et al. | |
| 2005/0116667 A1 | 6/2005 | Mueller et al. | |
| 2005/0174473 A1 | 8/2005 | Morgan et al. | |
| 2011/0084614 A1 | 4/2011 | Sheldon et al. | |
| 2011/0248835 A1 | 10/2011 | Speegle et al. | |
| 2011/0273107 A1 | 11/2011 | Hsia et al. | |
| 2012/0320262 A1 | 12/2012 | Chung | |
| 2013/0271004 A1 | 10/2013 | Jeon et al. | |
| 2014/0070706 A1* | 3/2014 | Fushimi | H05B 47/10 315/131 |
| 2014/0070707 A1 | 3/2014 | Nagazoe | |
| 2014/0132180 A1 | 5/2014 | Ukai | |
| 2015/0189723 A1 | 7/2015 | Ogawa | |
| 2015/0198938 A1 | 7/2015 | Steele et al. | |
| 2015/0201480 A1 | 7/2015 | Ogawa | |
| 2016/0026371 A1 | 1/2016 | Lu et al. | |
| 2016/0150616 A1 | 5/2016 | Bell et al. | |
| 2016/0151117 A1 | 6/2016 | Gibbs et al. | |
| 2016/0357430 A1 | 12/2016 | Migos et al. | |
| 2017/0228110 A1 | 8/2017 | Arora et al. | |
| 2017/0235470 A1 | 8/2017 | Baluja et al. | |
| 2017/0245340 A1 | 8/2017 | Chen et al. | |
| 2018/0077770 A1 | 3/2018 | Sooch et al. | |
| 2018/0160502 A1 | 6/2018 | Casey et al. | |
| 2018/0314412 A1 | 11/2018 | Nakauchi et al. | |
| 2018/0364665 A1 | 12/2018 | Clymer et al. | |
| 2019/0014638 A1 | 1/2019 | Weaver et al. | |
| 2019/0034043 A1 | 1/2019 | Zolotykh et al. | |
| 2019/0086046 A1* | 3/2019 | Ganick | F21S 8/046 |
| 2019/0208599 A1 | 7/2019 | Darton et al. | |
| 2019/0254142 A1 | 8/2019 | Petluri et al. | |
| 2020/0026420 A1 | 1/2020 | Sicard | |

FOREIGN PATENT DOCUMENTS

| | | |
|---|---|---|
| KR | 20170099048 A | 8/2017 |
| WO | 2007033667 A1 | 3/2007 |
| WO | 2012131544 A1 | 10/2012 |

OTHER PUBLICATIONS

"Lutron Q-Control+ on the App Store (apple.com)", retrieved from the internet: https://apps.apple.com/us/app/lutron-q-control/id575728994, 3 pages.

Callahan, Kerri, et al., "Museum Lighting Symposium & Workshops", Retrieved from the Internet: URL:https://discovery.ucl.ac.uk/10048078//1/book-of-abstracts2.pdf; retrieved on Oct. 19, 2020, Sep. 12, 2017, pp. 67-69.

Deng-Feng , et al., "Design of intelligent lighting control system", 2011 IEEE International Conference on Cyber Technology in Automation, Control, and Intelligent Systems, 2011, doi: 10.1109/CYBER.2011.6011779., accessed Dec. 13, 2021) (Year: 2011), 2011, pp. 134-137.

Ren, Hui, et al., Study on LED Color Mixing for Stage Lighting Based on Locus Fitting of Blackbody, IEEE 3rd International Conference on Cloud Computing and Internet of Things (CCIOT), 2018, accessed Dec. 12, 2021). Year: 2018), 2018, 5 pages.

\* cited by examiner

CONFIGURING COLOR CONTROL FOR LIGHTING DEVICES

CROSS REFERENCE TO RELATED APPLICATIONS

This application is a continuation of U.S. Non-Provisional patent application Ser. No. 16/939,027, filed Jul. 26, 2020, which claims priority from U.S. Provisional Patent Application No. 62/879,030, filed Jul. 26, 2019, both of which are hereby incorporated by reference in their entirety.

BACKGROUND

A user environment, such as a residence, an office building, or a hotel for example, may be configured to include various types of load control systems. For example, a lighting control system may be used to control the lighting loads in the user environment. A motorized window treatment control system may be used to control the natural light provided to the user environment. A heating, ventilating, and air conditioning (HVAC) system may be used to control the temperature in the user environment.

A user of the load control system may configure the load control system to perform as intended. However, as a single load control system may include various types of load control systems (e.g., lighting control system, motorized window treatment system, HVAC system, etc.), the user may have numerous setting to configure for the load control system to perform as intended. Accordingly, the user may interact with a graphical user interface to accurately and efficiently configure the load control system.

SUMMARY

The vibrancy settings of a lighting load may be configured by a user. For example, a lighting load may be set to one of an auto vibrancy mode where a vibrancy value for the lighting load may be automatically determined, or an adjustable vibrancy mode where a user may select an adjustable vibrancy value for the lighting load. When the auto vibrancy mode is selected, the automatically determined vibrancy value may be based on the selected color setting, and may be configured to emit light from the lighting load at or above a target color rendering index (CRI) value for the selected color setting. For example, the automatically determined vibrancy value may be based on the distance between the selected color setting and the black-body curve.

The selected color setting may be a correlated color temperature (CCT) value on the black-body curve or an x-y chromaticity value. If the selected color setting is CCT value on the black-body curve, the automatically determined vibrancy value may be a pre-defined vibrancy value that is configured to emit light from the lighting load at or above the target CRI value for the selected CCT value. Further, the automatically determined vibrancy value may increase as the selected CCT value increases. If, however, the selected color setting is an x-y chromaticity value, a distance between the select x-y chromaticity value and the black-body curve may be determined. If the distance between the selected x-y chromaticity value and the black-body curve is less than a distance threshold, the selected x-y chromaticity value may have an equivalent CCT value, and the automatically determined vibrancy value may be the pre-defined vibrancy value that is configured to emit light from the lighting load at or above the target CRI value for the equivalent CCT value. If, on the other hand, the distance between the selected x-y chromaticity value and the black-body curve is greater than the distance threshold, the automatically determined vibrancy value may be a pre-defined vibrancy value.

The lighting load may also or alternatively be configured in an adjustable vibrancy mode. When the adjustable vibrancy mode is enabled, the user may select a vibrancy value at which to control the light load. For example, the user may select the adjustable vibrancy value from a range of vibrancy values (e.g., 0 to 100). Increasing the vibrancy value may decrease the contribution of at least one the plurality of LEDs within the lighting load (e.g., a white or substantially white LED within the lighting load). Similarly, decreasing the adjustable vibrancy value may increase the contribution of at least one of the plurality of LEDs.

As an example, a network device may include a display screen, a communications circuit, and at least one processor. The network device may further include at least one tangible memory device communicatively coupled to the at least one processor. The at least one tangible memory device may have software instructions stored thereon that when executed by the at least one processor may direct the at least one processor to receive via the communications circuit from a communications network information communicated by a controller.

The network device may be configured to define and/or control the vibrancy settings for a lighting load. The network device may be configured to display one or more graphical user interfaces that a user of the network device may interact with to define and/or update the vibrancy settings. For example, the graphical user interface displayed by the network device may include a palette for identifying a color setting for controlling the lighting load. The palette may be configured to display different coordinated color temperature (CCT) values at which the plurality of LEDs of the lighting load are capable of being controlled. The palette may also or alternatively be configured to display a color gamut of colors at which the plurality of LEDs of the lighting load are capable of being controlled.

The graphical user interface may also include a vibrancy control interface for identify the vibrancy settings of the lighting load. For example, the graphical user interface may include an actuator to indicate whether auto vibrancy mode is enabled. When the auto vibrancy mode is selected, a vibrancy value may be automatically determined vibrancy value based on the color setting selected via the palette. Further, as described herein, the automatically determined vibrancy value may be configured to emit light from the lighting load at or above a target CRI value for the selected color setting.

The graphical user interface may include an actuator to indicate whether the adjustable vibrancy mode is enabled. When the adjustable vibrancy mode is enabled, the graphical user interface may include a vibrancy control line for identifying a selection of the adjustable vibrancy value at which to control the light load. For example, the user may, using the vibrancy control line, select the adjustable vibrancy value from a range of vibrancy values (e.g., 0 to 100). Increasing the adjustable vibrancy value using the vibrancy control line may decrease the contribution of at least one the plurality of LEDs within the lighting load (e.g., a white or substantially white LED within the lighting load). Similarly, decreasing the adjustable vibrancy value using the vibrancy control line may increase the contribution of at least one of the plurality of LEDs.

DETAILED DESCRIPTION

Figure 1A:
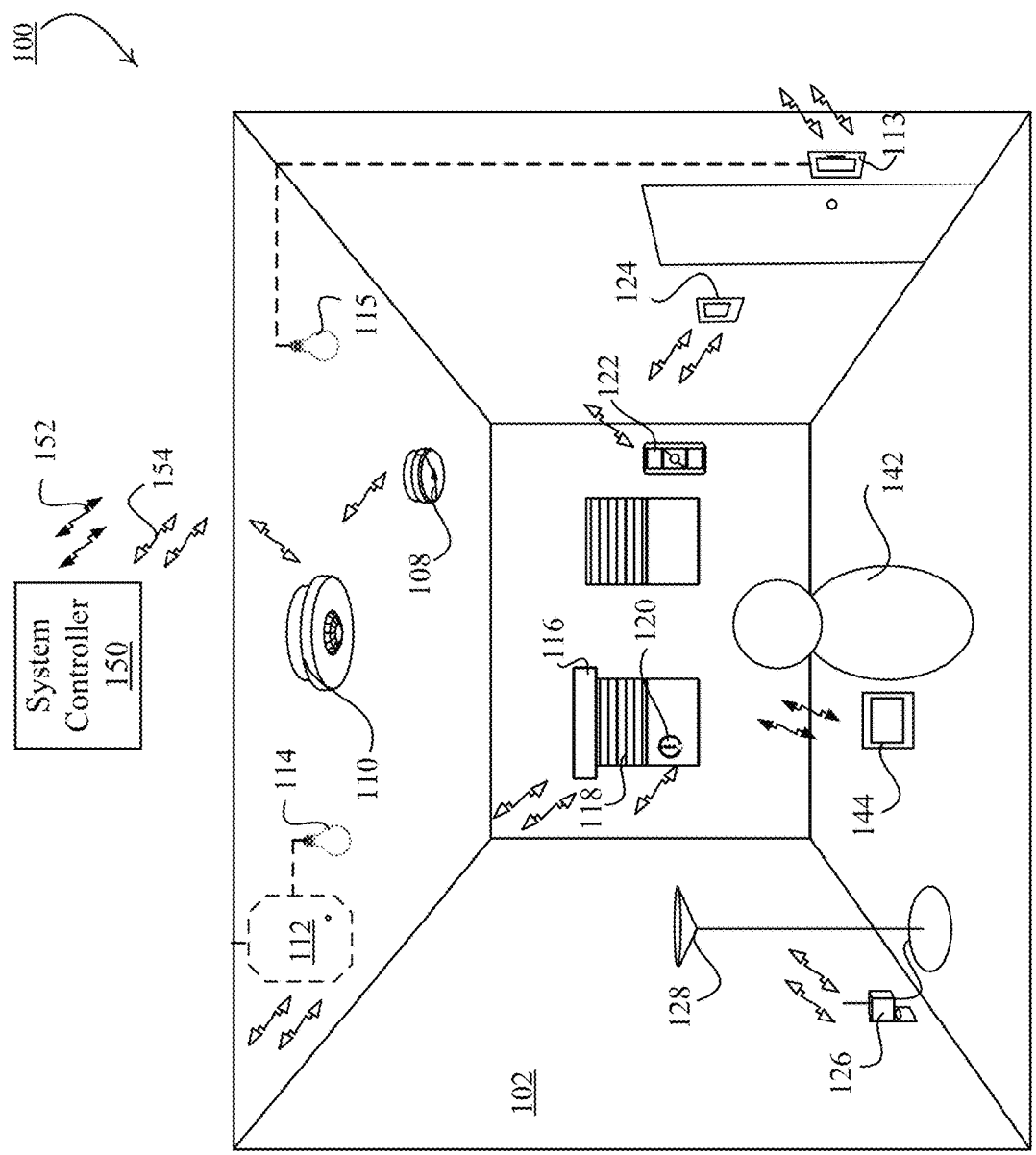
FIG. 1A is a system diagram that illustrates an example load control system that includes control-devices.

FIG. 1A shows a high-level diagram of an example load control system 100. Load control system 100 may include a system controller 150 and load control devices for controlling (e.g., directly and/or indirectly) one or more electrical loads in a user environment 102 (also referred to herein as a load control environment). Example user environments/load control environments 102 may include one or more rooms of a home, one or more floors of a building, one or more rooms of a hotel, etc. As an example, load control system 100 may enable the automated control of lighting systems, shades, and heating, ventilating, and air conditioning (HVAC) systems in the user environment, among other electrical loads.

The load control devices of load control system 100 may include a system controller 150, control-source devices (e.g., elements 108, 110, 120, and 122 discussed herein), and control-target devices (e.g., elements 112, 113, 116, 124, and 126 discussed herein) (control-source devices and control-target devices may be individually and/or collectively referred to herein as load control devices and/or control devices). The system controller 150, the control-source devices, and the control-target devices may be configured to communicate (transmit and/or receive) messages, such as digital messages (although other types of messages may be communicated), between one another using wireless signals 154 (e.g., radio-frequency (RF) signals), although wired communications may also be used. "Digital" messages will be used herein for discussion purposes only.

The control-source devices may include, for example, input devices that are configured to detect conditions within the user environment 102 (e.g., user inputs via switches or keypads, occupancy/vacancy conditions, changes in measured light intensities, and/or other input information) and in response to the detected conditions, transmit digital messages to control-target devices that are configured to control electrical loads in response to instructions or commands received in the digital messages. The control-target devices may include, for example, load control devices that are configured to receive digital messages from the control-source devices and/or the system controller 150 and to control respective electrical loads in response to the received digital messages. A single control device of the load control system 100 may operate as both a control-source device and a control-target device.

According to one example, the system controller 150 may be configured to receive the digital messages transmitted by the control-source devices, to interpret these messages based on system configuration data of the load control system, and to then transmit digital messages to the control-target devices for the control-target devices to then control respective electrical loads. In other words, the control-source devices and the control-target devices may communicate via the system controller 150. According to another and/or additional example, the control-source devices may directly communicate with the control-target devices without the assistance of the system controller 150. The system controller may still monitor such communications. According to a further and/or additional example, the system controller 150 may originate and then communicate digital messages with control-source devices and/or control-target devices. Such communications by the system controller 150 may include programming/system configuration data (e.g., settings) for the control devices, such as configuring scene buttons on light switches. Communications from the system controller 150 may also include, for example, messages directed to control-target devices and that contain instructions or commands for the control-target devices to control respective electrical loads in response to the received messages. For example, the system controller 150 may communicate messages to change light levels, to change shade levels, to change HVAC settings, etc. These are examples and other examples are possible.

Communications between the system controller 150, the control-source devices, and the control-target devices may be via a wired and/or wireless communications network as indicated above. One example of a wireless communications network may be a wireless LAN where the system controller, control-source devices, and the control-target devices may communicate via a router, for example, that is local to the user environment 102. For example, such a network may be a standard Wi-Fi network. Another example of a wireless communications network may be a point-to-point communications network where the system controller, control-source devices, and the control-target devices communicate directly with one another using, for example, Bluetooth, Wi-Fi Direct, a proprietary communication channel, such as CLEAR CONNECT™, Thread, ZigBee, etc. to directly communicate. Other network configurations may be used such as the system controller acting as an access point and providing one or more wireless/wired based networks through which the system controller, the control-source devices, and the control-target devices may communicate.

For a control-target device to be responsive to messages from a control-source device, the control-source device may first be associated with the control-target device. As one example of an association procedure, a control-source device may be associated with a control-target device by a user 142 actuating a button on the control-source device and/or the control-target device. The actuation of the button on the control-source device and/or the control-target device may place the control-source device and/or the control-target device in an association mode for being associated with one another. In the association mode, the control-source device may transmit an association message(s) to the control-target device (directly or through the system controller). The association message from the control-source device may include a unique identifier of the control-source device. The control-target device may locally store the unique identifier of the control-source, such that the control-target device may be capable of recognizing digital messages (e.g., subsequent digital messages) from the control-source device that may include load control instructions or commands. The control-target device may be configured to respond to the digital messages from the associated control-source device by controlling a corresponding electrical load according to the load control instructions received in the digital messages. This is merely one example of how control devices may communicate and be associated with one another and other examples are possible. According to another example, the system controller 150 may receive system configuration data (e.g., or subsequent updates to the system configuration data) from a user that specify which control-source devices should control which control-target devices. Thereafter, the system controller may communicate this system configuration data to the control-source devices and/or control-target devices.

As one example of a control-target device, load control system 100 may include one or more lighting control devices, such as the lighting control devices 112 and 113. The lighting control device 112 may be a dimmer, an electronic switch, a ballast, a light emitting diode (LED) driver(s), and/or the like. The lighting control device 112 may be configured to directly control an amount of power provided to a lighting load(s), such as lighting load 114. The lighting control device 112 may be configured to wirelessly receive digital messages via signals 154 (e.g., messages originating from a control-source device and/or the system controller 150), and to control the lighting load 114 in response to the received digital messages. One will recognize that lighting control device 112 and lighting load 114 may be integral and thus part of the same fixture or bulb, for example, or may be separate.

The lighting control device 113 may be a wall-mounted dimmer, a wall-mounted switch, or other keypad device for controlling a lighting load(s), such as lighting load 115. The lighting control device 113 may be adapted to be mounted in a standard electrical wall box. The lighting control device 113 may include one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the receptive lighting load from a minimum intensity (e.g., approximately 1%) to a maximum intensity (e.g., approximately 100%). The lighting control device 113 may include a plurality (two or more) of visual indicators, e.g., light-emitting diodes (LEDs), which may be arranged in a linear array and that may illuminate to provide feedback of the intensity of the lighting load 115.

The lighting control device 113 may be configured to wirelessly receive digital messages via wireless signals 154 (e.g., messages originating from a control-source device and/or the system controller 150). The lighting control device 113 may be configured to control the lighting load 115 in response to the received digital messages.

As described herein, a lighting control device, such as the lighting control device 113 or 112 may control a lighting load (e.g., or a plurality of lighting loads), such as the lighting load 114 or 115, where the lighting load may include a plurality of multi-colored light emitting diodes (LEDs). In other words, the lighting load may include within a single package, for example, a number of differently colored emission LEDs and may be configured such that the chromaticity output of the LEDs is mixed to produce light having varying chromaticity coordinates (e.g., color points) within a color gamut formed by the various LEDs that make up the lighting load (e.g., a total light output from a lighting load that is made up of a plurality of LEDs). The CRI value may be a measurement of the white light emitted by the total light output. The contribution or intensity of each of the differently colored LEDs in emitting light may affect the CRI of the emitted light. As described herein, the CRI value of the light emitted from a given LED or the lighting load comprising a plurality of LEDs may be a quantitative measurement of the emitted light's ability to reveal the colors of various objects faithfully in comparison with an ideal or natural light source. Further, the CRI value of emitted light may be based on the spectrum emitted by the light. In some examples, the highest CRI value may be 100, which may indicate that the emitted light is identical (e.g., or substantially identical) to daylight (e.g., the combination of direct and indirect sunlight during the day). In certain instances, as further described herein, a lighting load may be configured to emit light that achieves a CRI value is that at or above a target CRI value.

As one example, a lighting load may include one or more red LEDs, one or more green LEDs, one or more blue LEDs, and one or more white, or substantially white LEDs (e.g., such as yellow and/or mint green LED(s)) (which may be collectively referred to herein as a RGBW lighting load). Although the RGBW lighting load is described herein with a combination of four LEDs of certain colors, other combinations of LEDs (e.g., more or less LEDs and/or different color LEDs) may be used.

The lighting control device may adjust various settings of the lighting load(s) to adjust the light emitted from the lighting load. The adjustments may be made in response to system configuration data. The system configuration data may include control/configuration information comprising lighting control parameters (e.g., lighting intensity settings, color settings, vibrancy setting, etc.) for controlling the lighting loads at the lighting control devices. For example, the lighting control device may adjust the lighting intensity settings (i.e., brightness), the color settings (e.g., CCT value or full color value), vibrancy settings, CRI, etc., which are further described herein. The lighting control devices may receive lighting control parameters in the control/configuration information and control the corresponding lighting load in response to the lighting control parameters, for example, by generating control instructions based on the lighting control parameters and transmitting the control instructions to the corresponding load. In certain example, the lighting control device for controlling a respective lighting load may be self-contained within the lighting load (e.g., the lighting control device and lighting load exist within the same package, such as the lighting control device/lighting load 112/114). When the lighting control device and corresponding lighting load are self-contained, the self-contained lighting control device (e.g., lighting control device/lighting load 112/114) may itself receive the lighting control parameters, generate control instructions, and control the lighting load.

The lighting control parameters may also, or alternatively, be associated with a certain triggering event (e.g., a button press) and respectively stored/maintained by the lighting control device. Then, when the lighting control device receives an indication of a certain triggering event (e.g., an indication of a button press), the lighting control device may retrieve or otherwise determine (e.g., by querying another device that stores/maintains the lighting control parameters) the lighting control parameters associated with that triggering event, and generate control instructions based on the lighting control parameters and transmitting the control instructions to the corresponding load. Also, or alternatively, when the lighting control device and corresponding lighting load are self-contained, the self-contained lighting control device (e.g., lighting control device/lighting load 112/114) may itself receive the lighting control parameters, generate control instructions, and control the lighting load.

For example, the lighting control parameters may include a color setting (e.g., x-y chromaticity or CCT values), a lighting intensity settings, and/or a vibrancy settings (e.g., vibrancy mode and/or vibrancy value).

The light emitted from the lighting load(s) may result in a different CRI value when different color settings, lighting intensities settings, and/or a vibrancy setting are selected. As further described herein, changes to the vibrancy settings may adjust the contribution of one or more LEDs within a lighting load (e.g., adjust the contribution/intensity ratio of the one or more LEDs), while maintaining the selected color settings and lighting intensity setting. Further, the lighting control device may adjust the lighting control parameters of lighting load(s) over time (e.g., referred to herein as natural show or natural lighting functionality). For example, the lighting control devices may adjust the lighting control parameters of the lighting load(s) over time to emulate a sunrise and/or sunset, which, as described herein, may be based on the local time of sunrise and/or sunset for the load control system/user environment.

A lighting control device and corresponding lighting load may be configured to produce a range of colors on a color gamut. The lighting control device may produce a given color on the color gamut in response to the color setting and/or lighting intensity settings received in the control/configuration information. The color settings to which a lighting control device may control a corresponding lighting load may depend on the LEDs that make up the lighting load. For example, the lighting control device and the respective lighting load may be configured to produce white or near-white light of varying brightness/intensities within a range of correlated color temperatures (CCTs) on the black-body curve ranging from "warm white" (e.g., roughly 2600 K-3000 K), to "neutral white" (e.g., 3000K-5000 K) to "cool white" (e.g., 5000 K-8300 K), for example (i.e., produce light of varying chromaticity coordinates that lie along the black-body locus or curve). The white or near-white light may be produced by the lighting control device in response to the color setting being a CCT value, or in response to an x-y coordinate value on the color gamut. In certain situations (e.g., as further described herein with respect to FIGS. 1B and 1C) a given x-y coordinate value on the color gamut may also equate to a corresponding CCT value, for example, when the given x-y coordinate value on the color gamut is close to or located on the black-body curve. As a further example, such a lighting control device and its respective lighting load may be further configured to produce any of a plurality of colors of varying brightness/intensities within the color gamut formed by the various LEDs that make up the lighting load in response to the color setting and/or lighting intensity setting received in the control/configuration information.

"Vibrancy," as described herein, may be referred to as the ability to tune the individual colors that make light at a given color (e.g., x-y chromaticity value or a CCT value). When vibrancy is adjusted, the color of the light emitted by the lighting load may remain unchanged. Adjusting vibrancy may, however, adjust the light reflected off of objects in the space. Adjusting the vibrancy may further affect the CRI value of the light emitted by a lighting load. The effect that adjusting vibrancy has on the CRI value of the light emitted by a lighting load may, however, be based on the color (e.g., x-y chromaticity value or a CCT value) of the emitted light. For example, as the color of the emitted light diverges from the black-body curve, the ability to increase the CRI value of the emitted light may decrease.

In addition, adjusting vibrancy may adjust spectral power distribution (SPD) of the light emitted by the lighting load. For example, as vibrancy increases, an SPD curve of the emitted light (e.g., relative intensity vs wavelength) may change (e.g., the contributions of the non-white colors may increase) and/or may result in individual colors on the objects to appear more vibrant when the light reflects off of them. As described herein, increasing the vibrancy of a lighting load may decrease the contribution or intensity of a white or substantially white LED within the lighting load, while increasing the contribution or intensity of the remaining LEDs within the lighting load (e.g., red, green, and blue LEDs). Taking, for example, an RGBW lighting load, increasing the vibrancy of the RGBW lighting load may decrease the contribution/intensity of the white LED and increase the contribution of the red, green, and blue LEDs, while maintaining a given color setting within the color gamut. That is, increasing vibrancy increases the contribution/intensity of red, blue, and green light in emitting light at a given color, which, in turn allows an increased amount of red, blue, and green light to be reflected off of objects in a space, causing the objects to be more vibrant. The vibrancy may be increased or decreased, while maintaining the color and/or intensity being emitted by the lighting load. In general, increasing the vibrancy of a RGBW lighting load may increase the intensity of one or more wavelengths produced by the red, green, and/or blue LEDs, for example, thereby causing certain objects within a space to look more "vibrant."

The ability to adjust the vibrancy of a lighting load may be related to the individual LEDs that are comprised within the lighting load. As described herein, for example, the chromaticity output of each of these individual LEDs within a lighting load may be mixed to produce light having varying chromaticity coordinates (e.g., color points) within the color gamut formed by the plurality of LEDs. Further, the number and/or color of the LEDs included within a lighting load may determine how (e.g., the number of ways that) the lighting load can be controlled to emit light at a certain color (e.g., full color or CCT). That is, depending on the number and/or color of the LEDs within a light load, there may be multiple solutions for (e.g., multiple combinations of) the individual chromaticity contributions of each of the LEDs within the lighting load to emit light at a given chromaticity coordinate. Since, as described herein, the vibrancy may be adjusted for a lighting load while maintaining the color of the emitted light by changing the SPD of the emitted light (e.g., how the light reflects off of objects in the space), the vibrancy of a lighting load may be adjusted using a number of different solutions (e.g., combinations of intensities of different LEDs in the lighting load), while emitting light at a given color setting. The effect that adjusting vibrancy has on a lighting load may increase as the number of solutions available for a lighting load (e.g., combinations of intensities of different LEDs in the lighting load) to emit light at a given color increases. The number of solutions available for the lighting load (e.g., combinations of intensities of different LEDs in the lighting load) to emit light at a given color may be a result of the number and/or color of the LEDs included within the lighting load.

According to an example, a lighting control device and its respective lighting load may be configured to one of two vibrancy modes, including an auto vibrancy mode (e.g., a vibrancy value at which to control the lighting load is automatically determined based on the selected color settings, as described herein), and/or an adjustable vibrancy mode (e.g., the user may select an adjustable vibrancy level from a range of vibrancy values). The selection of the various vibrancy modes may be included in the configuration/control information received by the lighting control device. The lighting control device may emit light at a mixed color output based on the color setting and/or lighting intensity setting received in the configuration/control information. The chromaticity coordinates of the mixed color output of the lighting load may be the same (or approximately the same) across various vibrancy values. However, the intensities and/or contributions of the various LEDs that make up a lighting load may be varied between various vibrancy values to maintain the selected color setting.

Taking, for example, an RGBW lighting load, as the color setting approaches white light or color values on or near (e.g., within a predefined distance that equates to a color temperature value on) the black-body curve, the lighting device may have a larger range (e.g., or number of solutions) of LED combinations (e.g., color and/or intensity combinations) available for emitting light at the selected color setting. When the adjustable vibrancy or the auto vibrancy modes are enabled, the intensity of the white LED(s) for example, may be reduced (such as to 0%, for example) as compared to when the vibrancy value is set to 0, with the intensities of the remaining red, green, and/or blue LEDs adjusted to maintain the same color setting (or approximately the same). As a result, the effect that configuring or controlling the vibrancy of a lighting load to different vibrancy values has on the light emitted by the lighting load may increase as the selected color setting approaches white light or color values on or near the black-body curve. For example, the effect that changes in vibrancy has on the CRI value of the light emitted by the lighting load may decrease as the distance between the selected color setting and the black-body curve increases. As such, as the distance of the color from the black body curve increases, changes in the vibrancy value may have less of an effect or fail to change the CRI value, and may fail by enough to reach or come close to the target CRI value that is set for colors that are on or near the black body curve. In addition, as the distance of the color from the black body curve increases, the relevancy of the CRI value of the emitted light may decrease (e.g., as the CRI value of the light is more relevant when the light is white or near white light, such as light that is near the black-body curve.

It should, however, be recognized that controlling the vibrancy of a given lighting load depends on the lighting load itself (e.g., the individual LEDs within the lighting load). That is, the effect that changes in the vibrancy has on the CRI of the light emitted by the lighting load depends on the individual LEDs within the lighting load (e.g., the color, intensity, etc. of the individual LEDs within the lighting load). Changes in the vibrancy value may have a greater effect on the CRI of the light emitted by the lighting load as the selected color nears the black body curve. Similarly, changes in the vibrancy value may have less of an effect on the CRI of the light emitted by the lighting load as the selected color is further from the black body curve. Though the range of vibrancy values available at a given color may vary as colors are selected on the color gamut, the target CRI value that is set for being achieved at or within a predefined distance of the black body curve may be unable to be achieved at colors that are selected outside of the predefined distance of the black body curve.

Again, according to one example, the difference between given vibrancy values may be the intensity setting of the white LED(s)/the amount the white LED(s) (e.g., or other LEDs) contribute to the mixed color output of the lighting load, with the white LED(s) contributing less when the vibrancy value is higher. Similarly, the white LED(s) may contribute more when the vibrancy value is lower. Other examples are also possible. An example of such a lighting control device and respective lighting load is described as an illumination device, as described in U.S. Patent Application Publication Number 2018/0077770, the contents of which are hereby incorporated by reference in their entirety. One will recognize that other examples lighting control device and respective lighting loads are possible.

As described herein, the light output of a lighting load and/or the light output of the individual LEDs within the lighting load may be measured by a CRI value. The CRI value may be a measurement of the lighting load's ability to reveal the actual color of objects as compared to an ideal light source (e.g., a natural light source, such as the sun). A higher CRI value may be a desirable characteristic of a user. For example, a lighting load with a higher CRI value may provide light such that the objects within a space reflect light at a natural color. A lighting load itself may be defined by a CRI value. CRI values may be in the range of 0 to 100, inclusively. For example, the lowest CRI value may be 0 and the highest CRI value may be 100.

The CRI value for a given color may change in response to changes in the vibrancy value used to control the lighting control device. For example, the lighting control device may control a respective lighting load to a color setting and/or intensity level that is received in control/configuration information. As described herein, a given color setting and/or lighting intensity setting may have a corresponding vibrancy value to which the lighting control device may be controlled when the auto vibrancy mode is enabled. In response to changes in the vibrancy value for a given color setting, the light emitted from the lighting load may have a different corresponding CRI value. As a result, when the auto vibrancy mode is enabled a vibrancy value may be automatically determined (e.g., by a control/configuration application) to emit light from the lighting load at a CRI value that is at or above a target CRI value for the selected color setting. The effect that the automatically determined vibrancy value has on the CRI value of the light emitted by the lighting load may, however, be based on the selected color setting. For example, the effect that the automatically determined vibrancy value has on the CRI value of the light emitted by the lighting load may increase as the selected color setting approaches the black-body curve. That is, in an auto vibrancy mode, the CRI value of the light emitted from a lighting load may be higher as the selected color setting approaches the black-body curve. Similarly, in an auto vibrancy mode, the CRI value of the light emitted from a lighting load may be lower (e.g., the highest achievable CRI value may be lower) as the selected color setting is further from the black-body curve and/or approaches more saturated colors. Accordingly, as the selected color setting diverges from the black-body curve (e.g., the distance between the selected color setting and the black-body curve increases), the CRI value of the emitted light that results from the automatically determined vibrancy value when the auto vibrancy mode is enabled may decrease. Thus, the target CRI value that is set for when the color setting is on or within a predefined distance of the black body curve may be unable to be achieved at other color settings (e.g., more saturated colors).

In auto vibrancy mode, a control/configuration application, as described herein (e.g., a control/configuration application running on a network device), may be used to automatically determine a vibrancy value to emit light from one or more lighting loads at a CRI value, that is greater than or equal to a target CRI value. A CRI value greater than or equal to a target CRI value (e.g., a CRI value of 90) may be desirable and may be referred to herein as "optimal," "optimized," or "maximized." That said, other ranges (e.g., smaller and/or larger ranges) may also be considered "optimal," "optimized," or "maximized."

When auto vibrancy mode is selected, the lighting load may be configured to an automatically determined vibrancy value so that the lighting load emits light at a CRI value that is greater than or equal to a target CRI value. As the target CRI value may be unable to be achieved for the selected color setting (e.g., due to the selected color setting being too far from the black-body curve), the vibrancy value that results in the highest CRI value toward the target CRI value may be selected. In certain instances, for example, when auto vibrancy mode is selected, the CRI value of a lighting load may be increased to a value greater than or equal to a target CRI value. For example, the target CRI value may be 90. One will appreciate, however, that the target CRI value may be other values. That is, the target CRI value may be a value which may be considered a desirable threshold that a system may attempt to achieve given the certain characteristics of the load control system and/or lighting control devices (e.g., quality, color, and number of the LEDs used in a lighting load). The vibrancy value may be automatically determined to increase the CRI value to a value that is toward the target CRI value. If a greater CRI value is available, the vibrancy value may be increased until a highest available CRI value is obtained for the selected color setting. As described herein, optimizing the CRI value towards or above the target CRI value may be referred to as optimizing the CRI value. This feature may be enabled through the auto vibrancy mode.

As described herein, the vibrancy settings (e.g., vibrancy mode and/or vibrancy values), which, as described herein, may be used to control the CRI of the emitted light, for a lighting load that comprises a plurality of LEDs (e.g., an RGBW lighting load) may be configured via a control/configuration application. For example, the lighting load may be set to an auto vibrancy mode, wherein a vibrancy value may be automatically determined, for example, by the control/configuration application. The lighting load may alternatively be set to an adjustable vibrancy mode, wherein an adjustable vibrancy value for the lighting load is selected by a user.

Referring first to the auto vibrancy mode, the automatically determined vibrancy value may be based on a distance that the selected color setting for the lighting load is from the black-body curve on the color spectrum (e.g., or another predefined range of color values on the color spectrum). For example, as the selected color setting nears white light or the black-body curve, the automatically determined vibrancy value may increase as the selected color approaches white light or the black-body curve (e.g., in an attempt to increase the CRI value of the light being emitted from the lighting load). Further, since certain x-y chromaticity values may be close enough to the black-body curve to have an equivalent CCT value, the distance the selected color setting for a lighting load is from the black-body curve may indicate whether a certain color setting has an equivalent CCT value. Accordingly, if the distance that the selected color setting for the lighting load is from the black-body curve on the color spectrum is less than a distance threshold, the selected color setting may be considered to have an equivalent CCT value on the black-body curve. Further, the automatically determined vibrancy value for the selected color setting with a distance that is less than the distance threshold may be the same as the automatically determined vibrancy value for the equivalent CCT value of the selected color setting.

The effect that changes in vibrancy has on the CRI value of the light emitted by the lighting load may decrease as the distance between the selected color setting and the black-body curve increases. As a result, the automatically determined vibrancy value may be automatically selected to optimize CRI when the color setting is on, or within a predefined distance to have an equivalent value to, the black body curve. As the selected color setting diverges from the black-body curve (e.g., the distance between the selected color setting and the black-body curve increases), however, the effect of the automatically determined vibrancy value on the CRI value of the emitted light may decrease. The automatically determined vibrancy value may result in the emission of light from the lighting load approaching, at, or above the target CRI value when the selected color setting is within a predefined distance from the black-body curve.

It should be appreciated, however, that the effect the automatically determined vibrancy value has on a given lighting load may depend on the individual LEDs that make up the lighting load. That is, an automatically determined vibrancy value that results in the emission of light from the lighting load at or above a target CRI value may depend on the individual LEDs that are within the lighting load. Put differently, an automatically determined vibrancy value that results in the emission of light from a first lighting load at or above a target CRI value may differ from an automatically determined vibrancy value that results in the emission of light from a second lighting load at or above a target CRI value (e.g., based on the individual LEDs within each of the lighting loads). Though the vibrancy value may be different for a different lighting load comprising different LEDs, as the target CRI value may change for optimizing CRI, the vibrancy value may similarly increase as the color temperature value of the color setting increases to optimize CRI.

Figure 1B:
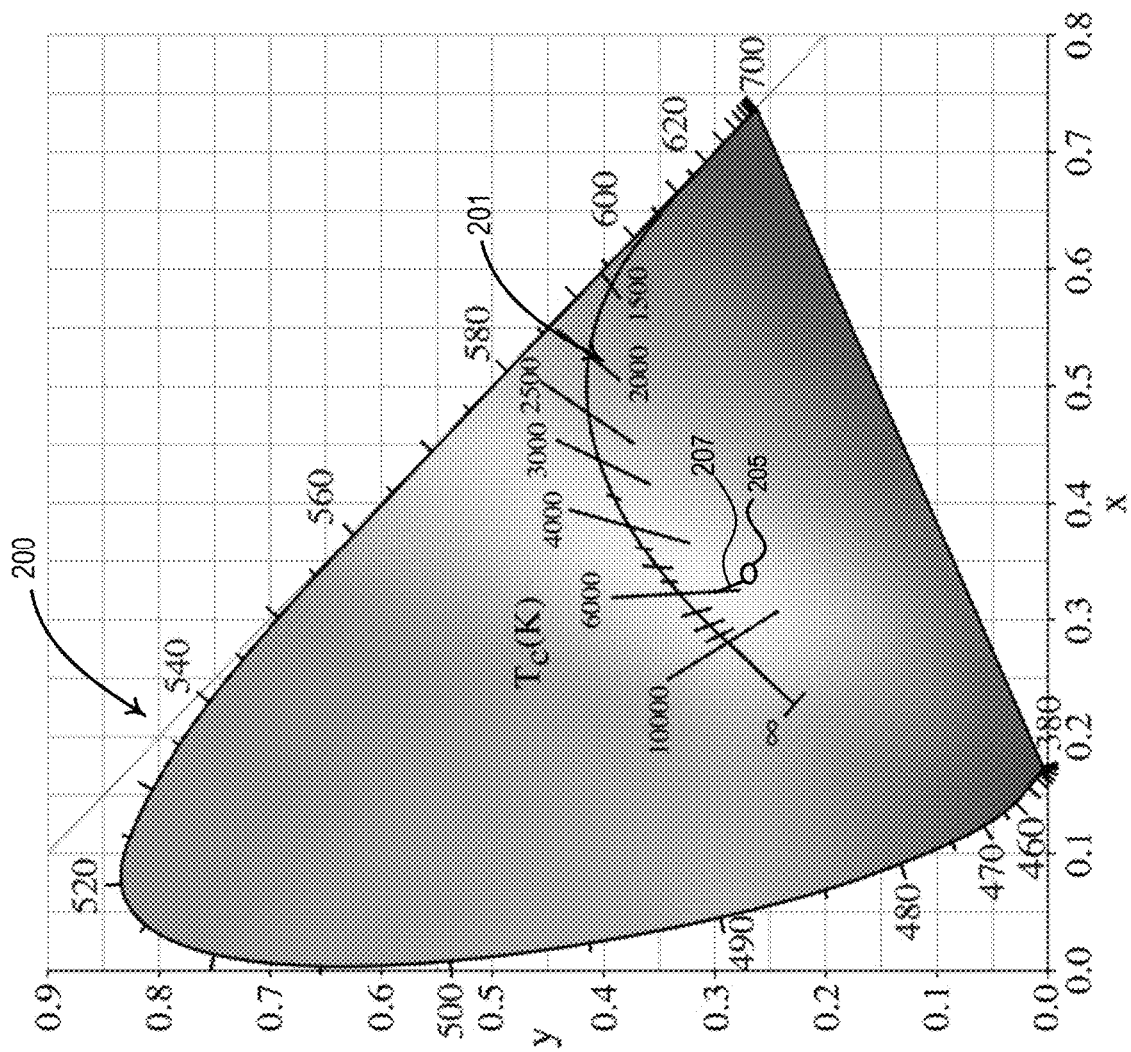
FIGS. 1B and 1C are example illustrations of a color gamut of colors to which a lighting load may be controlled.

FIG. 1B illustrates an example color gamut 200. For example, the color gamut 200 may illustrate the color spectrum of colors that may be formed by the various LEDs that make up a lighting load (e.g., a RGBW lighting) load. The color gamut 200 may further include a black-body curve 201. As described herein, the black-body curve 201 may illustrate the location of white or near-white light of varying brightness/intensities within the color gamut 200. The black-body curve 201 may further be identified by a range of correlated color temperatures (CCTs), ranging from "warm white" (e.g., roughly 2600 K-3000 K), to "neutral white" (e.g., 3000 K-5000 K) to "cool white" (e.g., 5000 K-8300 K), for example. As described herein, adjusting the vibrancy of a lighting load may include adjusting the contribution of a white or substantially white LED included within the lighting load. Therefore, the effect that a given vibrancy value of a lighting load has on the CRI value of the light emitted by the light emitted by the lighting load may increase as the selected color approaches the black-body curve 201 (e.g., which illustrates the location of white or near-white light within the color gamut 200).

As described herein, however, the effect that a vibrancy value has on a given lighting load may depend on the individual LEDs that make up the lighting load. As a result, the effect that the vibrancy value has on the CRI value of the light emitted by the lighting load may also depend on the individual LEDs that make up the lighting load. Therefore, in certain situations (e.g., depending on the individual LEDs that make up a lighting load), the effect of configuring or tuning the vibrancy value of a lighting load may increase as the selected color approaches the output of a white or substantially white LED (e.g., a mint green LED) within the lighting load and/or as the number of differently colored LEDs within the lighting load increases.

Referring back to FIG. 1B, the color setting 205, may be selected as the configured color value for a lighting load. For example, the color setting 205 may be a light yellow color having approximate x-y chromaticity components of (0.35, 0.31). As described herein, when auto vibrancy mode is enabled for a lighting load configured to the color setting 205, a vibrancy level may be automatically determined based on a distance 207 between the selected color setting 205 and the black-body curve 201 (e.g., or another predefined range of color values on the color gamut 201). Further, the automatically determined vibrancy value may result in the emission of light from the lighting load at a CRI value that is at or above the target CRI value. However, as described herein, the effect that the automatically determined vibrancy value of a lighting load has on the CRI value of the light emitted by the lighting load may decrease as the selected color setting diverges from the black-body curve 201.

The distance 207 may indicate whether the color setting 205 has an equivalent CCT value on the black-body curve 201. If, for example, the distance 207 is less than a distance threshold (e.g., indicating that the color setting 205 has an equivalent CCT value), the automatically determined vibrancy value may be the automatically determined vibrancy that results in the emission of light from the lighting load at or above the target CRI value for the equivalent CCT value. When the target CRI value is unable to be reached for the color setting, the vibrancy may be automatically determined such that the CRI value approaches the target CRI, such that the highest CRI value is achieved for the selected color setting. Further, as described herein, the effect that tuning or configuring the vibrancy value of a lighting load has on the light emitted by the lighting load (e.g., the CRI value of the light emitted by the lighting load) may decrease as the distance between the selected color setting 205 and the black-body curve 201 increases. As a result, if, for example, the distance 207 between the selected color setting 205 and the black-body curve 201 is greater than the distance threshold, the automatically determined vibrancy value may be set to a predefined value.

Referring again to FIG. 1B, the effect that tuning or configuring the vibrancy value of a lighting load has on the light emitted by the lighting load (e.g., the CRI value of the light emitted by the lighting load) may peak when the selected color setting is on (e.g., or substantially near) the black-body curve 201. As a result, when auto vibrancy is enabled for a lighting load that is configured to a color setting on (e.g., or substantially near) the black-body curve 201, the automatically determined vibrancy value may correspond to a predefined vibrancy value that maximizes CRI at or above the target CRI value. In addition, the automatically determined vibrancy value may increase (e.g., the contribution/intensity of a white or substantially white LED in an RGBW lighting load decreases) as the selected color setting (e.g., CCT value) increases to achieve a target CRI value.

Table 1, reproduced below, illustrates example vibrancy values that may be automatically determined for certain color settings (e.g., CCT values), for example, when auto vibrancy mode is enabled. As shown in Table 1, the automatically determined vibrancy value may increase as the selected CCT value increases. And, as described herein, the increased vibrancy values may decrease the contribution of at least one of the plurality of LEDs within the lighting load (e.g., the white or substantially white LED). The automatically determined vibrancy value may also be configured to emit light at or above a target CRI value, which, as described herein, may vary based on the selected color settings.

TABLE 1

| CCT Value | Automatically Determined Vibrancy Value | CRI Value |
|---|---|---|
| 2700K | 25 | 92.1 |
| 3000K | 27 | 92.6 |
| 3500K | 29 | 91.8 |
| 4000K | 35 | 91.3 |
| 5000K | 41 | 90.2 |
| 6500K | 44 | 89.7 |

A lighting load may also be set to an adjustable vibrancy mode, which, as described herein, may allow a user to select a given vibrancy value. For example, the adjustable vibrancy value may be selected from a range of vibrancy values (e.g., 0 to 100). As the adjustable vibrancy value increases, the contribution of at least one of the plurality of LEDs in the lighting load (e.g., the white or substantially white LED) may decrease. Accordingly, the effect that configuring or controlling the vibrancy settings (e.g., vibrancy mode and/or vibrancy value) has on the light emitted by the lighting load may decrease as the distance between the selected color setting and the black-body curve increases (e.g., is greater than a distance threshold). Referring again to FIG. 1B, as the selected color diverges from (e.g., the distance between increases) the black-body curve 201, the effect that configuring or controlling the vibrancy settings (e.g., vibrancy mode and/or vibrancy value) has on the light emitted by the lighting load. As a result, as the selected color diverges from (e.g., the distance between increases) the black-body curve 201, the effect that the automatically determined vibrancy value in the auto vibrancy mode has on the light emitted by the lighting load may decrease (e.g., the CRI value of the emitted light may be unable to achieve the target CRI). For example, in certain situations (e.g., when the color setting is substantially far from the black-body curve 201) the vibrancy settings may bet set to default values.

Figure 1C:
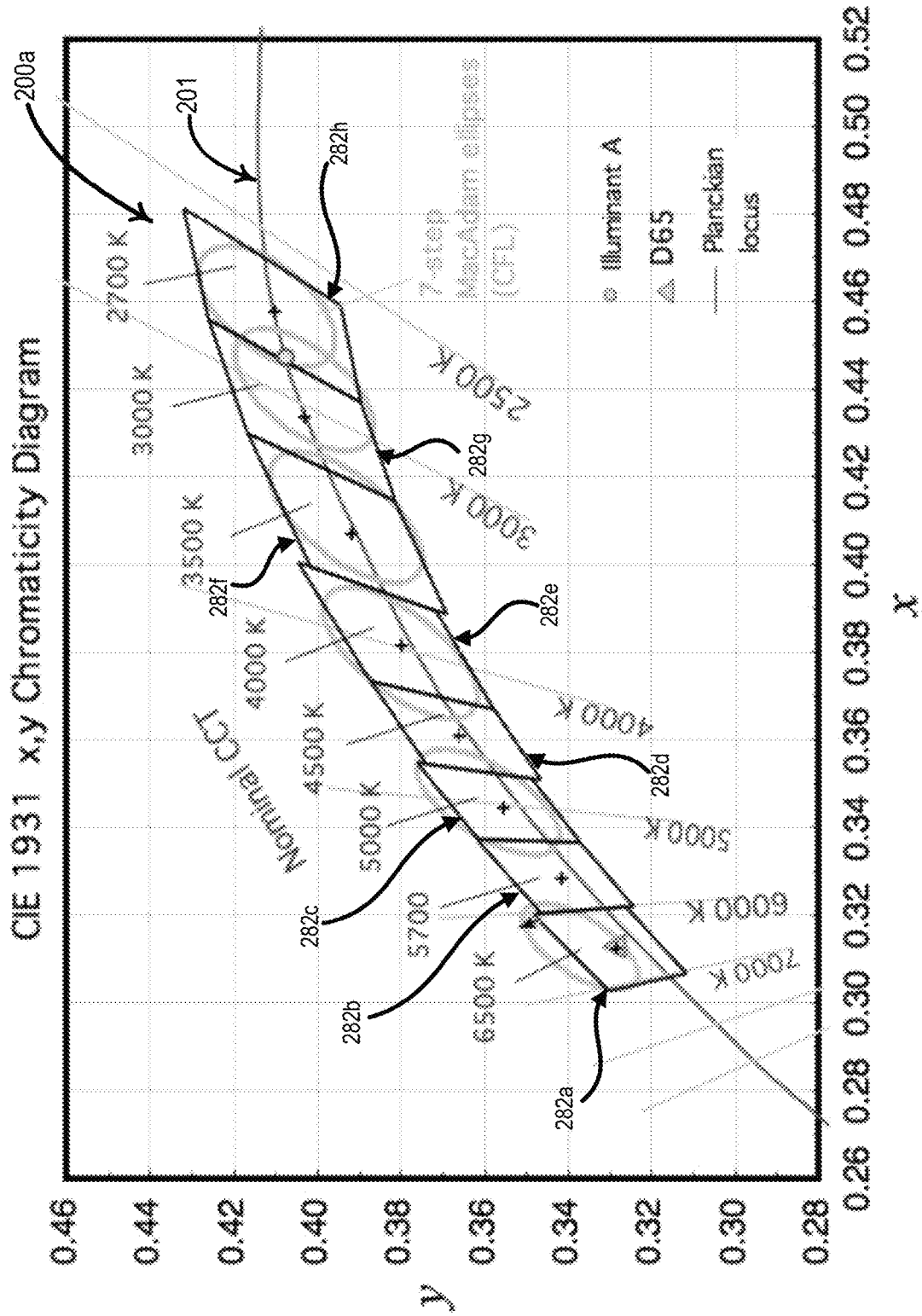

FIG. 1C illustrates another example color gamut 200a. The color gamut 200a may illustrate a subset of the color gamut 200 that focuses on the black-body curve 201. Further, the color gamut 200a may further illustrate the x-y chromaticity values that have equivalent CCT values on the black-body curve 201. Referring back to FIG. 1C, the color gamut 200a may include a plurality of CCT equivalency areas 282a-h. Each of the CCT equivalency areas 282a-h may define the x-y chromaticity values that may have an equivalent CCT value on the black-body curve 201. Put another way, each of the CCT equivalency areas 282a-h may illustrate the distance 207 referenced in FIG. 1B that a given color setting may be from the black-body curve 201 to have an equivalent CCT value on the black-body curve 201.

Each of the CCT value equivalency areas 282*a-h* may indicate the areas (e.g., or quadrangles) of x-y chromaticity values around a specific CCT value on the black-body curve 201 that may be equivalent to that specific CCT value. That is, the x-y chromaticity values that fall within the CCT value equivalency area for a given CCT value may be equivalent to that CCT value. For example, the CCT equivalency area 282*a* may include the x-y chromaticity values that are equivalent to a CCT value of 6500 K, Similarly, the CCT value equivalency area 282*h* may include the x-y chromaticity values that are equivalent to a CCT value 2700 K. Further, as shown in in FIG. 1C, CCT value equivalency areas may increase (e.g., the area of equivalent x-y chromaticity values that surround a given CCT value may increase) as the respective CCT values increase along the black-body curve 201.

A user may configure or control certain values for the settings described herein (e.g., lighting intensity settings, color settings, vibrancy settings, etc.) for one or more lighting loads and save the settings to a defined scene. For example, as described herein, a user may configure or control certain values for the settings saved to a defined scene by interaction with one or more graphical user interfaces that may be displayed by a control/configuration application. The user may configure the scene to control one more lighting loads, for example, by assigning the scene to control a zone that the one more lighting loads are assigned to. The scene may also be associated with a button on a remote control device or keypad, and the scene may be enabled or activated when the button is pressed. When a scene is activated, one or more messages that include one or more parameters for controlling the lighting loads in accordance with the scene may be transmitted.

A user may also configure or control the values for the settings described herein (e.g., lighting intensity settings, color settings, vibrancy settings, etc.) to change over time, which is referred to herein as natural show or natural lighting functionality. For example, the settings of a lighting load may be configured to change over time and emulate sunrise and/or sunset. Similarly, as described in more detail with respect to FIG. 5A, the vibrancy settings (e.g., vibrancy mode and/or vibrancy value) of a lighting load may be configured to change over time, for example, such that the light reflected off of objects in the space appear more vibrant over time. Again, a user may change or update the settings of a natural show or natural lighting functionality, for example, via a network device. For example, as described herein, a control/configuration application of the network device may display one or more graphical user interface, and the user may interact with the graphical user interface to make changes or updates the natural show settings. After being configured, natural show functionality may be assigned to and/or enabled by a scene (e.g., by pressing a button that enables the scene). Also, or alternatively, natural show functionality may be enabled based on a schedule or in response to the detection of an event, such as an occupancy sensor detecting occupancy.

The load control system 100 may include one or more other control-target devices, such as a motorized window treatment 116 for directly controlling the covering material 118 (e.g., via an electrical motor); ceiling fans; a table top or plug-in load control device 126 for directly controlling a floor lamp 128, a desk lamp, and/or other electrical loads that may be plugged into the plug-in load control device 126; and/or a temperature control device 124 (e.g., thermostat) for directly controlling an HVAC system (not shown). The load control system 100 may also, or alternatively, include an audio control device (e.g., a speaker system) and/or a video control device (e.g., a device capable of streaming video content). Again, these devices may be configured to wirelessly receive digital messages via wireless signals 154 (e.g., messages originating from a control-source device and/or the system controller 150). These devices may be configured to control respective electrical loads in response to the received digital messages.

Control-target devices, in addition to being configured to wirelessly receive digital messages via wireless signals and to control respective electrical loads in response to the received digital messages, may also be configured to wirelessly transmit digital messages via wireless signals (e.g., to the system controller 150 and/or an associated control device(s)). A control-target device may communicate such messages to confirm receipt of messages and actions taken, to report status (e.g., light levels), etc. Again, control-target devices may also or alternatively communicate via wired communications.

With respect to control-source devices, the load control system 100 may include one or more remote-control devices 122, one or more occupancy sensors 110, one or more daylight sensors 108, and/or one or more window sensors 120. The control-source devices may wirelessly send or communicate digital messages via wireless signals, such as signals 154, to associated control-target devices (e.g., directly or via the system controller) for controlling an electrical load. The remote-control device 122 may send digital messages for controlling one or more control-target devices after actuation of one or more buttons on the remote-control device 122. For example, the remote control device 122 may be a keypad. One or more buttons on the control device 122 may correspond to a preset scene for controlling the lighting load 115 or 112/114, for example. For example, the buttons on the control device 122 may be pre-configured to correspond to a preset scene for controlling the lighting load 115 or 112/114. The occupancy sensor 110 may send digital messages to control-target devices in response to an occupancy and/or vacancy condition (e.g., movement or lack of movement) that is sensed within its observable area. The daylight sensor 108 may send digital messages to control-target devices in response to the detection of an amount of light within its observable area. The window sensor 120 may send digital messages to control-target devices in response to a measured level of light received from outside of the user environment 102. For example, the window sensor 120 may detect when sunlight is directly shining into the window sensor 120, is reflected onto the window sensor 120, and/or is blocked by external means, such as clouds or a building. The window sensor 120 may send digital messages indicating the measured light level. The load control system 100 may include one or more other control-source devices. Again, one will recognize that control-source devices may also or alternatively communicate via wired communications.

Turning again to the system controller 150, it may facilitate the communication of messages from control-source devices to associated control-target devices and/or monitor such messages as indicated above, thereby knowing when a control-source device detects an event and when a control-target device is changing the status/state of an electrical load. The system controller 150 may communicate programming/system configuration data to the control devices. The system controller 150 may also be the source of control messages to control-target devices, for example, instructing the devices to control corresponding electrical loads. As one example of the later, the system controller 150 may run one or more time-clock operations that automatically communicates messages to control-target devices based on configured schedules (e.g., commands to lighting control device 113 to adjust lighting load 115, commands to lighting control device 112 to adjust lighting load 115, commands to motorized window treatment 116 for directly controlling the covering material 118, etc.) For description purposes, shades will be used herein to describe functions and features related to motorized window treatments. Nonetheless, one will recognize that features and functions described herein are applicable to other types of window coverings such as drapes, curtains, blinds, etc. Other examples are possible.

According to a further aspect of load control system 100, the system controller 150 may be configured to communicate with one or more network devices 144 in use by a user(s) 142, for example. The network device 144 may include a personal computer (PC), a laptop, a tablet, a smart phone, or another electronic computing device (e.g., a cloud computing device). In addition, the network device may be a device local to the load control system 100 (e.g., as illustrated in FIG. 1) or as an external device (e.g., accessed via the cloud). The system controller 150 and the network device 144 may communicate via a wired and/or wireless communications network. The communications network may be the same network used by the system controller 150 and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router local to the user environment 102. As another example, the system controller 150 and the network device 144 may communicate directly with one-another using, for example, Bluetooth, Wi-Fi Direct, etc. Other examples are possible such as the system controller acting as an access point and providing one or more wireless/wired based networks through which the system controller and network device may communicate.

The load control system 100 of FIG. 1A may be configured such that the system controller 150 is capable of communicating with a network device 144 when that device is local to the system controller 150, e.g., for the network device 144 and system controller 150 to directly communicate in a point-to-point fashion or through a local network specific to the user environment 102 (e.g., such as a network provided by a router that is local to the user environment). For example, a user of network device 144 may communicate with the system controller 150 to control the load control system 100 from remote locations, such as via the Internet or other public or private network. Similarly, third-party integrators may also communicate with the system controller 150, for example, in order to provide enhanced services to users of user environment 102. For example, a third-party integrator may provide other systems within user environment 102. It may be beneficial to integrate such systems with load control system 100. Accordingly, the network device 144 may be configured to allow the user 142 to configure or control the load control system 100.

As described herein, the system controller 150 may be configured to communicate with one or more network devices 144 in use by a user(s) 142. The network device 144 may include a personal computer (PC), a laptop, a tablet, a smart phone, or In addition, the network device 144 may be a device local to the load control system 100 (e.g., as illustrated in FIG. 1) or The system controller 150 and the network device 144 may communicate via a wired and/or wireless communications network. The communications network may be the same network used by the system controller 150 and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router local to the user environment 102. As another example, the system controller 150 and the network device 144 may communicate directly with one-another using, for example, Bluetooth, Wi-Fi Direct, etc. Other examples are possible such as the system controller acting as an access point and providing one or more wireless/wired based networks through which the system controller and network device may communicate.

In general, the system controller 150 may be configured to allow a user 142 of the network device 144 to determine, for example, the system configuration data for the user environment 102 and load control system 100, such as rooms in the environment, which control devices are in which rooms (e.g., the location of the control devices within the user environment, such as which rooms), to determine the status and/or control/configuration information of control devices (e.g., lighting intensity settings, color settings, vibrancy settings, HVAC levels, shade levels), to configure the system controller (e.g., to change time clock schedules), to issue commands to the system controller in order to control and/or configure the control devices (e.g., change light levels, change HVAC levels, change shade levels, change presets, etc.), etc. Other examples are possible as described herein.

The network device 144 may include a control/configuration application for generating and/or compiling the intended system configuration data for the user environment 102 and load control system 100, as further described herein. The control/configuration application may be used to generate system configuration data, for example, via the user providing inputs and/or configuration information to the control/configuration application. After generating the system configuration data and/or updating the system configuration data, the network device 144, via the control/configuration application, may transmit the system configuration data (e.g., or any updates) to other devices in the load control system 100 (e.g., the system controller 150, remote-control device 122, control target devices, etc.). Then, in response to a triggering event (e.g., enabling a scene, enabling natural light, a sensor event, etc.), for example, one or more devices may perform control based on the system configuration data.

System configuration data may include information about the devices in a user environment or load control system. For example, system configuration data may include the location of the devices within the load control system or user environment (e.g., a text string that represent a device's location) and/or if the device is assigned to a certain zone. In addition, the system configuration data may include control/configuration information that defines lighting control parameters. For example, the control/configuration information may define the scenes of the load control system, the respective lighting control parameters for each of the defined scenes (e.g., lighting intensity settings, vibrancy settings, color settings, etc.), and/or the buttons that may be pressed to enable each of the defined scenes. The system configuration data may also include control/configuration information for the natural show or natural lighting functionality (e.g., changes in the lighting control parameters over time) defined for the load control system. The system configuration data may include additional information about the devices in the user environment or load control system, and the examples provided herein are not exhaustive. The system configuration data may include any configuration information that may be used to configure or control a user environment or load control system (e.g., one or more of a unique identifiers of a device, a list of associated devices, a zone identifier, a scene identifier, etc.).

The load control system 100 of FIG. 1A may be configured such that the system controller 150 is capable of communicating with a network device 144 when that device is local to the system controller, in other words, for the two to directly communicate in a point-to-point fashion or through a local network specific to the user environment 102 (such as a network provided by a router that is local to the user environment). It may be advantageous to allow a user of network device 144 to communicate with the system controller 150 and to control the load control system 100 from remote locations, such as via the Internet or other public or private network. Similarly, it may be advantageous to allow third-party integrators to communicate with the system controller 150 in order to provide enhanced services to users of user environment 102. For example, a third-party integrator may provide other systems within user environment 102. It may be beneficial to integrate such systems with load control system 100.

Figure 2:
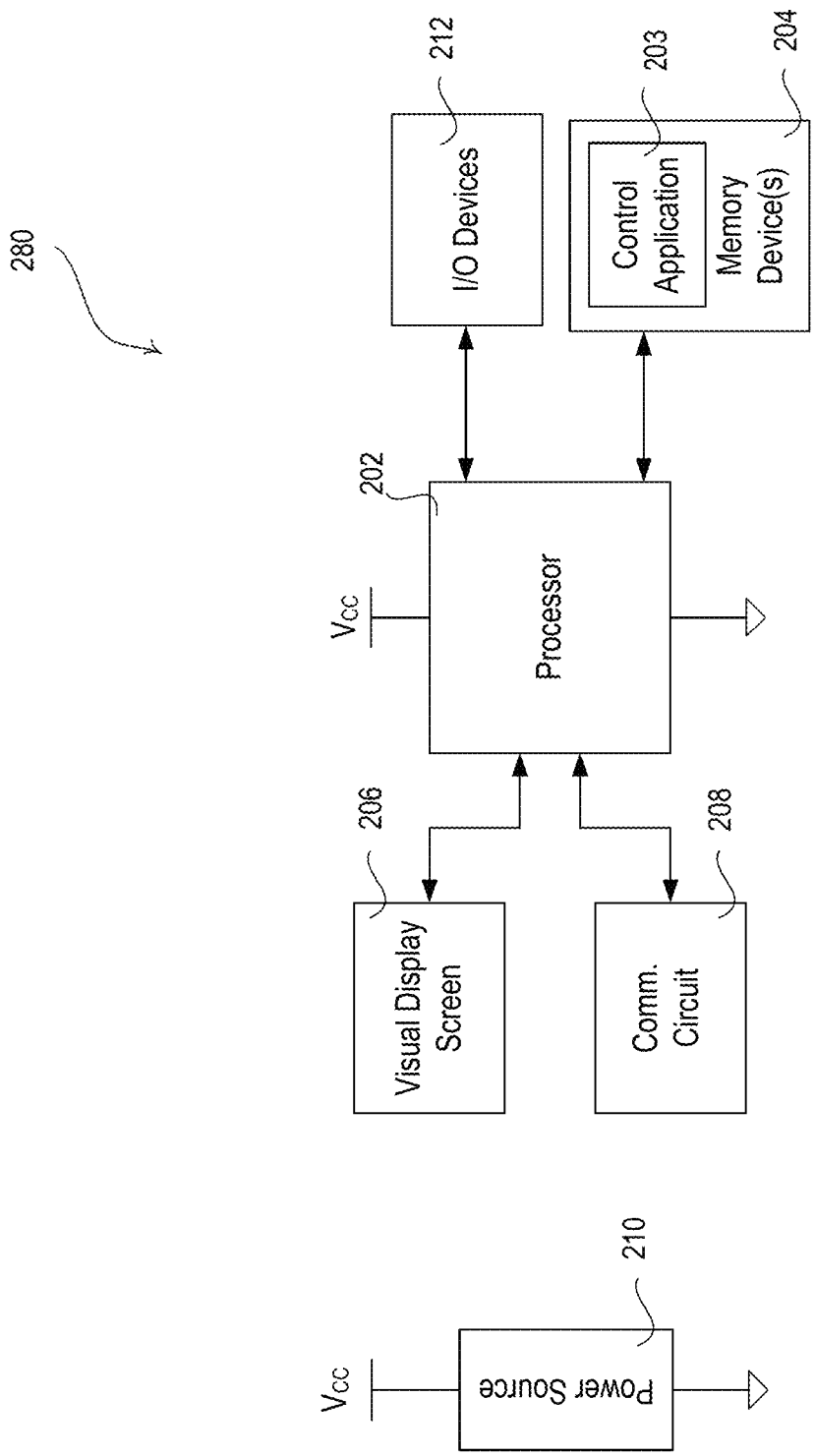
FIG. 2 is a block diagram of an example network device.

FIG. 2 shows an example block diagram of network device 280 (this diagram may also apply to the network devices 144 or a remote network device, for example). Network device 280 may include one or more general purpose processors, special purpose processors, conventional processors, digital signal processors (DSPs), microprocessors, microcontrollers, integrated circuits, programmable logic devices (PLD), application specific integrated circuits (ASICs), or the like and/or may further include other processing element(s) such as one or more graphic processors (hereinafter collectively referred to as control circuits(s) 202). Control circuit(s) 202 may control the functionality of the network device and may execute the control/configuration application 203, in addition to other software applications such an operating system(s), database management systems, etc., to provide features and functions as describe herein. The control circuit(s) 202 may also perform signal coding, data processing, power control, input/output processing, and any other functionality that enables the network device 280 to perform as described herein. The network device 280 may also include one or more memory 204 (including volatile and non-volatile memory) which may be non-removable memory and/or a removable memory.

Memory 204 may be communicatively coupled to the control circuit(s) 202. Non-removable memory 204 may include random-access memory (RAM), read-only memory (ROM), a hard disk(s), or any other type of non-removable memory storage. Removable memory 204 may include a subscriber identity module (SIM) card, a memory stick, a memory card, or any other type of removable memory. The one or more memory 204 may store the control/configuration application 203 and may also provide an execution space as the processor(s) execute the control/configuration application. Network device 280 may also include a visual display screen(s)/terminal(s) 206 that may be communicatively coupled to the control circuit(s) 202. Together with control circuit(s) 202, visual display screen(s) 206 may display information to the user via one or more GUI based interfaces/GUI based "window(s)" as described herein. The display screen(s) 206 and the control circuit(s) 202 may be in two-way communication, as the display screen 206 may include a touch sensitive visual screen component configured to receive information from a user and providing such information to the control circuit(s) 202

Network device 280 may also include one or more input/output (I/O) devices 212 (e.g., a keyboard, a touch sensitive pad, a mouse, a trackball, audio speaker, audio receiver, etc.) that may be communicatively coupled to the control circuit(s) 202. The I/O devices may allow the user to interact with the control/configuration application 203, for example. Network device 280 may further include one or more transceivers/communications circuits (collectively, communications circuit(s) 208) for communicating (transmitting and/or receiving) over wired and/or wireless communication networks, for example. The communications circuit(s) 208 may include an RF transceiver(s) or other circuit(s) configured to perform wireless communications via an antenna(s). Communications circuit(s) 208 may be in communication with control circuit(s) 202 for transmitting and/or receiving information. Each of the components within the network device 280 may be powered by a power source 210. The power source 210 may include an AC power supply and/or DC power supply, for example. The power source 210 may generate a supply voltage(s) $V_{CC}$ for powering the components within the network device 280.

In addition to including GUI based software components, for example, that provide the graphical features and visual images described herein, the control/configuration application 203 may also include a logic engine(s) for providing features of the GUI and features of the application in general as described herein. The GUI based software components and/or logic engine may be one or more software based components that include instructions, for example, that are stored on and/or execute from one or more tangible memory devices/components of the network device as indicated above. Features of the control/configuration application may also and/or alternatively be provided by firmware and/or hardware in addition to/as an alternative to software based components. Again, network device 280 is an example and the control/configuration application may execute on other types of computing devices.

As indicted, network device 280 may be similar to the network device 144 (e.g., including an external network device accessed via a cloud), as described herein. Accordingly, the control/configuration application may communicate with the other devices of the user environment (e.g., the system controller, control-source devices, control-target devices etc.) via a network local to the user environment (such as a Wi-Fi network). Nonetheless, one will recognize that the control/configuration application 203/network device 280 may communicate with other devices using other communication systems and/or protocols, etc. In addition, the control/configuration application 203 is described herein as being a self-contained application that executes on the network device 280 and communicates messages with the system controller, for example. In other words, logic of the control/configuration application and generated graphics associated with the application are described herein as executing from the network device. Nonetheless, features and/or graphics of the control/configuration application may be implemented in other fashions, such as a web hosted application with the network device interfacing with the web hosted application using a local application (e.g., a web browser or other application) for providing features and functions as described herein. As one example, the system controller may function as the web host.

In general, while a user environment may include control devices that the control/configuration application/network device 280 may interact with, control, and/or configure via a system controller (e.g., the system controller 150), the user environment may also include other types of control devices that may be, for example, Wi-Fi enabled and/or internet of things enabled control devices for example (e.g., devices that are configured to communicate via wireless and/or wired based networks, such as HomeKit). For description purposes, such other control devices (e.g., control devices to which the control/configuration application and/or network device 280 does not communicate with via the system controller) may be referred to herein as Wi-Fi enabled and/or HomeKit enabled control devices. Nonetheless, one will recognize that the features described herein are not limited to Wi-Fi enabled and/or HomeKit enabled control devices. Examples of such other control devices may include lighting control devices/bulbs, thermostats, fans, etc.

Network device 280 and the Wi-Fi enabled control devices, for example, may be configured to directly communicate with each other without having to communicate through a system controller (e.g., if the network device is also HomeKit enabled), and/or may communicate via one or more cloud based servers, for example, again without communicating through the system controller. According to one aspect of the control/configuration application 203 described herein, assuming the network device 280 is configured to communicate with such Wi-Fi enabled control devices (e.g., via HomeKit), for example, the control/configuration application may be configured to also interact with, control, and/or configure these devices, in addition to control devices. In so doing, the control/configuration application may combine within the graphical interfaces described herein information obtained from such Wi-Fi enabled devices, for example, and information obtained on control devices that are controlled by the system controller.

The control/configuration application 203 may also provide interfaces that allow a user to control and/or configure both Wi-Fi enabled control devices, for example, and control devices that are controlled by the system controller. For ease of description, the control/configuration application 203 will be described herein as interacting with control devices of a load control system. Nonetheless, similar functionality as described herein may also apply to Wi-Fi enabled devices that may not be controlled via the system controller and to which the network device may directly and/or indirectly communicate. One will also recognize that the control/configuration application described herein may alternatively control Wi-Fi enabled devices, for example, with which the network device 280 is configured to directly and/or indirectly control/interact with. Again, one will further recognize that while control/configuration application 203 is described herein in the context of a load control system and communication systems, the features and functions of the control/configuration application are applicable to other types of control devices, load control systems, and communication systems including for example, Wi-Fi enabled and/or HomeKit enabled systems As one example, the network device 280 may display to a user via a visual display screen 206 an icon associated with the control/configuration application 203. The network device 280 may detect the selection of the icon by the user (e.g., such as detecting the using touching the icon) and in response, may start (e.g., which may also be referred to herein as launching, running, executing, activating and/or invoking) the control/configuration application 203. The control/configuration application may be started in other ways, including the network device being configured to automatically start the application upon being reset and/or powered on. In response to being started or launched, the control/configuration application (in addition to performing security/authentication procedures, for example) may communicate one or more messages to the system controller, for example, to obtain/request/query for various information, such as status/state and/or configuration information of the load control system, and use this information to initially generate and display to the user via the display screen of the network device 280 a graphical user interface. Again, at starting, for example, the control/configuration application may also communicate with Wi-Fi enabled devices, for example, the network devices have been configured to communicate with. Thereafter, the control/configuration application may continue to request and/or receive various information from the system controller at various times depending on what information the control/configuration application may need to display to the user and/or is being generated by the system controller. Again, the control/configuration application 203 may also communicate with Wi-Fi enabled devices in a similar fashion.

Upon receiving information requests from the control/configuration application 203 (such as requests for status and configuration information), the system controller may respond by communicating with control devices and/or a database(s), for example, to determine and provide the requested information and respond to the control/configuration application with one or more response messages. In addition to determining status and configuration of the load control system, for example, the control/configuration application 203 may also allow a user to communicate messages to the system controller to modify, edit, or change the configuration and/or state of the load control system as further described herein. In addition, the system controller may also asynchronously provide status and configuration information to the control/configuration application (e.g., provide an indication of status/state changes of control devices without the control/configuration application querying for such changes). The control/configuration application may use this information to update various graphical user interfaces displayed to the user via the network device 280. Again, Wi-Fi enabled devices and the control/configuration application and/or network device may interact in similar fashions.

Before turning to the various graphical user interfaces the control/configuration application 203 may provide to a user, a description of example types of information the control/configuration application may request/receive and/or configure, for example, to generate interfaces is discussed. For example, as described herein, the control/configuration application may request/obtain this information from another device (e.g. system controller and/or one more control source devices). Also, or alternatively, the information may be maintained or stored locally (e.g., stored at the memory device(s) 204). In addition to receiving this information, the control/configuration application may also alter such information at the system controller, as described herein.

The control/configuration application may request/obtain information related to the configuration and current state/status of a load control system from another device in the load control system, such as the system controller and/or one or more control source devices (e.g., the remote-control device 122). Also, or alternatively, the network device 280 may itself store or maintain the configuration and current state/status information (e.g. or a subset of the configuration and current stat/status information), and the control/configuration application 203 may request/obtain this information from the memory device(s) 204. Such information may include, for example, the specific control devices that are part of the load control system including an identifier that indicates the type of the control device The specific control device types may include, for example, one or more lighting control devices (also referred to herein as lighting devices) that each directly controls one or more respective electrical lighting loads/lights, one or more temperature control devices (such as and hereinafter also referred to as a thermostat device(s)) that directly control respective HVAC systems, one or more ceiling fan devices (also referred to herein as fan devices) that each directly controls one or more respective fans (e.g., on, off, fan speed), one or more audio control devices (e.g., a speaker system), and one or more window shade devices that each directly controls positions or levels of one or more respective shades (One will recognize that while shade devices and shades are discussed herein as an example of motorized window treatments and window covering, other types of motorized window treatments and window coverings are possible such as drapes, curtains, blinds, etc.).

The control devices may include one or more keypads, such as wall-mounted keypads, tabletop keypads, and/or remote-control/handheld keypads and devices. As an example, a given keypad may include one or more actuators such as buttons (although other types of actuators are possible), and may be configured to control one or more control devices/electrical loads (e.g., lighting control devices/lighting load(s), HVAC system(s), shade(s), fan(s), and/or speaker(s), etc.). A keypad may include different types of actuators such as on/off actuators, raise lower actuators for lights or shades, fan speed actuators, scene actuators, etc. A scene actuator may set one or more control devices/electrical loads controlled by the keypad to a pre-set configuration.

The configuration and current state/status information may also include a location indicator for each control device that may indicate a location of the device within the user environment and/or the location of the electrical loads the device controls. This indicator may be in the form of a location name (e.g., a text string) and/or an indicator that may be translated into a location name (e.g., a text string), although other mechanisms may be used. For example, assuming the user environment is a home, possible locations may include standard locations like "kitchen," "living room," "family room," "dining room," "master bedroom," "bedroom," "master bathroom," "bathroom," "basement," "front porch," "office," "lobby," "conference room," etc. Locations may also include sub-locations in a room like "basement—sitting area," "basement— game area," basement—work area," "basement—storage area," etc. Locations may also include user defined/customized locations like: "Mary's bedroom," "John's bedroom," etc. The location of a control device may be programmed into the load control system (and stored in database, for example) by a user when installing the system within the user environment. One will recognize these are examples.

For lighting control devices, the configuration and current state/status information may also include a type indicator that may indicate a type of a lighting load(s) (also referred to herein as a light(s)) controlled by the control device. A type of a lighting load may include, for example, the function/purpose of the lighting load within its defined location and/or indicate/suggest a specific location of the lighting load within its defined location (e.g., ceiling light vs floor lamp). A type indicator may be in the form of a name/function (e.g., a text string) and/or an indicator that may be translated into a name/function (e.g., a text string), although other mechanism may be used. As an example, assuming the user environment is a home, standard types may include ceiling or overhead light, chandelier, pendant(s), table lamp(s), floor lamp(s), sconce(s), sink light(s) (e.g., for a kitchen or bathroom), island light(s) (e.g., for a kitchen), closet light(s), accent lights, downlights, desk area lights, etc. Types may also include user defined/customized types. The type of lighting load may be programmed into load control system (and stored in a database, for example) by a user when installing the system within the user environment. One will recognize these are examples. Types may also apply to other control devices such as fans, shades, and keypads. Again, the type indicator may provide an indication of a specific function and or location within the device's defined location. Other example types may include "left shade," "right shade," "center shade," "wall keypad," "tabletop keypad," etc.

The control/configuration information may also include an indication of an icon to be used with applications (such as the control/configuration application) to graphically represent the control device on a graphical interface. The type of icon to associate with a device may be programmed into load control system (and stored in a database, for example) by a user or automatically when installing the system within the user environment.

The control/configuration information may also include a current status/state and/or configuration of one or more of the control devices. For example, for a lighting control device the status information may include whether the respective lighting load(s) are in an on or off state, and if in the on state whether it is a dimmed state and possibly further the dimming level, color setting, vibrancy setting, etc. The control/configuration application may allow the user to modify scenes and/or to create new scenes, for example, via the network device. For an occupancy sensor, the status information may include, for example, whether the sensor has detected an occupancy event/condition and/or is in an occupancy state, has detected a continued occupancy event/condition and/or is in a continued occupancy state, and/or has detected a vacancy condition and/or is in a vacancy state. Again, these are examples and other information is possible.

As another example, a device in the load control system, such as the system controller and/or one or more control source devices, may maintain information related to one or more pre-programmed scenes that may be actuated by a user from an application, such as the control/configuration application 203 or a control source device, such as the remote-control device 122 or other type of keypad as described herein. A scene may include, for example, certain settings for one or more lights, shades, etc. The device may maintain respective scene configuration information in a database. The control/configuration application may request/obtain information related to these pre-programmed scenes and as further described below, thereafter allow the user, via the network device, to a select a given scene, resulting in the control/configuration application instructing the another device (e.g., the system controller and/or one more control source devices) to configure control devices according to the selected scene (e.g., set one more light levels, fan speeds, shade levels, etc.). As also described below, the control/configuration application may allow a user to modify the pre-programmed scenes maintained and to create and store new scenes that may subsequently be selected by the user. After the scene are created and stored, the scenes may be assigned. For example, a scene may be assigned to one or more zones in the load control system, and enabled by, for example, pressing a certain button at a remote control device or keypad.

As a still further example, various time clock schedules may be maintained where a schedule may be, for example, a certain setting for one or more control devices (e.g., lights, shades, etc.) that the system controller or one or more control-source devices automatically configure based on the schedule. For example, the system controller may maintain respective time clock schedules in a database and the status of these schedules, such as whether a given schedule is active, inactive, or disabled. The control/configuration application may obtain control information related to these time clock schedules and as further described below, thereafter allow the user via the network device to modify these schedules and to create new schedules.

According to another example, a lighting control device may control a lighting load (e.g., or a plurality of lighting loads), where the lighting load may include a plurality of multi-colored LEDs. In other words, the lighting load may include within a single package, for example, a number of differently colored emission LEDs and may be configured such that the chromaticity output of the LEDs is mixed to produce light having varying chromaticity coordinates (e.g., color points) within a color gamut formed by the various LEDs that make up the lighting load. As one example, a lighting load may include one or more red LEDs, one or more green LEDs, one or more blue LEDs, and one or more white, or substantially white LEDs (e.g., such as yellow and/or mint green LED(s)), which may be collectively referred to herein as a RGBW lighting load. Although the RGBW lighting load is described herein with a combination of four LEDs of certain colors, other combinations of LEDs (e.g., more or less LEDs and/or different color LEDs) may be used.

The control/configuration application may be used to configure a CRI value of one or more lighting loads. A CRI value greater than or equal to a threshold (e.g., a CRI value of 90) may be desirable and may be referred to herein as "optimal," "optimized," or "maximized." That said, other ranges (e.g., smaller and/or larger ranges) may also be considered "optimal," "optimized," or "maximized." In certain instances (e.g., depending on distance between the selected color setting and the black-body curve), the CRI value of a lighting load may be increased to a value greater than or equal to a target CRI value. For example, the target CRI value may be 90. One will appreciate, however, that the target CRI value may be other values. That is, the target CRI value may be a value which may be considered a desirable threshold that a system may attempt to achieve give the certain characteristics of the load control system and/or lighting control devices (e.g., quality of the LEDs used in a lighting load).

A load control system may be configured and/or controlled according to one or more defined scenes. Also, or alternatively, the load control system may be further divided into one or more areas or locations (e.g., depending on the size of the load control system or user environment), and each of the areas or locations within the load control system may be configured and/or control according to one or more scenes. The scenes may be activated, for example, in response to a button press at a control source device (e.g., remote control device 122), via a graphical user interface on a network device (e.g., the network devices 144, 280), and/or based on a time clock, as described herein. Also, or alternatively, a load control system may be configured and/or controlled according to natural show or natural lighting configuration, which as described herein, may be activated in response to a button press at a control source device, via a graphical user interface at a network device, and/or based on a time clock etc. As described herein, a natural show or natural lighting configuration may be defined separately from a scene, or assigned to a scene (e.g., such that activating a scene enables a natural show or natural light configuration). Further, a control/configuration application (e.g., the control/configuration application 203) may display one or more graphical user interface to allow a user to define the scenes and/or configure the natural show or natural lighting settings.

As described herein, the devices in a load control system may be grouped or organized together based on their respective location within the user environment. For example, the devices in a load control system may be grouped and/or organized based on their respective location in the user environment (e.g. the devices in a single room may be organized or grouped together). After the devices are grouped or organized based on their location in the user environment, the devices may also be assigned to a certain zone. For example, the lighting devices in a certain location of a user environment may be assigned to a zone based on their respective function (e.g., the lighting control devices that are intended to emit light a certain surface, such as desk, may be grouped, or organized together in a "Desk Area" zone).

Grouping or organizing the devices in a load control system based on their location and then assigning them to a zone (e.g., based on their function) may allow a user to configure or control the devices within a load control system more efficiently. For example, as the number of device in the load control system increases, the settings that may be configured by the user may also increase. And without grouping or organizing the device into a more manageable subset of devices, the user may fail to accurately and efficiently control the increased number of devices in the load control system. Moreover, the capabilities and, as a result, the configurable settings of each of the devices may differ, further increasing the complexity of configuring or controlling the load control system. If, however, the devices are grouped by their respective location and then assigned to a zone (e.g., based on their respective function), the user may configure the devices in the load control system by zone, which may improve the accuracy and efficiency of configuring and controlling the load control system.

After the devices in a load control system are organized and grouped by location and subsequently assigned to a zone, a user may collectively configure or control the devices that are assigned to a given zone. Further, since the devices that are assigned to a given zone based on their respective function, the settings for devices in that zone (e.g., lighting intensity settings and/or color settings) may be configured to be the same, which may improve the accuracy and efficiency of configuring and controlling the load control system.

Figures 3A, 3B:
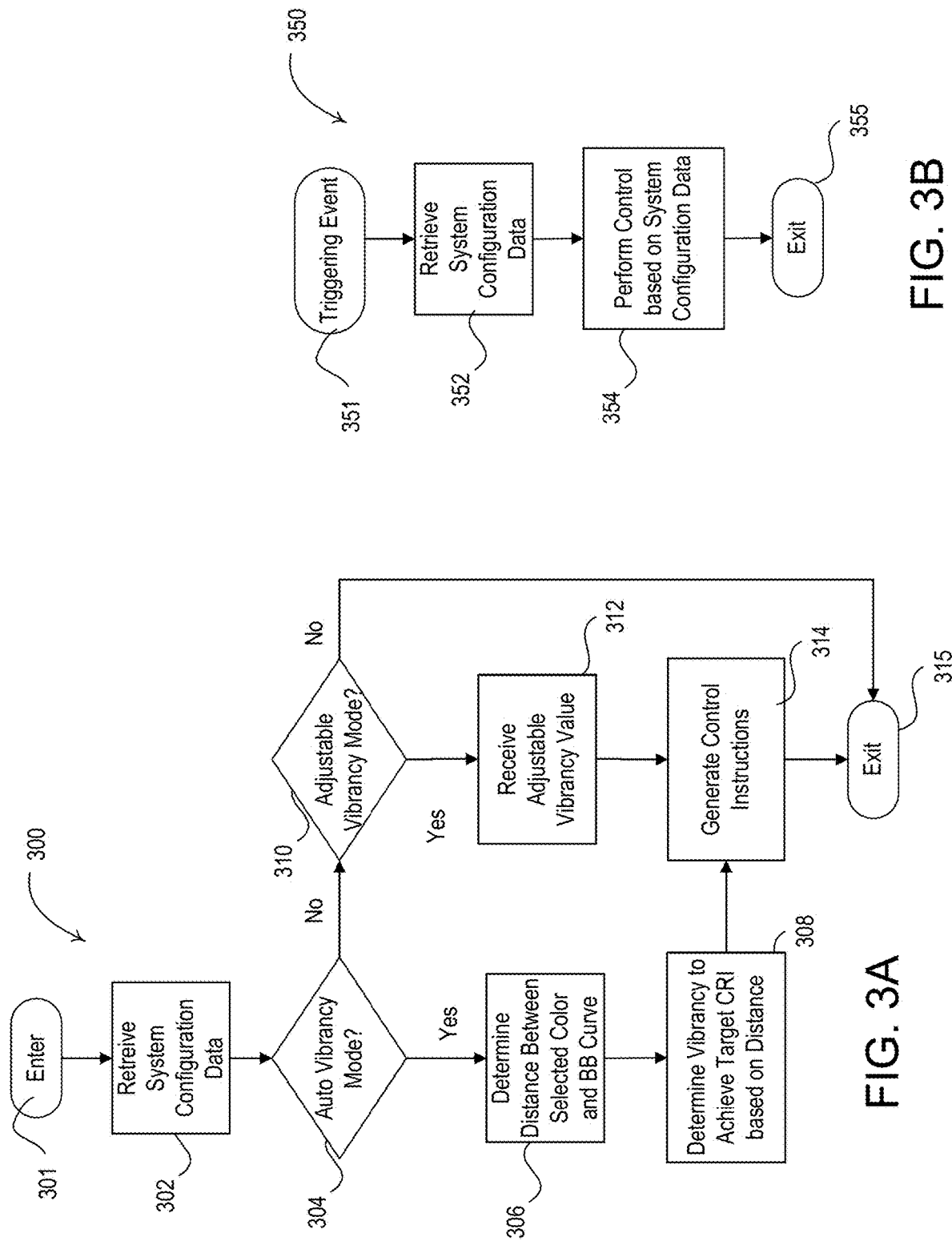
FIGS. 3A and 3B are flowcharts depicting an example procedure for configuring and/or controlling a load control system.

FIGS. 3A and 3B are flowcharts that illustrate example procedures for configuring or controlling a load control system. Referring first to FIG. 3A, there is shown an example procedure 300 for performing vibrancy control in a load control system. The procedure 300, or portions thereof, may be performed by a control/configuration application, such as the control/configuration application 203, and may enter at 301. For example, the procedure 300 may enter in response to an indication from a user to update or configure the system configuration data (e.g., control/configuration information and/or current state/status information) for a load control system (e.g., via a network devices, such as the network devices 144, 280). The procedure 300 may be performed after the devices in a load control system have been grouped or organized by their respective location in a user environment and subsequently assigned to zones. Also, or alternatively, the procedure 300 may be performed prior to the devices in a load control system being grouped or organized by their respective location in a user environment and/or assigned to a zone, which may be stored and/or maintained in the system configuration data.

At 302, the control/configuration application may retrieve the system configuration data for a given zone. For example, the system configuration data may indicate the lighting control device(s), which, as described herein may perform control of a corresponding lighting load, that are assigned to the zone. The system configuration data may indicate or otherwise describe the current state or control/configuration information defined for the lighting control device(s) assigned to the zone. For example, the system configuration data may include control/configuration information comprising lighting control parameters for controlling the corresponding lighting loads of the lighting control devices. As described herein, the lighting control parameters may indicate the lighting intensity settings and/or the color settings. The lighting intensity settings may indicate the lighting intensity settings, the color settings, the vibrancy setting, etc. to which lighting control devices in the zone are to be controlled. The color settings may include a color value (e.g., x-y chromaticity values, CCT value, etc.) to which the lighting load of the lighting control devices in the zone are to be controlled. The color value may be a coordinate on the color gamut or a color temperature value. The color value may identify a full color value or a CCT value of white light on the black-body curve. The lighting control parameters may also indicate vibrancy settings (e.g., vibrancy mode and/or vibrancy value) for controlling the lighting control devices in the zone. The vibrancy settings may include a selection of the vibrancy mode, such as the auto vibrancy mode, or the adjustable vibrancy mode for the lighting control devices assigned to the zone. The vibrancy settings may also include the vibrancy value for controlling the lighting control devices assigned to the zone.

As described herein, the system configuration data may be retrieved from a single device (e.g., a system controller, such as the system controller 150, or a network device), or portions of the system configuration data may be retrieved from multiple devices (e.g., a system controller, network device, one or more control source devices, and/or one or more control target devices). The system configuration data may also be obtained from devices external to the load control system, such as from cloud based system or other load control systems to which a given load control system is integrated with. The system configuration data may include predefined control/configuration information and/or control/configuration information based on a user selection (e.g., a user may provide a selection, via the control/configuration application 203).

After retrieving the system configuration data, the control/configuration application may display a representation of the system configuration data (e.g., or a portion of the system configuration data). For example, the control/configuration application may display a representation of a defined scene for controlling one or more zones in an area of user environment or load control system via a graphical user interface, as described herein. As described herein, one or more lighting control devices configured to control a corresponding lighting load may be assigned to each of the one or more zones. The graphical user interface may display various controls or control interfaces based on the lighting control device/lighting loads assigned to a given zone. For example, the graphical user interface may display a lighting intensity (e.g., via lighting intensity bar) for each of the lighting control device(s) assigned to the zone and/or a palette that identifies a color setting for controlling each of the one or more zones in the scene. The palette may be configured to display colors at different color temperatures at which the lighting control devices/lighting loads are capable of being controlled to, or a full color gamut of colors at which the lighting control devices/lighting load are capable of being controlled to. If, for example, the system configuration data indicates that a respective vibrancy mode is enabled (e.g., auto vibrancy mode and/or adjustable vibrancy mode is enabled), the graphical user interface may display a vibrancy control interface for each of the lighting control device(s) assigned to the zone.

Also, or alternatively, the control/configuration application may display a representation of the system configuration data in the form of a graph. The graph may include one or more axes (e.g., a color temperature axis that indicates color temperatures, an intensity axis that indicates lighting intensity values, and/or a time axis that includes a period of time at which the lighting intensity and the color temperatures are controlled), which may indicate changes in lighting control parameters (e.g., lighting intensity settings, color settings, vibrancy setting, etc.) of the lighting control device/lighting loads assigned to a given zone over time (referred to herein as natural show). If a respective vibrancy mode is enabled (e.g., auto vibrancy mode or adjustable vibrancy mode is enabled), the graphical user interface may also display certain vibrancy control interfaces (e.g., a vibrancy bar).

The control/configuration application may also be configured to receive updates or changes to the system configuration data, for example, from a user. As described herein, changes to the system configuration data may include changes or updates to the lighting control parameters (e.g., lighting intensity settings, color settings, vibrancy settings, etc.) for a defined scene; changes or updates to a natural show (e.g., changes or updates to the lighting intensity settings, color settings, vibrancy settings, etc., over time); etc. Accordingly, the control/configuration application may receive changes or updates to the system configuration data via the displayed lighting intensity, palette, and/or vibrancy controls.

As described herein, a lighting control device may be set to and/or configured according to an auto vibrancy mode or an adjustable vibrancy mode. Accordingly, the control/configuration application may determine whether auto vibrancy mode is selected at 304. When auto vibrancy mode is selected, the control/configuration application may automatically determine a vibrancy value at which to control the lighting load to emit light at a CRI value that is at or above a target CRI value. For example, the control/configuration application may automatically determine the vibrancy value based on a distance between the selected color setting and the black-body curve, such that the lighting load emits light toward, at, or above a target CRI value. Thus, at 306, the control/configuration application may determine a distance between the selected color setting for the lighting load (e.g., which may be indicated or otherwise defined by the system configuration data) and the black-body curve. Although not show in FIG. 3A, the control/configuration application may also, or alternatively, determine a distance between the selected color setting for the lighting load and another set of predefined color values (e.g., the color output of a white or substantially white LED) on the color spectrum. At 308, the control/configuration application may automatically determine a vibrancy value based on the distance between the selected color setting for the lighting load and the black-body curve (e.g., or another set of predefined color values on the color spectrum). The vibrancy value automatically determined at 306 may further be and/or alternatively be configured to emit light from the corresponding lighting load toward, at, or above a target CRI value. As described herein, when the auto vibrancy mode is enabled, a vibrancy value may be automatically determined based on the selected color setting. Further, the automatically determined vibrancy value may be updated as the selected color setting is updated (e.g., as the user changes or updates the selected color setting). Accordingly, the actions performed at 306 and 308 of the procedure 300 may be performed in response to changes in the selected color settings (e.g., the respective distances and vibrancy values may be re-determined in response to changes or updates to the selected color settings).

As described herein, the distance between the selected color setting for the lighting load and the black-body curve may indicate whether the selected color setting has an equivalent CCT value on the black-body curve. If, for example, the distance is less than a distance threshold (e.g., indicating that the color setting has an equivalent CCT value), the automatically determined vibrancy value may be the automatically determined vibrancy that results in the emission of light from the lighting load at or above the target CRI value for the equivalent CCT value. In addition, when the distance between the selected color setting for the lighting load and the black-body curve is greater than the distance threshold, the automatically determined vibrancy value may be a predefined vibrancy value (e.g., 25%).

As described herein (e.g., with respect to FIGS. 1B and 1C), as the selected color setting nears white or near white light (e.g., nears the black-body curve), the effect that configuring or controlling vibrancy has on the light emitted by the lighting load (e.g., the CRI value of the light emitted by the lighting load) may increase. As a result, if the distance between the selected color setting for the lighting load and the black-body curve is less than the distance threshold, the automatically determined vibrancy value may increase. Further, as the selected color setting increases along the black-body curve (e.g., as the CCT value increase and/or as the selected color setting approaches higher CCT values), the automatically determined vibrancy value may increase (e.g., the contribution of the white or substantially white LED may decrease).

The control/configuration application may determine whether adjustable vibrancy mode is selected at 310. As described herein, when adjustable vibrancy mode is selected, the control/configuration application may be configured to receive an adjustable vibrancy value at which to control the corresponding lighting load. If adjustable vibrancy mode is not selected, the procedure 300 may end at 315. If, however, adjustable vibrancy mode is selected at 310, the control/configuration application may receive the adjustable vibrancy value at 312, for example, via the vibrancy control interface displayed by the graphical user interface (e.g., a vibrancy control bar). As the selected vibrancy value increases, the contribution of at least one of the plurality of LEDs in the corresponding lighting load may decrease. For example, as the selected vibrancy value increases, the contribution of the white (e.g., or substantially white) LED in an RGBW lighting load may decrease to increase the vibrancy of reflected light from the lighting load. Additionally, or alternatively, as the selected vibrancy value increases, the contribution of at least one of the plurality of non-white LEDs in the corresponding lighting load may increase to increase the vibrancy of reflected light from the lighting load.

At 314, the control/configuration application may generate control instructions. For example, depending on the selected vibrancy mode, the control/configuration application may generate control instructions based on the automatically determined vibrancy value at 306 or the received adjustable vibrancy value at 312. The control instructions may, based on the selected lighting intensity settings, color settings, vibrancy settings, etc., include a lighting intensity settings, a color setting, and/or a vibrancy value (e.g., the automatically determined vibrancy value at 306 or the received adjustable vibrancy value at 312). Also, or alternatively, the control instruction may include an indication or a button press. And, as described further herein, a lighting control device that receives the generated control instructions may perform control of a corresponding load based on the control instructions. For example, the lighting control device may control the corresponding lighting load to emit light at the lighting intensity value and color value indicated by the selected lighting intensity settings, the selected color settings, and/or the selected vibrancy settings. If, for example, the control instructions include an indication of a certain button press, the lighting control device may determine the selected lighting intensity settings, the selected color settings, and/or the selected vibrancy settings based on the certain button that was pressed (e.g., by retrieving these settings from an internal storage medium), and control the corresponding lighting load to emit light at those selected settings. That is, the corresponding lighting load may set the intensity of each of its respective LEDs to maintain the selected color setting and lighting intensity setting while controlling to the vibrancy value (e.g., the intensity or contributions of each of the respective LEDs). And, when the auto vibrancy mode is selected, the lighting load may set the intensity of each of its respective LEDs such the lighting load emits light at a CRI value at, or above the target CRI value.

The procedure 300 may also be performed in a natural show example. For example, if the system configuration data indicates that lighting control devices and corresponding lighting loads assigned to a zone are configured with natural show with auto vibrancy mode enabled, the control/configuration application may be configured to automatically determine vibrancy values for each of the selected color settings over a period of time. That is, the control/configuration application may determine a respective distance between each of the selected color setting over the period of time and the black-body curve (e.g., or another predefined range of color values on the color gamut), and then determine respective vibrancy values for each of the selected color settings over the period of time to emit light at a CRI value that achieves the target CRI based on the respective color setting selected at that time.

Similarly, when the system configuration data indicates that lighting control devices and corresponding lighting loads assigned to a zone are configured with natural show and adjustable vibrancy mode enabled, the control/configuration application may receive a selection of the adjustable vibrancy value, and the selection of the adjustable vibrancy value may apply to the selected color setting over the period of time. One will appreciate, however, that although the selection of the adjustable vibrancy value may remain the same over the period of time, the intensity or contribution of the white LED in the lighting may differ based on the selected color setting. For example, although the selection of the adjustable vibrancy value may remain the same over the period of time, the intensity or contribution of the white LED may decrease as the selected color setting (e.g., CCT value) increase over the period of time.

Although not shown in FIG. 3A, the control/configuration application may update the system configuration data to reflect the control instructions generated at 314 before exiting the procedure 300 at 315. For example, the control/configuration application may update the system configuration data in response to determining that there are no additional updates to be made to the system configuration data (e.g., when the control/configuration application receives an indication from a user that there are not additional updates to the system configuration data, for example, by selecting a "Save" or "Finished" button, such as the "Save to Scene" button 438 described herein with respect to FIG. 4B).

Referring now to FIG. 3B, there is shown an example procedure 350 for controlling a load control system based on a system configuration data, which, as described herein, may be defined or updated using the procedure 300. The procedure 350 may be performed by a single device. For example, the procedure 350 may be performed by a system controller, a lighting control device, a network device, or another control device to perform control using the system configuration data stored thereon. Also, or alternatively, the procedure 350 may be performed by multiple devices (e.g., a portion of the procedure 350 may be performed by a first load control device and another portion of the procedure 350 may be performed by a second load control device). For example, the system controller may retrieve the system configuration data (e.g., either locally or from another device) and perform control based on the system configuration data (e.g., by transmitting one or more message that include control instructions to perform control based to one or more lighting control devices based on the system configuration data).

As illustrated in FIG. 3B, the procedure 350 may be performed in response to the detection of a triggering event at 351. A triggering event may be an event that causes the devices in a load control system to be controlled according to the system configuration data. For example, as described herein, a triggering event may be caused by a user actuation for activating a scene (e.g. by pressing a button that corresponds to a scene at a remote control device or keypad); a scheduled event (e.g., based on a time clock); and/or a sensor event (e.g., an occupancy sensor detecting occupancy). Accordingly, the system configuration data may be retrieved at 352. As described herein, the system configuration data may be stored at a system controller and/or across one or more other devices (e.g., remote-devices, network devices, lighting control devices, other control devices, etc.). Therefore, the system configuration data may be retrieved from a system controller and/or from one or other devices in the load control system.

After retrieving the system configuration data, control may be performed based on the system configuration data at 354. For example, control may be performed by transmitting one or more messages that include control instructions (e.g., the control instructions generated at 314 of the procedure 300) to the load control device and/or a corresponding lighting load based on the system configuration data (e.g., the lighting control parameters indicated in the system configuration data). Referring now to a lighting control device and corresponding lighting load configured in an auto vibrancy mode or an adjustable vibrancy mode, the control instructions may include the selected lighting intensity settings (e.g., lighting intensity value), the selected color settings (e.g., x-y chromaticity values or CCT values), and a vibrancy value. As describe herein, the vibrancy value may be an automatically determined vibrancy value (e.g., when the auto vibrancy mode is enabled), or an adjustable vibrancy value selected by a user (e.g., when the adjustable vibrancy mode is enabled). These control instructions may be transmitted to the lighting control device and/or the corresponding lighting load. In response to receiving these control instructions, the lighting control device and/or corresponding lighting load may, based on the vibrancy value indicated by the control instructions, determine contribution/intensity of the separately colored LEDs to emit light at the selected lighting intensity settings and the selected color settings. The lighting control device may output the same total color and/or intensity, while varying the individual contribution/intensity of the separately colored LEDs in response to the vibrancy value. As the vibrancy value increases, the contribution/intensity of the non-white LEDs may increase and/or the contribution/intensity of the white LED(s) may decrease. As the vibrancy value decreases, the contribution/intensity of the non-white LEDs may decrease and/or the contribution/intensity of the white LED(s) may increase. It will be understood that the vibrancy value may be a relative value (e.g., between 0 and 100) that is different for different lighting loads having different combinations of colored LEDs. The procedure 350 may exit at 355.

With reference now to FIGS. 4A to 4D, FIGS. 5A to 5B, and FIGS. 6A to 6I an example control/configuration application 203, e.g., as illustrated in FIG. 2, is now described that may execute at least in part on a network device 380. Network device 380 may be similar to any of network devices 144, as described herein and may be a personal computer (PC), a laptop, a tablet, a smart phone, or equivalent device, for example, although it may also be another type of computing device. The control/configuration application may be a graphical user interface (GUI) based application that may provide a GUI based interface/GUI based "window(s)" to a user via the network device 380 and that may allow a user of the network device to interact with, control, and/or configure control devices within a user environment (such as control devices of a user environment). Nonetheless, the features and functions of the control/configuration application 203 (shown in FIG. 2) described herein are applicable to other types of control devices, load control systems, and communication systems. As an example, the user environment may be a residence, home, commercial building, and/or office, and the user of the network device 280 may be a resident or tenant of the home, commercial building, or office. The control/configuration application described herein may be also applicable to other types of user environments such as a buildings, hotel, etc. Similarly the user of the network.

Turning now to FIGS. 4A to 4D, FIGS. 5A to 5B, and FIGS. 6A to 6I, they illustrate example control/configuration applications that may be executed at least in part on a network device, such as the control/configuration application 203 of the network device 280, for configuring or controlling a load control system. For example, FIGS. 4A to 4D, FIGS. 5A to 5B, and FIGS. 6A to 6I may illustrate graphical user interfaces that may be displayed by the control/configuration application to display and/or update the system configuration data for a load control system.

Again, the network device may be similar to the network devices 144, 280 as described herein and may be a personal computer (PC), a laptop, a tablet, a smart phone, or equivalent device, for example, although it may also be another type of computing device. The control/configuration application may be a graphical user interface (GUI) based application that may provide a GUI based interface/GUI based "window(s)" to a user via the network device and may allow a user of the network device to interact with, control, and/or configure control devices within a user environment (e.g., user environment 102) or load control system (e.g. the load control system 100). For description purposes only, the load control system 100 of user environment 102 and the communication systems described with respect to FIG. 1A will be used herein as an example load control system and communication system to describe the control/configuration application. Nonetheless, the features and functions of the control/configuration application described herein are applicable to other types of control devices, load control systems, and communication systems. As an example, the user environment 102 may be a residence or home and the user of the network device may be a resident of the home. Nonetheless, the example control/configuration application may also be applicable to other types of user environments, such as a building, hotel, etc. and the user of the network device may be a system administrator.

Referring now to FIGS. 4A to 4D, there is shown example graphical user interfaces that may be displayed by the control/configuration application. As described herein, a user may interact with the graphical user interfaces to configure or control a load control system. For example, the graphical user interfaces may provide for the configuration or control of one or more lighting control devices in the load control system, for example, by defining one or more scenes. As described herein, a scene may include certain settings for one or more lights, shades, etc. And when a scene is activated (e.g., via button press of a remote-control device or keypad) one or more messages that include control instructions may be transmitted to control the respective devices in the load control system in accordance with the scene. Also, or alternatively, the graphical user interfaces may provide for the configuration or control of one or more lighting control devices in the load control system by defining a natural show or natural lighting configuration. As further described herein, a natural show or natural lighting configuration may allow a user to configure or control the one or more lighting control devices over time.

Figure 4A:
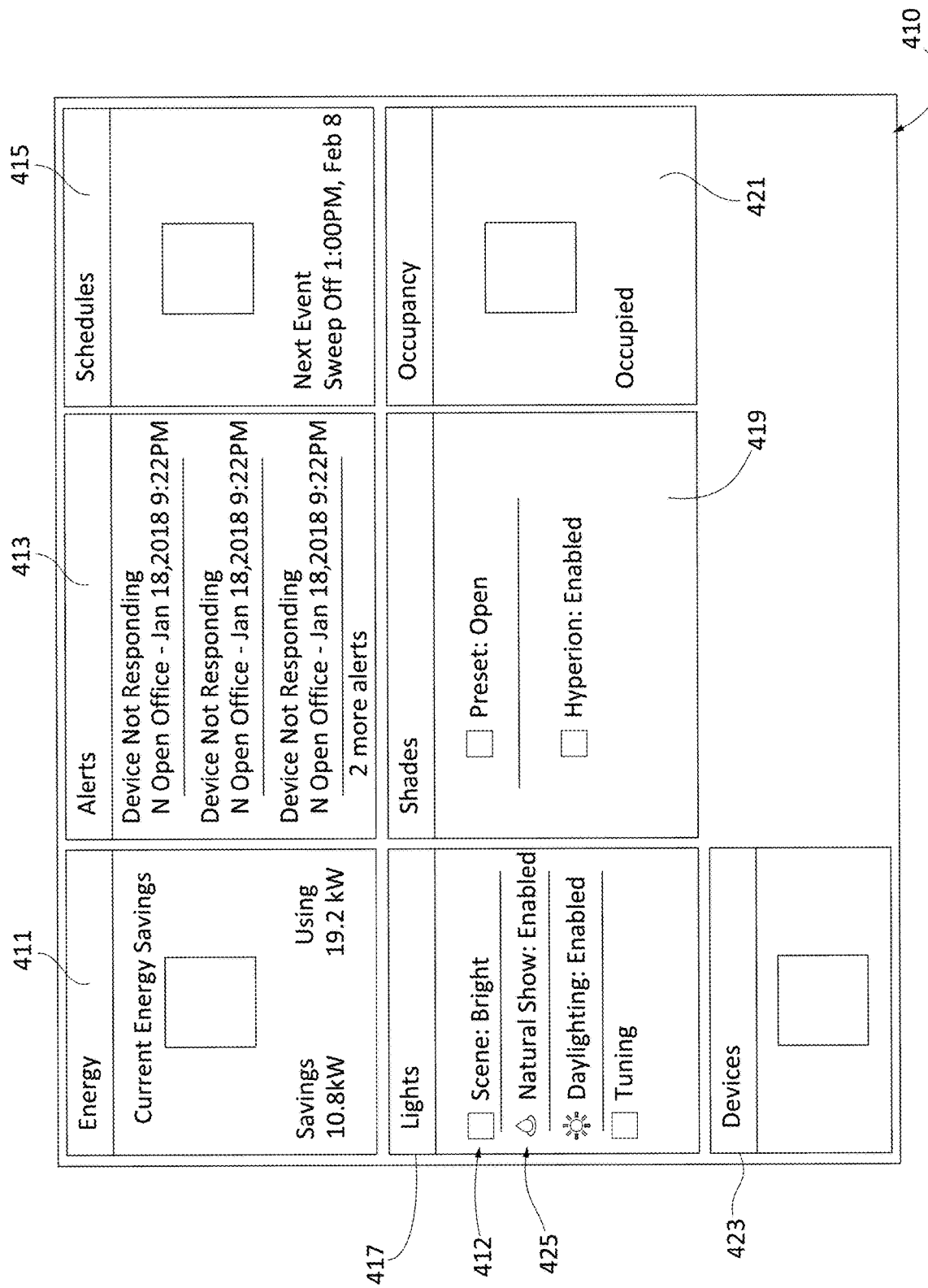
FIGS. 4A-4D show example graphical user interfaces of an application that may allow a user to determine scene information and to control a load control system and/or one or more load control devices.

Referring now to FIG. 4A, there is shown a graphical user interface 410 that may be displayed by the control/configuration application. The graphical user interface 410 may be displayed to a user via the network device 280, for example. The graphical user interface 410 may be displayed by the control/configuration application after the devices in a load control system have been grouped or organized by their respective location in the user environment and subsequently assigned to a zone (e.g., based on their function). For example, the system configuration data may be generated and stored during a commissioning procedure such that control devices may be associated with one another and/or one or more zones. Scenes may be defined and/or predefined during the commissioning procedure and stored in the system configuration data, such that the control devices and/or settings for the scenes may be displayed on the graphical user interface 410 using the control/configuration application. Also, or alternatively, the graphical user interface 410 (e.g., or a similar graphical user interface) may be displayed by the control/configuration application before the devices in a load control system have been grouped or organized by their respective location and/or assigned to a zone. For example, the graphical user interface 410 may be displayed during a design process when the load control system is being designed. Accordingly, although FIG. 4A illustrates one type of example graphical user interface that may be displayed by the control/configuration application, other types of graphical user interfaces may also, or alternatively, be displayed.

The graphical user interface 410 may include a number of tiles 411, 413, 415, 417, 419, 421, 423. Each of tiles 411, 413, 415, 417, 419, 421, 423 may convey information to the user and/or allow for user-selection for providing additional information and/or configuration. Each of the tiles 411, 413, 415, 417, 419, 421, 423 may provide information about devices in a preselected area or room, for example, within a floor of a building. An energy tile 411 may indicate an amount of energy usage and/or savings. An alerts tile 413 may provide alerts about devices in the system. A schedules tile 415 may provide information about scheduled events to the user and/or allow a user to schedule events in the system. For example, after selection of the schedules tile 415, the user may configure lighting schedules for controlling lighting control devices in the system. A lights tile 417 may provide information about current lighting configurations in the system and/or allow a user to configure control of lighting control devices and/or lighting loads within the system. A shades tile 419 may provide information about current shade configurations in the system and/or allow a user to configure control of shades within the system. An occupancy tile 421 may provide information about current occupancy conditions in the system and/or allow a user to configure control of devices within the system in response to occupancy and/or vacancy events/conditions. A devices tile 423 may allow a user to manage and perform maintenance of devices.

A scene indicator 412 may be displayed in the lights tile 417. The scene indicator 412 may be an indication of the current scene set for one or more lighting control devices of the preselected area (e.g., the "Bright" scene as shown in FIG. 4A). The scene indicator 412 may be selectable or configurable, and/or may allow the user to select or define the scene(s) for one or more lighting control devices (e.g., the one or more lighting control devices in the preselected area). After selecting the scene indictor 412, the control/configuration application may display a graphical user interface that provides a user with the ability to configure the settings (e.g., static settings) for one or more scenes. As an example, after selecting the scene indicator 412, the control/configuration application may display the graphical user interface 410a to configure the static settings for one or more scenes, as described herein with respect to FIGS. 4B to 4D.

A natural show indicator 425 may be displayed in the lights tile 417. The natural show indicator 425 may provide an indication that a natural show setting has been enabled or disabled for one or more lighting control devices in the preselected area. As described herein, a natural show (or natural lighting) feature may allow a user to configure or control the one or more lighting control devices over time (e.g., as compared to the static configurations that may be configured described herein, with respect to FIGS. 4A to 4D). For example, a natural show may be assigned to a scene and/or enabled when the scene is activated (e.g., via a button press at a remote control device or keypad, via a time clock schedule etc.). The natural show indicator 425 may be selectable or configurable, and/or may allow the user to select or define the natural show settings for one or more lighting control devices (e.g., the one or more lighting control devices in the preselected area or zone). A natural show setting may include a time clock based configuration of one or more lighting control devices where the control devices may be automatically controlled to change their lighting intensity values/brightness and/or color output over a defined period of time. After selecting the natural show indictor 425, the control/configuration application may display a graphical user interface that provides a user with the ability to configure the natural show settings. As an example, after selecting the natural show indictor 425 the control/configuration application may display the graphical user interface 510a to configure the natural show settings, as described herein with respect to FIGS. 5A to 5B. As another example, after selecting the natural show indictor 425 the control/configuration application may display the graphical user interface 510a to configure the natural show settings, as described herein with respect to 5A to 5B. Further, although the natural show indicator 425 is provided on the graphical user interface 410 for configuring and/or controlling the natural show, other graphical user interfaces may also be provided for configuring and/or controlling the natural show.

Figure 4B:
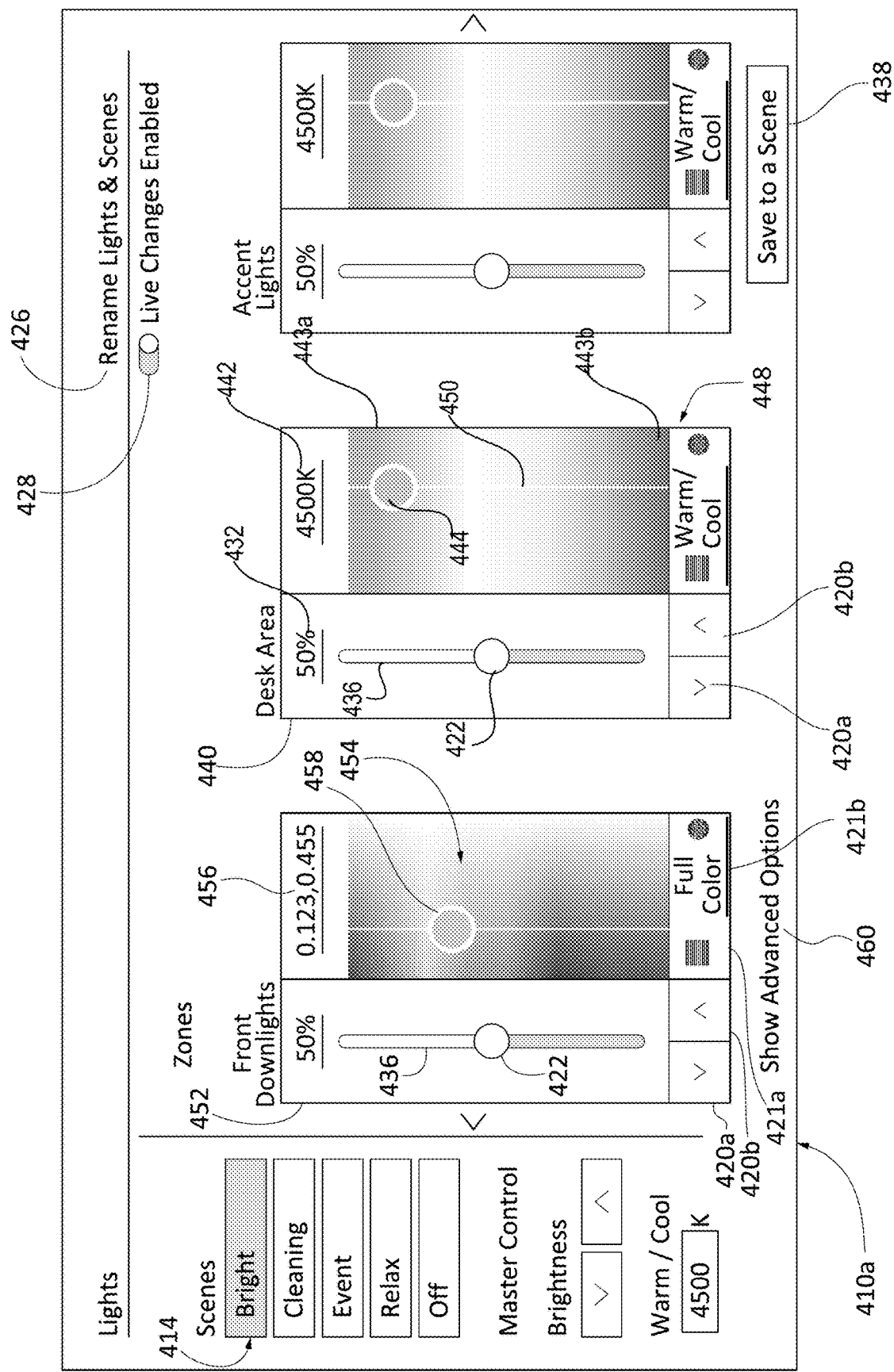

As described herein, the devices in a load control system may be grouped or organized by their respective location in a user environment and subsequently assigned to a zone (e.g., based on their function). Turning now for FIG. 4B, there is shown an example of the graphical user interface 410a that may be displayed by the control/configuration application to control the lighting intensity settings, color settings, and/or vibrancy settings defined for scenes (e.g., after selection of the scene indicator 412). The graphical user interface 410a may be provided for configuring scenes in response to the scene indicator 412 (shown in FIG. 4A), for example. As described herein, a scene may control one or more zones in a given location or area of a user environment. Thus, the control/configuration application may be configured to display the graphical user interface 410a (e.g., or another similar graphical user interface) such that a user is provided with the ability to configure or control devices assigned to each zone based on their respective functionality and/or capabilities. For example, as illustrated in FIG. 4B and as further described herein, the graphical user interface 410a may display different types of controls based on the functionality and/or capabilities of the devices assigned to each of the zones (e.g., the devices in the "Desk Area 1" zone are capable of adjusting their lighting intensity and thus control interface 418 is display, whereas the devices in the "Hallway zone" are capable of toggling between an on and off and thus the control interface 430 is displayed). The graphical user interface 410a may include scene icons 414. The scene icons 414 may indicate the scenes that are defined, e.g., for a particular area of the load control system. For example, referring to FIG. 4B, the defined scenes may include: "Bright," "Cleaning," "Event," "Relax," and "Off" Further, as described herein, each of these scenes may correspond to a respective button, for example, of a keypad that is located in given location or area of a user environment.

As described herein, the scenes defined for the load control system (e.g., or a certain area in the load control system) may be stored and/or maintained at a single device (e.g., a system controller) or across multiple devices (e.g., the system controller, and/or, the network device, one or more control source devices, and/or one or more control target devices). When a scene is selected, one or more messages that include control instructions to control the loads as defined by the scene may be transmitted. In addition, the scenes defined for the area of the load control system may be selected via the graphical user interface 410a. The scenes (e.g., and their respective configurations) may be communicated to a system controller. Each of the scenes may be separately configurable and/or programmable via the graphical user interface 410a. Further, the graphical user interface may indicate the scene that is presently being configured/programmed and/or is currently active may be indicated. For example, referring to FIG. 4B, the "Bright" scene may be the scene that is presently being configured/activated (e.g. as indicated by the "Bright" scene icon being highlighted).

After configuration, a scene may be activated via a graphical user interface, such as the graphical user interface 410a (e.g., or a different graphical user interface), or a control device, such as the remote-control device 122 and/or keypad. For example, as described herein, the control device may include one or more buttons, each of which may correspond to a configured scene. The scene may then be activated by actuating (e.g., pressing) the button that corresponds to that scene. Upon activation, the configurations defined for the scene may be retrieved. For example, the configurations may be stored and retrieved from the control device, and/or a system controller, such as the system controller 150, or the load control device(s)/lighting control device(s) themselves. Also, or alternatively, the configurations for the scene, or portions thereof, may be stored and retrieved from multiple devices. For example, part of the configuration for a scene may be stored and retrieved from the system controller, and another part of the configuration for the scene may be stored and retrieved from the control device and/or the load control device(s)/lighting control device(s) themselves. After the configuration for the scene has been retrieved, one or more messages including control instructions may be transmitted to control one or more load control devices based on the configuration of the scene.

The load control devices configured for being controlled in a given scene may be organized or grouped into one or more zones. For example, the load control devices may be organized or grouped into a given zone based on their location, function, etc. Referring to FIG. 4B, for example, the "Bright" scene may include lighting control devices that are organized or grouped in a "Front Downlights" zone, a "Desk Area" zone, and an "Accent Lights" zone. Each of the zones may be separately controllable via a respective control interface. For example, the "Desk Area" zone may be controlled by the control interface 440 and the "Front Downlights" zone may be controlled by control interface 452.

The control interface of a respective zone may vary based on the load control device and/or lighting loads associated with the zone. For example, referring to FIG. 4B, the load control device(s) associated with the "Desk Area" zone may be a dimmer. Accordingly, control interface 440 may be configured to include one or more control interfaces to enable the user to control the dimmer. For example, as illustrated in FIG. 4B, the control interface may include an indicator 432, control line 436, and/or actuators 422, 420a, 420b. The indicator 432 may indicate the configured lighting intensity for the "Desk Area" zone (e.g., 50% as shown in FIG. 4B). As described herein, the actuator 422 may be actuated along the control line 436 to control the lighting intensity of the "Desk Area" zone. Similarly, actuator 420a may be actuated to decrease the lighting intensity of the "Desk Area" zone and actuator 420b may be actuated to increase the lighting intensity of "Desk Area" zone. Each of actuators 420a and 420b may be configured to increase/decrease the intensity by a set amount, such as 1%.

The control/configuration application may be configured to allow the user to rename a scene and/or the corresponding zones. For example, as illustrated in FIG. 4B, the graphical user interface 410a may include a rename light and scenes button 426. The rename light and scenes button 426 may be actuated to adjust the name of the zones and/or scenes defined for the area of the load control system. The graphical user interface 410a may include a save scene button 438, which, when actuated, may save the configuration of and/or changes to a respective scene.

The control/configuration application may be configured to provide the user real-time feedback of the settings being configured. For example, the graphical user interface 410a displayed by the control/configuration application may include a "Live Changes Enabled" actuator 428. When the Live Changes Enabled actuator 428 is enabled (e.g., as show in FIG. 4B), the lighting controls that are defined by the user via the graphical user interface 410a may be present at the respective lighting control devices in the load control system. For example, control instructions that indicate the defined lighting intensities may be transmitted to the respecting lighting control devices, and the lighting control devices may transition to indicate the lighting intensities. In response, the user may be provided with live and real-time feedback of the defined lighting intensities. When the "Live Changes Enabled" actuator 428 is disabled, the lighting controls may be defined by the user via the graphical user interface 410a and may be saved for being implemented in the defined zones in the area when the defined scene is triggered (e.g., via occupancy event/condition, actuation of a button, a scheduling event, etc.).

A scene may define the lighting intensity settings, color settings (e.g., x-y chromaticity values or CCT values), and/or vibrancy settings (e.g., vibrancy mode and/or vibrancy value) of a respective zone, and the control/configuration application may provide the user with the ability to configure the lighting intensity settings, color settings (e.g., x-y chromaticity values or CCT values), and/or vibrancy settings (e.g., vibrancy mode and/or vibrancy value) defined by the scene (e.g., to a user selected color point along the black-body curve).

The graphical user interface 410a may include a control interface 440 to control the lighting intensity and color temperature defined for a zone (e.g., the "Desk Area" zone as shown in FIG. 4B), for example, upon detecting that the user has selected the warm/cool actuator 446. The control interface 440 may include an indicator 442, a palette 448, an actuator 444, and/or a control line 450. The palette 448 may show a range of colors ranging from cool colors 443a at the top of the palette 448 to warm colors 443b at the bottom of the palette 448. As described herein, these colors may correspond to colors that lie along the black-body curve. For example, the palette 448 may show colors along a range of correlated color temperatures (CCTs) ranging from "warm white" (e.g., roughly 2600 K-3000 K) at 443b, to "neutral white" (e.g., 3000 K-5000 K) to "cool white" (e.g., 5000 K-8300 K) at 443a. As one example, the range CCTs may be from 1400K to 7000K, although other examples are possible.

Superimposed over the palette 448 may be an actuator 444. The actuator 444 may be movable/slide-able (e.g., here vertically movable) along the control line 450 to select different CCTs along the black-body curve. Accordingly, actuator 444 may allow a user to configure the lighting control device(s) such that the lighting load(s) produces colored light at a color point along the black-body curve. Assuming the lighting load(s) is producing light at a color point along the black-body curve at a time prior to actuator 444 being selected by the user, the control/configuration application may display actuator 444 at a relative point along control line 450/palette 448 as shown in FIG. 4B to indicate the color being produced by the lighting load(s). Similarly, indicator 442 may also display the corresponding color. Alternatively, if the lighting load(s) is not configured to produce light at a color point along the black-body curve (or is out of range of palette 448) at a time prior to actuator 444 being selected by a user, the control/configuration application may not display actuator 444. The actuator 444 may only appear once the user interacts with palette 448. And, as described herein, if the "Live Changes Enabled" actuator is enabled, the lighting loads may adjust their respective color in real time as the actuator 444 is moved across the control line 450.

The control interface 440 may include similar indicators and/or controls for controlling the intensity of the lighting control devices as illustrated in the control interface 418 shown in FIG. 4B. For example, the control interface 440 may include an indicator 432, control line 436, and/or actuators 422, 420a, 420b. The control interface 440 may allow the user to control the intensity and color temperature of lighting control devices in the defined zone.

A scene may provide for full color control of a respective zone, and the control/configuration application may provide the user with the ability to configure the full color settings defined by the scene. Accordingly, the graphical user interface 410a may be displayed by the control/configuration application to control the full color defined by a zone for the respective scene. The graphical user interface 410a may include a control interface 452 to control the lighting intensity and full color for a zone (e.g., the Front Downlights zone as shown in FIG. 4B). The control interface 452 may include control line 436 and actuators 422, 420a, 420b to control the lighting intensity of the "Front Downlight" zone. The control interface 452 may include a palette 454 showing a plurality of colors that lie within the color gamut formed by the various RGBW LEDs, for example, that make up the one or more lighting loads in the defined zone.

The one or more lighting loads in the defined zone may be controlled to provide full color and/or the warm/cool colors on the black-body curve. The control interface 452 may include a warm/cool color tab 421a and full color tab 421a. Selection of the warm/cool color tab 421a may display a palette in the control interface 452 that is similar to the palette 448 shown in the control interface 440 for the "Desk Area" zone to allow the user to define warm/cool color temperatures for the lighting control devices in the "Front Downlights" zone. Selection of the full color tab 421b, however, may display the palette 454 that provides colors available for full color control.

Similar to selecting a certain CCT, a user may select a location within the color palette 454 to define a color for the corresponding zone. As illustrated in FIG. 4B, the color palette 454 may include a plurality of colors that lie within the color gamut formed by the various RGBW LEDs, for example, that make up the lighting load(s) such that different color bands are displayed from top to bottom (e.g., red, yellow, green, teal, blue, purple, etc.). The color palette 454 may be displayed such that a user may select the x-y chromaticity coordinates corresponding to a given color. The color palette 454 may include white colors on the far-right side of the color palette 454, though the white colors may be located in other areas of the color palette 454.

As illustrated in FIG. 4B, the control interface may identify a user selection on the color palette 454. Superimposed over the palette 454 may be an actuator 458 that identifies a user selection within the color palette 454. The actuator 458 may be movable/slide-able (e.g., up, down, left, right, etc.) by the user to any of a plurality of locations/colors within palette 454. The graphical user interface 410a may display together with actuator 458 two perpendicular control lines that intersect at the center of the actuator 458. These control lines and the intersection point may move with the actuator 458 as it is moved by a user within palette 454, or as the user selects another location within the palette 454 independently. These control lines may assist the use in moving actuator 458 either horizontally or vertically or diagonally, etc. Accordingly, actuator 458 may allow a user to configure the zone such that the zone produces colored light at a color point that lies within the color gamut formed by the various RGBW LEDs, e.g., that make up the one or more lighting loads of the defined zone.

The color gamut formed by the various RGBW LEDs that make up the lighting load may be referenced using an x-y chromaticity coordinate system. Accordingly, the control interface 452 may include a coordinate indicator 456. The coordinate indicator 456 may illustrate the x-y chromaticity coordinates of the selected color. For example, referring to FIG. 4B, the color selected for the Front Downlights zone may be indicated by the x-y chromaticity coordinates [0.123, 0.455].

Upon the full color tab 421b being actuated by a user from control interface 452, or prior to the color being defined for the zone, the control/configuration application may initially display control interface 452 without actuator 458 and without the control lines, as shown in FIG. 4B. Upon the user performing a selection within the palette 454, the graphical user interface 410a may display actuator 458 and the control lines at a relative point within palette 454 to indicate the color being defined and/or produced by the one or more lighting loads within the zone.

The control/configuration application may provide a user with the ability to configure advanced options for a scene (e.g., timing options, such as fade and/or delay times, and vibrancy). Accordingly, graphical user interface 410a displayed by the control/configuration application may receive an indication from the user to allow for the configuration of advanced options. For example, as illustrated in FIG. 4B, the graphical user interface 410a may include an icon such as a "Show Advanced Options" button 460, which, when actuated by the user may cause the graphical user interface 410a to display advanced options for control of a scene.

Figure 4C:
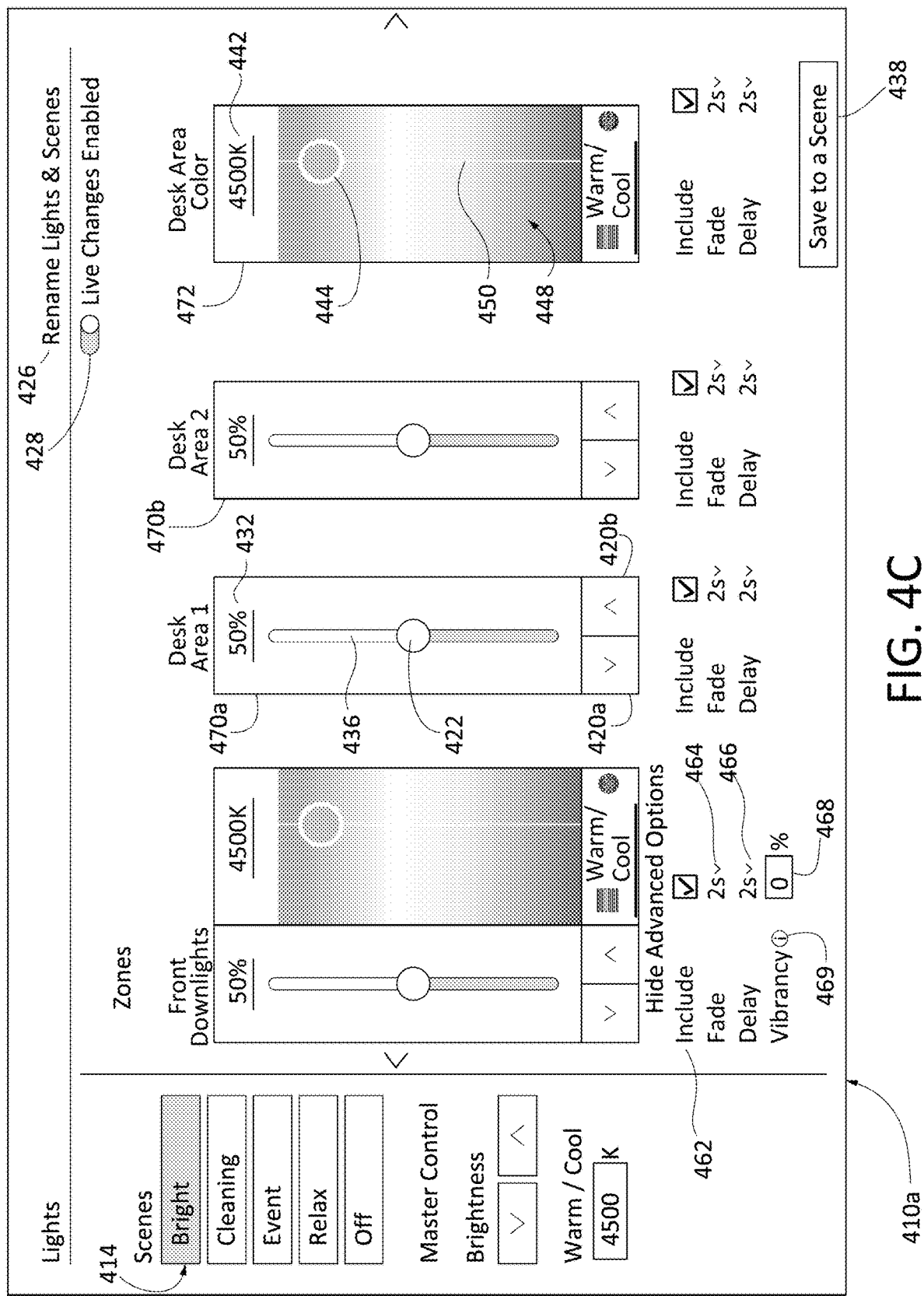

FIG. 4C shows an example of the graphical user interface 410a displaying advanced options for control of a scene. As described herein, control/configuration application may display the graphical user interface 410a in response to receiving a user indication to configure advanced options (e.g., actuating or selecting the "Show Advanced Options" button 460). Further, as shown in FIG. 4C, the graphical user interface 410a may include one or more interfaces to configure the advances options, such as: an Include box 462, Fade time box 464, Delay time box 466, and/or Vibrancy selector 468 for each of the respective zones in the area. When the Include box 462 is selected (e.g., as shown in FIG. 4C), the respective zone may be included in the scene. For example, referring to FIG. 4C, the Front Downlight and Desk Area zone may be included in the Bright scene, and when the Bright scene is activated the lighting control device(s) and/or lighting load(s) assigned to the Front Downlight and Desk Area zones may be controlled to the settings defined in the Bright scene. When the zone is included in the scene and the user selects the "Save to Scene" button 438, the lighting intensity and/or color temperature settings that are defined in the graphical user interface 410a may be generated and stored for controlling the zone in response to the scene being triggered. If, however, a zone is not included in a scene (e.g., because an indicator, such as the Include box 462, is not selected), the lighting control device(s) and/or lighting load(s) assigned to the zone may remain at their current settings. For example, the graphical user interface 410a may also include an indicator for each of the individual settings (e.g., lighting intensity, color) defined for a given zone. When an indicator for a respective setting is "included," the lighting control device(s) and/or lighting load(s) assigned to the zone may be controlled to defined value of that setting. Similarly, when an indicator for a respective setting is not "included," the lighting control device(s) and/or lighting load(s) assigned to the zone may remain unchanged when the scene is activated.

The control/configuration application may further provide the user with the ability configure the vibrancy settings (e.g., vibrancy value) defined by a scene for a respective zone. For example, the control/configuration application may display a graphical user interface 410a that includes a "Vibrancy" selector 468, which may be used by the user to select and/or configure the vibrancy for a particular zone within a scene. As indicated above, the vibrancy may not change (or substantially change) the color point/chromaticity coordinates of the color being produced by the lighting load. The vibrancy may, however, alter the contribution of each of the RGBW LEDs, for example, in generating the colored light, which may include reducing the intensity/contribution of the white LED(s) for example, thereby making certain objects in a space appear more vibrant.

The vibrancy may adjust the wavelength of the light emitted by the zone, which may affect the color of the light (e.g., the reflected light) on objects within the zone. Increases and/or decreases in vibrancy may increase/decrease saturation of the color of objects in the area without changing the color of the light when the user looks at the light (e.g., the color of the emitted light). The Vibrancy selector 468 may allow the user to select a relative level of vibrancy (e.g., between zero and one-hundred percent) for increasing/decreasing the vibrancy of the one or more lighting loads for a defined zone. Changing the relative level of vibrancy may include decreasing or increasing the intensity of one or more white LEDs that make up the one or more lighting loads for a defined zone, thereby increasing or decreasing vibrancy, respectively. Changing vibrancy in this manner may also include changing the intensities of other LEDs (e.g., red, green, and/or blue LEDs) of the loads in the zone to maintain the same color output of the lighting loads (e.g., to maintain the same (or approximately the same) chromaticity coordinates of the mixed color output of the lighting loads in the zone). As described herein, the effect that configuring or controlling vibrancy (e.g., or the degree to which it can be controlled) has on the light emitted by the lighting load (e.g., the CRI value of the light emitted by the lighting load) may be based on the distance between the selected color setting and the black-body curve (e.g., or another predefined range of values, such as the color output of a white or substantially white LED within a respective lighting load). Vibrancy selector 468 may be referred to as an adjustable vibrancy mode.

Figure 4D:
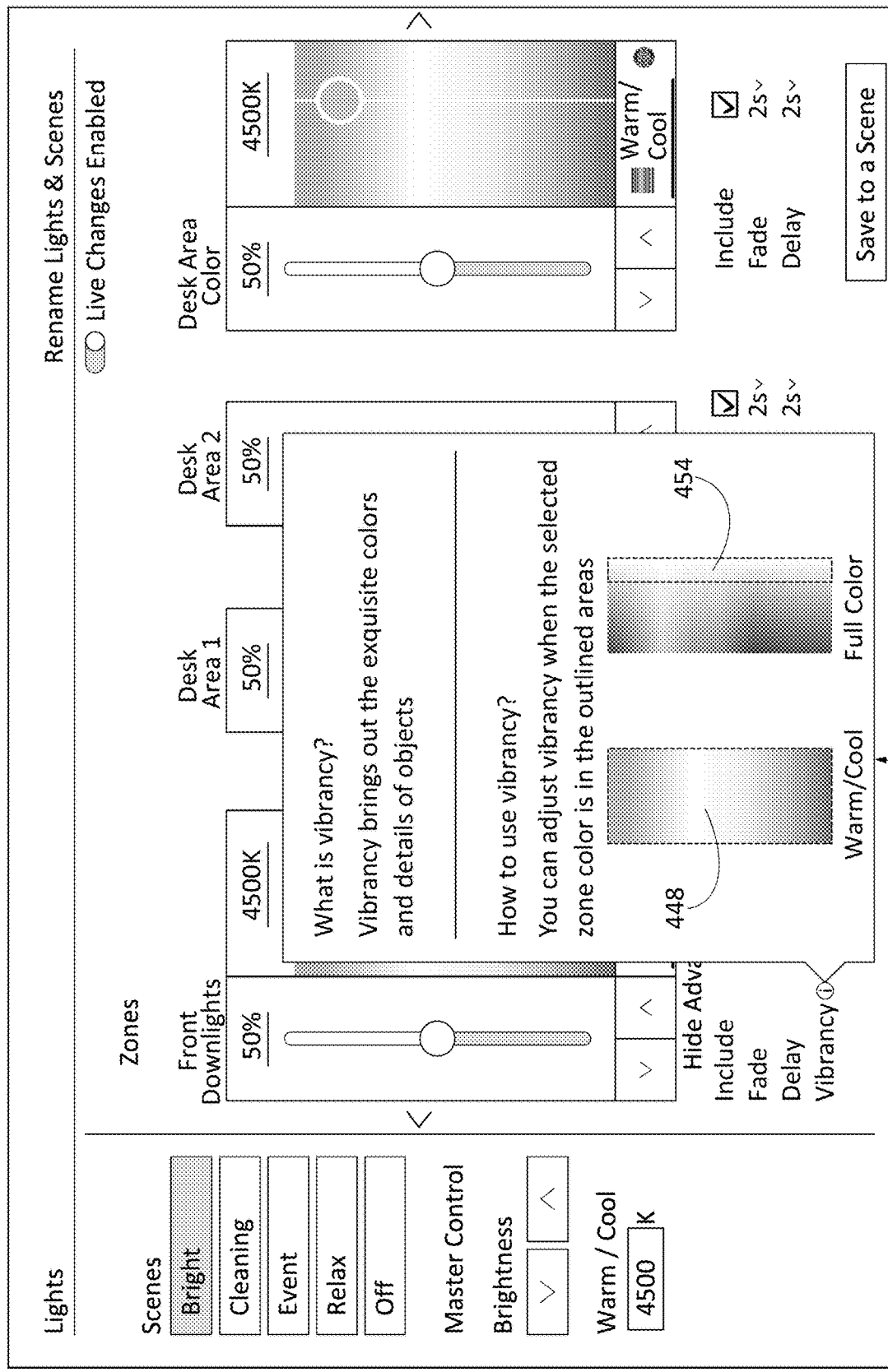

The control/configuration application may provide the user with information about how vibrancy may affect objects within the load control system. For example, the control/ configuration application may be configured to display an information button 469, which may be selected by a user. In response to selecting the information button 469, the control/configuration application may display information about the effects of vibrancy and how the vibrancy may be selected for a zone by the user. For example, FIG. 4D illustrates an example display 474 that may be shown if the user selects the information button 469.

The vibrancy may be changed for each of the zones that are configured for control along the black-body curve. The vibrancy may be enabled for zones that are defined for control using the warm/cool color temperature palette. The vibrancy may be controlled for lighting control devices in a zone that are being controlled along the black-body curve, as the lighting control devices may be using a number of colored LEDs to generate the color temperatures that are generated along the black-body curve, while also allowing variation in the use of different LEDs to increase the color being reflected to saturate the colors in the area (e.g., by reducing the intensities of the white LEDs). For zones that are being controlled using full color, the vibrancy control may be limited to colors that are within a predefined range of the colors. For example, referring to the color palette 454 shown in FIG. 4B, the vibrancy control may be limited to a predefined set of colors on the right side of the palette 454 indicated in FIG. 4B (e.g., based on a respective color's distance from the black-body curve, as described herein). The predefined colors may be the 10% or 20% of colors on the right side of the palette. Vibrancy control may be disabled or set to a default value when the user selects colors in the palette that are outside of this predefined set of colors, as it may not be possible to render these colors in multiple ways using, for example, different intensities of RGB and white LEDs. One will recognize that the ability to control or not control vibrancy for colors on the right of the palette may be based on the number of different color LEDs that comprise a lighting load(s).

Referring again to FIG. 4C, the graphical user interface 410a may control the lighting intensity of different zones of lighting control devices separately, while controlling the color temperature of the different zones in uniform. For example, the graphical user interface 410a may include control interfaces 470a, 470b to control the lighting intensities of two or more zones (e.g., Desk Area 1 and Desk Area 2) separately and control interface 472 to control the color temperature of the two or more zones in uniform. The control interfaces 470a, 470b may each include an indicator 432, a control line 436, and actuators 422, 420a, 420b to separately control the lighting intensity of their respective zones or lighting control devices. Similarly, the control interface 472 may include an indicator 442, a palette 448, an actuator 444, and/or a control line 450 to uniformly control the color temperature of the zones. Though control interface 472 includes a warm/cool color palette 448 for setting a color temperature along the black-body curve, full color control may similarly be implemented.

Figure 5A:
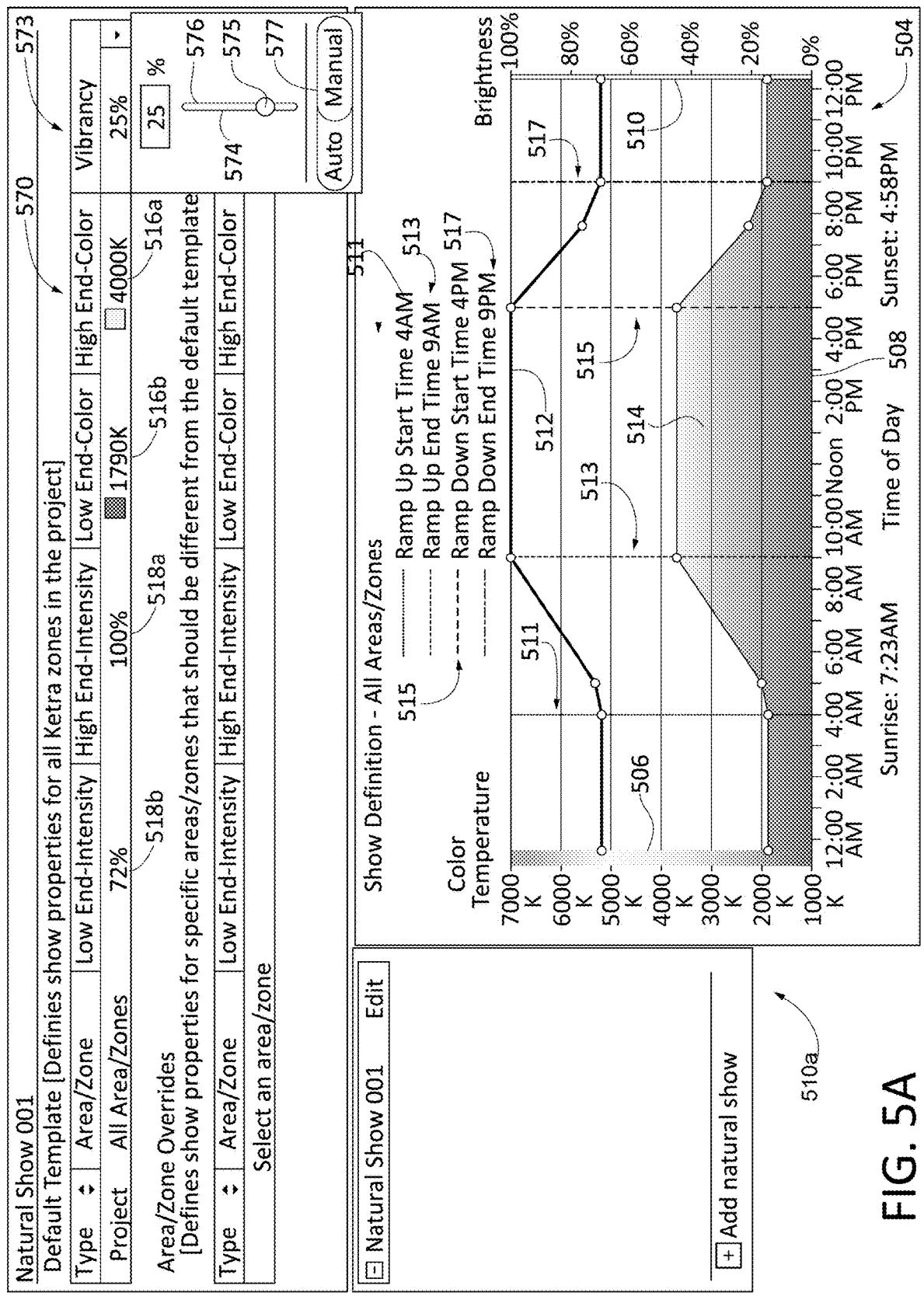
FIGS. 5A-5B show example graphical user interfaces of an application that may allow a user to determine information on and to control a load control system and/or control devices.
Figure 5B:
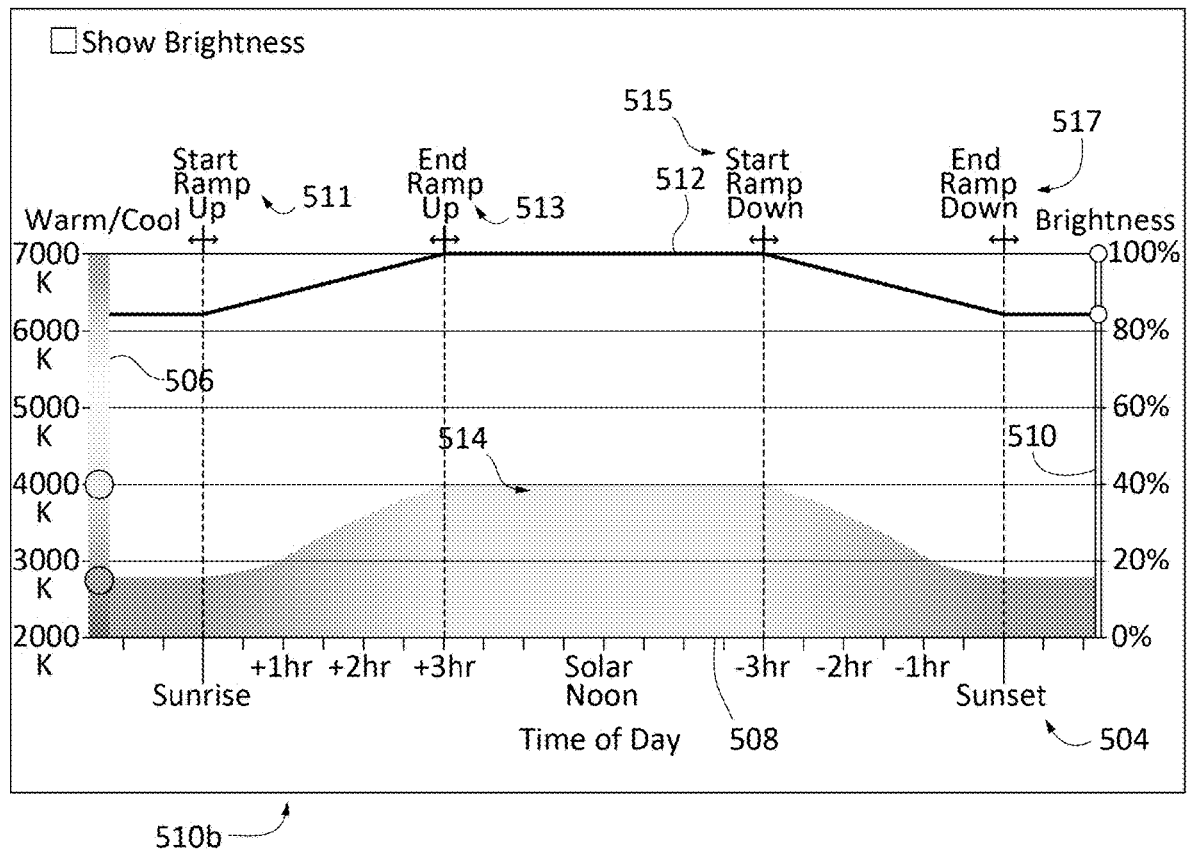

As described herein, the control/configuration application may provide a user with the ability to configure or control the lighting control devices in a zone over time. For example, the control/configuration application may display one or more graphical user interfaces that enable the user to change the color and/or lighting intensities of the lighting control devices. Further, when the lighting devices are configured to change in color and/or lighting intensity over time, the lighting devices may simulate a natural lighting functionality, which may be referred to herein as natural light and/or natural show. As described herein, natural lighting functionality may include controlling one or more lighting control devices/lighting loads to emulate a sunrise and a sunset, and may further include emulating natural light/sunlight between sunrise and sunset. As described herein, natural lighting or natural show may be enabled or disabled based on: a schedule (e.g., a time clock); an event (e.g., by an occupancy event triggered by an occupancy sensor); and/or by assigning and enabling natural show to a scene (e.g., assigning natural show to a scene that is enabled in response to pressing a button at a remote control device). FIGS. 5A to 5B illustrate example graphical user interfaces that may be displayed by the control/configuration application to configure or control natural show.

Referring now to FIG. 5A, there is shown another example graphical user interface 510a that may be displayed by the control/configuration application to a user via a network device. For example, the user may use the graphical user interface 510a to enable and/or control natural lighting functionality (also referred to herein as a natural show) for one or more lighting control devices (e.g., after selection of the natural show indicator 425 on the lights tile 417 shown in FIG. 4A or another graphical user interface). The natural lighting functionality may change the color temperature and/or lighting intensity of one or more lighting control devices in a preselected area to simulate a change in color temperature/lighting intensity of natural lighting over the course of a period of time (e.g., a day, a portion of a day, etc.). The network device may communicate with the lighting control devices, for example, via a system controller as described herein. For example, the natural lighting functionality may be defined at the network device and stored at the system controller and/or a control device and/or the lighting control devices for being implemented in the lighting control devices in a given location or area in the user environment and assigned to a certain zone(s). Further, the natural lighting functionality may be assigned to a scene and/or may be activated, for example, by pressing a button on a control device or the network device. Natural lighting functionality may include emulating sunrise, sunset, and natural light/sunlight there between. Upon displaying interface 510a, the control/configuration application may display a default configuration/previously defined configuration (either defined by the load control system or previously defined by a user, for example), and may further allow the user to modify the configuration.

As shown in FIG. 5A, graphical user interface 510 may display a graph 504. The graph 504 may include one or more x axes and/or y axes. For example, the graph 504 may include a color temperature axis 506, an intensity axis 510, and/or a time axis 508.

The color temperature axis 506 may represent a color temperature (CCT) to which one or more lighting control devices (e.g., one or more LED lights) within a zone (e.g., a room within a building) may be configured/controller. The color temperature axis 506 may be range of numbers of color temperatures along the black-body curve. For example, the color temperature axis 506 may range from 2000K to 7000K, or another range. Cooler color temperatures may be indicated with a cooler color (e.g., shades of blue to indicate cooler color temperatures). Warmer color temperatures may be indicated with a warmer color (e.g., yellow, orange, or red to indicate warmer color temperatures). The color temperature axis 506 may be located as a y-axis on the left-hand side of the graph, though the color temperature axis 506 may be located on other portions of the graph (e.g., the right-hand side of the graph).

The intensity axis 510 may represent a lighting intensity to which one or more lighting control devices within the zone may be configured/controlled. The intensity axis 510 may range from, for example, 0% to 100%. The intensity axis 510 may be located as a y-axis on the right-hand side of the graph, though the intensity axis 510 may be located on other portions of the graph (e.g., the left-hand side of the graph).

The time axis 508 may display a time of day in a number of predefined or user-defined increments. The length of the time axis 508 may represent the length of a day, or a portion of the day. For example, the time axis 508 may begin at midnight and end at midnight of the next day. In another example, the time axis 508 may represent a period of time over which the lighting control devices may be turned on, or the period of time that the natural lighting functionality may be enabled, such as a period of time between 6 AM and 6 PM.

The graph 504 may include an area 514 that displays a function of the color temperature of the lighting control devices/lighting loads at a given time of day. The area 514 may correlate with the color temperature axis 506. The area 514 may track the color temperature set for the lighting control devices at the corresponding times of day when the scene is configured. The colors of the area 514 may change as the color temperature value corresponding to the color temperature axis 506 changes to indicate the relative color temperature values under the area 514. In other words, according to this example, from left to right, the colors of the area 514 change from orange to yellow to orange, matching the vertical height of the area relative to the y-axis values.

The graph 504 may include an indicator that displays a function of the lighting intensity value of the lighting control devices at a given time of day. For example, the indicator that displays the lighting intensity value at a given time of day may be a bar, such as the bar 512. The bar 512 may correlate with the intensity axis 510. The bar 512 may track the intensity value for the lighting control devices at the corresponding times of day when the scene is configured. Providing a separate bar 512 for indicating the color temperature separately from the area 514 indicating the color temperature at a given time of day, along with the separate corresponding color temperature axis 506 and the intensity axis 510, may allow for easily identifying and implementing changes in intensity apart from the changes in color temperature for the natural lighting functionality.

Though the color temperature is illustrated in the area 514 and the lighting intensity value is illustrated with the bar 512, the color temperature and the lighting intensity value may be indicated in the same indicator in the graph. For example, the bar 512 may track the lighting intensity values at the given time of day, while the bar itself may reflect/include a defined/different color temperature for each respective time of day (e.g., warmer colors on color temperature axis 506 to reflect corresponding warm temperatures and cooler colors on the color temperature axis 506 to reflect corresponding cool color temperatures). The control interface 570 may include one or more high-end or low-end controls. For example, as shown in FIG. 5A, there may be a high-end color temperature box 516a and a low-end color temperature box 516b. The high-end color temperature box 516a and the low-end color temperature box 516b may allow the user to control/change/reconfigure the color temperature settings for the natural lighting functionality. For example, the high-end color temperature box 516a may represent a maximum (e.g., cooler) color temperature at which the lighting control devices may be set over a period of time measured in the time axis 508 (e.g., a day). The low-end color temperature box 516b may represent a minimum (e.g., warmer) color temperature that the lighting control devices be set over the period of time measured in the time axis 508 (e.g., a day). For example, the minimum color temperature may be 1790K and the maximum color temperature may be 4000K. The area 514 may have a minimum height of the minimum color temperature and a maximum height of the maximum color temperature.

As shown in FIG. 5A, the control interface 570 may include a high-end intensity controls, such as the high-end box 518a and a low-end intensity controls, such as the low-end intensity box 518b. The high-end intensity button 518a and the low-end intensity button 518b may allow the user to set/change/reconfigure the lighting intensity values of the lighting control devices over the period of time measured in the time axis 508 (e.g., a day). For example, the high-end intensity box 518a may represent a maximum lighting intensity value and the low-end intensity box 518b may represent a minimum lighting intensity value that the lighting control devices may be set over the period of time measured in the time axis 508 (e.g., a day). As shown in FIG. 5A, the minimum lighting intensity value may be 72% and the maximum lighting intensity value may be 100%. The bar 512 may have a minimum height of the minimum lighting intensity value and a maximum height of the maximum lighting intensity value.

One or more thresholds or triggers may be set on the time axis 508 for a starting time and/or an ending time at which changes may be made to the intensity and/or color temperature. For example, the color temperature of natural light provided in a space by the lighting control devices may start ramping up earlier in the day (e.g., toward a cooler color temperature/higher intensity—i.e., the configured high end values, such as to emulate sunrise for example) and may start ramping down later in the day (e.g., toward a warmer color temperature/lower intensity—i.e., the configured low end values, such as to emulate sunset for example). The thresholds may be indicated on the graph 504 by dotted vertical lines. For example, as shown in FIG. 5A, the graph 504 may include a "Start Ramp Up" threshold 511, an "End Ramp Up" threshold 513, a "Start Ramp Down" threshold 515, and an "End Ramp Down" threshold 517. Before the Start Ramp Up threshold and after the End Ramp Down threshold the color temperature and intensity may stay constant at the configured low end values. Between the End Ramp Up threshold and the Start Ramp Down threshold the color temperature and intensity may stay constant at the configured high end values.

Between the time of day indicated by the "Start Ramp Up" threshold 511 and the time of day indicated by the "End Ramp Up" threshold 511, the color temperature of the lighting control devices may increase from the minimum color temperature until the maximum color temperature is met. Between the time of day indicated by the "Start Ramp Up" threshold 511 and the time of day indicated by the "End Ramp Up" threshold 513, the lighting intensity value of the lighting control devices may increase from the minimum lighting intensity value level until the maximum lighting intensity value level is met. For example, the "Start Ramp Up" threshold 511 may be set to 4:00 AM and the "End Ramp Up" threshold 513 may be set to 9:00 AM. From the time period between the "Start Ramp Up" threshold 511 and the "End Ramp Up" threshold 511, the color temperature of the lighting control devices may increase from 2800K to 4000K and the lighting intensity value may increase from 85% to 100%.

Similarly, between the time of day indicated by the "Start Ramp Down" threshold 515 and the time of day indicated by the "End Ramp Down" threshold 517, the color temperature and/or the lighting intensity value of the lighting control devices may decrease from the maximum color temperature/lighting intensity value until the minimum color temperature/lighting intensity value are met. For example, the "Start Ramp Down" threshold 515 may be set to 4:00 PM and the "End Ramp Down" threshold 517 may be set to 9:00 PM. Between the time of day indicated by the "Start Ramp Down" threshold 515 and the time of day indicated by the "End Ramp Down" threshold 517, the color temperature of the lighting control devices may decrease from 4000K to 2800K and the lighting intensity value may decrease from 100% to 85%. The color temperature/lighting intensity value of the lighting control devices may change linearly, stepwise, according to a sigmoid function (e.g., as shown in FIG. 5A), etc. The time periods over which the color temperature/lighting intensity value of the lighting control devices increases or decreases may be automatically set, or may be user-selected.

The graph 504 may be displayed with a default configuration for the natural show that may be modified by the user. The default configuration may be user defined or otherwise pre-stored. The thresholds and time periods over which the color temperature/lighting intensity value of the lighting control devices increase or decrease may default to emulate a sunrise/sunset times at the location of the lighting control devices, and may be modified by the user. The lighting control devices may have a default minimum/maximum color temperatures and/or a default minimum/maximum lighting intensity values. The default color temperature settings and/or lighting intensity values may depend on the types of lighting control devices implemented in the predefined zone or area. Again, the default values may be modified through interface 510a.

Although not shown in FIG. 5A, after the color temperature, lighting intensity, thresholds, and/or time period(s) have been set, the user may save the settings by selecting a save button. The save button may save the current settings to the predefined area for which the settings have been selected. The save button may save the settings to areas that have been defined in the load control system with a similar area type and/or similar lighting control devices (e.g., area identifiers and/or device identifiers). The settings may be sent to a system controller for automatically controlling the lighting control devices in the area/areas according to the settings, while the natural lighting functionality is enabled. The natural lighting functionality may be overridden by other events (e.g., actuation of buttons for lighting control, occupancy/vacancy events, scheduled events, etc.), but may return to the stored settings for the natural lighting functionality after a period of time. When the control of the natural lighting functionality is implemented/configured the current time may be referenced for setting the color temperature and/or lighting intensity value for the current time. The natural lighting functionality may then continue from that time.

Graphical user interface 510a may also include a control interface 570. The control interface 570 may include a vibrancy box 573 to select the vibrancy settings for the natural show. As shown in FIG. 5A, the actuation of the vibrancy box 573 may cause the control interface 570 to display an "Auto/Manual" actuator 577. If, for example, the "Auto/Manual" actuator 577 is set to "Manual" (e.g., adjustable vibrancy mode is selected or enabled), as illustrated in FIG. 5A, the lighting devices in the zone may be configured to the adjustable vibrancy state/mode and the vibrancy box 573 may include an indicator that displays the range of adjustable vibrancy values, such as a vibrancy bar 574. For example, the vibrancy bar 574 may include an actuator 575 and/or a control line 576. The actuator 556a may be superimposed over the control line 576. The actuator 575 may be movable/slide-able (e.g., here vertically movable) along the control line 576 to select different vibrancy values along the control line 576. The vibrancy box 573 may include a text box that allows the user to input the vibrancy value and/or that reflects the vibrancy value selected by the user with the actuator 575. As described herein, when the vibrancy is set to "Manual" (as shown), the user may adjust the vibrancy settings (e.g., the intensity/contribution of the white LED(s)), and when the Vibrancy is set to "Auto" the CRI value of the emitted light may be optimized towards or above a target CRI value.

Increasing/decreasing vibrancy using the vibrancy bar 574 when in the adjustable vibrancy mode may increase/decrease the apparent saturation of the color of objects in the space without changing (or substantially without changing) the color setting of the lighting control devices. Moving the actuator 575 upwards along the vibrancy bar 574 may increase the vibrancy of the lighting control devices for a selected color setting/CCT value as the color setting/CCT value changes over time. As the vibrancy of a lighting control devices is increased, the contribution of the white, or substantially white, LED(s) (e.g., yellow and/or mint green LED) of the lighting loads may decrease (e.g., given a certain color point and/or CCT), while increasing one or more of the RGB LEDs to maintain the color setting and/or lighting intensity setting of the light emitted by the entire lighting load while increasing saturation. Similarly, moving the actuator 575 downwards along the vibrancy bar 574 may decrease the vibrancy value of the lighting control devices. In addition, as the vibrancy value of the lighting control devices is decreased, the contribution of the white, or substantially white, LED(s) of the lighting control devices may increase (e.g., given a certain CCT) and correspondingly decreasing the intensity of one or more of the RGB LEDs, while maintaining the color setting and/or intensity of the light emitted by the entire lighting load.

The selected adjustable vibrancy value may then be applied to the lighting loads over the time axis 508 based on the configured intensity and/or color of the natural show. For example, referring again to FIG. 5A, the lighting loads may be set to an adjustable vibrancy value of 23% based on the configured color or intensity over the day. One will appreciate, however, that although the selection of the adjustable vibrancy value may remain the same over the period of time, the intensity or contribution of the white LED in the lighting may differ based on the selected color setting.

Although not shown in FIG. 5A, the "Auto/Manual" actuator 577 may also be set to "Auto" (e.g., auto vibrancy is enabled). When the "Auto/Manual" actuator 577 is set to "Auto," the lighting control devices may be configured to the auto vibrancy mode and the control/configuration application may automatically determine the vibrancy value of the lighting control devices based on the selected color setting and/or intensity value. For example, the automatically determined vibrancy value may be based on a distance of the selected color setting for the lighting load is from the blackbody curve on the color spectrum. However, as natural show changes color temperature or CCT values over time, the selected color settings for natural show may be CCT values on the black-body curve (e.g., the distance between the select color setting and the black-body cure is zero or substantially zero). The automatically determined vibrancy value may be set to a predefined value that results in the emission of light from the lighting load at or above the target CRI value at the selected CCT value. That is, the control/configuration application may determine a respective vibrancy value for each of the selected color settings over the period of time to achieve the target CRI for the given color setting at that time. As described herein, however, this automatically determined vibrancy value may depend on the individual LEDs within the lighting load (e.g., based on the color of each of the individual LEDs that make up the lighting load).

In certain instances (e.g., for certain color settings or CCT values) the CRI value may be unable to be a value that is greater than or equal to the target CRI value. In those instances, the "Auto/Manual" actuator 577 being set to "Auto," may cause the lighting loads to automatically set the vibrancy so as to increase the CRI value towards (e.g., as close as possible to) the target CRI threshold.

When the "Auto/Manual" actuator 577 is set to "Auto" the lighting loads in a zone may be set to an auto vibrancy mode, where the vibrancy value may be automatically determined and/or may not be configurable by the user. For example, the control line 576 and vibrancy bar 574 may be disabled (e.g. grayed out and/or non-configurable) when the "Auto/Manual" actuator 577 is set to "Auto," and may be enabled (as shown in FIG. 5A) when the "Auto/Manual" actuator 577 is set to "Manual." Further, when the "Auto/Manual" actuator 577 is set to "Auto," the vibrancy value of the lighting loads may be automatically determined such that the lighting loads emit light at a CRI value that is greater than or above a target CRI value based on the selected CCT value for given time of the natural show. That is, when the "Auto/Manual" actuator 577 is set to "Auto," the control/configuration application may automatically determine vibrancy values as the CCT values indicated by the area 514 change over the time axis 508. As a result, when the "Auto/Manual" actuator 577 is set to "Auto," the user may configure the desired CCT values over a period of time via natural show, and the control/configuration application may automatically determine respective vibrancy values such that, over the period of time, the lighting load emits light at a CRI value that is at or above a target CRI value.

As illustrated in FIGS. 5A and 5B, the CCT value during a natural show may change over a period of time (e.g., as shown by the are 514). For example, the CCT value may start off flat at a low-end color temperature (e.g., as indicated by low-end color temperature box 516$b$ for an amount of time, then ramp up to a high-end color temperature value (e.g., as indicated by the high-end color temperature box 516$a$) for an amount of time, stay flat at the high-end color temperature for an amount of time, ramp down to the low-end color temperature for an amount of time, and finally stay flat at the low-end color temperature for an amount of time. When the auto vibrancy mode is enabled for natural show, the control/configured application may automatically determine respective vibrancy values for both the select low-end color temperature and high-end color temperature such that light is emitted at a CRI value that is greater than or equal to a target CRI value. In addition, the control/configure application may automatically determine respective vibrancy values as the CCT values ramp up and ramp down such that as the lighting load ramps up and ramps down, light is emitted at a CRI value that is greater than or equal to the target CRI value.

The user may set the time axis 508 according to a sunrise/sunset time. As shown in FIG. 5B, for example, setting the time axis 508 according to a sunrise/sunset time may cause the ramp up thresholds 511, 513 and/or the ramp down thresholds 515, 517 to be automatically set to emulate sunrise/sunset times, respectively. The sunrise/sunset times may be automatically set to/change with the sunrise/sunset for a defined location, time of year, etc. For example, the sunrise/sunset times may be automatically set to/change with the local time for sunrise/sunset where the load control system is located. The user may adjust the thresholds 511, 513, 515, 1317 relative to sunrise and sunset. The time axis 508 may include a predefined amount of time before and/or after the sunrise sunset for the location. The color temperatures and/or lighting intensity value may also be set based on the location, time of year, etc.

FIGS. 6A to 6I illustrate a further graphical user interface 600. The graphical user interface 600 may be displayed by the control/configuration application 203. As described herein, the control application may be running on a network device local to the load control system (e.g., as illustrated in FIG. 1A) and/or an external network device (e.g., which may be accessed via the cloud). The graphical user interface 600 may be displayed and/or used to configure the lighting loads at a user's residential home, commercial office, building, etc. The graphical user interface 600 may be displayed after one or more areas and/or zones have been configured for the load control system (e.g., the user's residential home, commercial office, building, etc.). For example, the zone configuration may include assigning the zones to a certain area, assigning lighting control devices to the respective zones, and/or assigning/configuration of one or more control devices (e.g., a keypad).

Figure 6A:
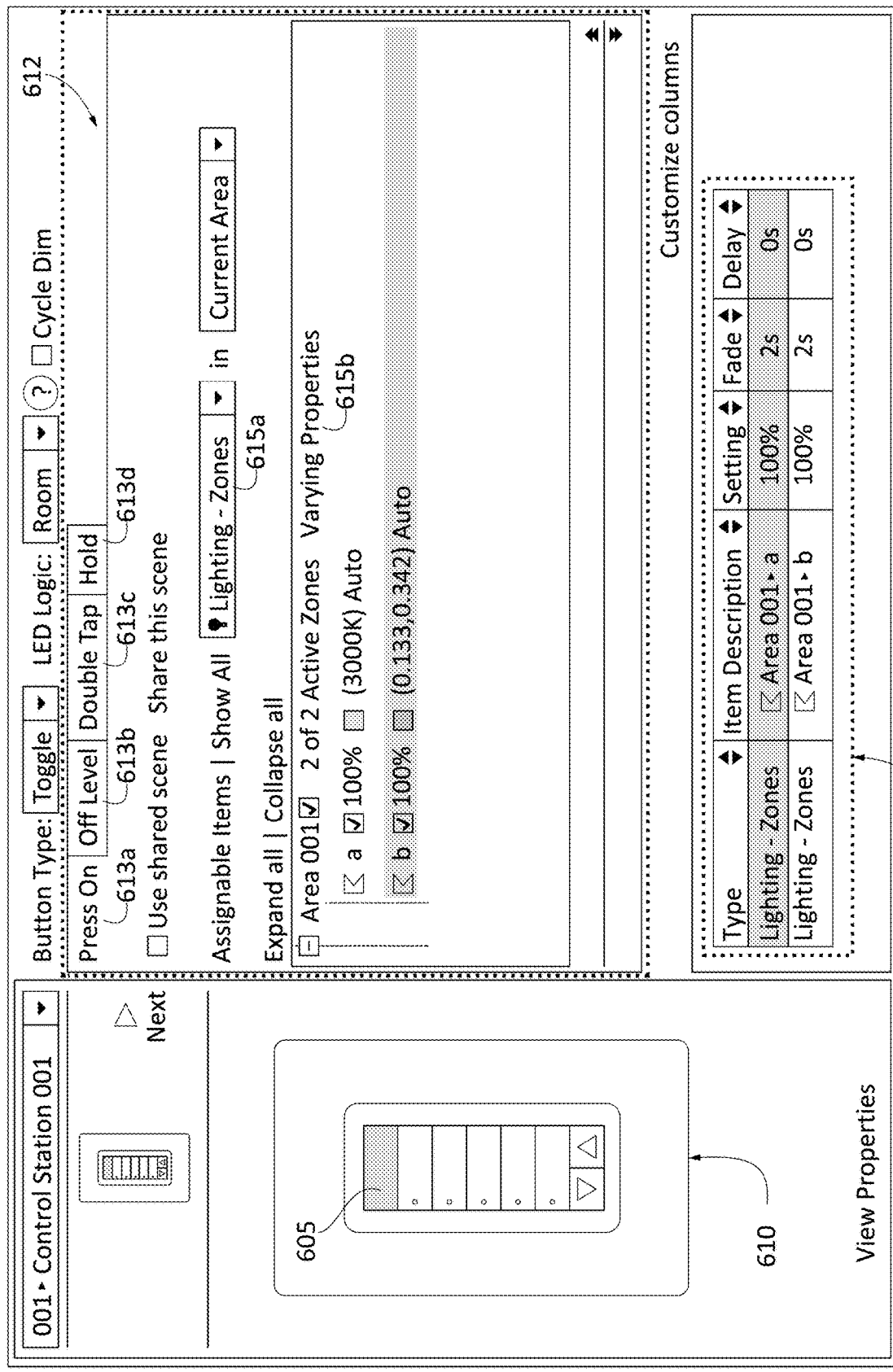
FIGS. 6A-6I show example graphical user interfaces of an application that may allow a user to configure a load control system and/or control devices.

As illustrated in FIG. 6A, the graphical user interface 600 may be used to configure an actuator 605 of a keypad 610. The keypad 610 may be a control device configured to control one or more lighting loads installed in a space. Also, or alternatively, the graphical user interface 600 may be used to configure a scene that may be actuated from a network device. For example, the scene configuration may be configured at the network device using the graphical user interface 600. The scene configuration may be stored at a system controller and enabled via the network device and/or enabled via a timeclock run at the system controller.

As described herein, a space may be divided into one or more zones. Referring now to FIG. 6A, the keypad 610 may control one or more lighting loads in the space referred to as "Area 001." In addition, "Area 001" may be divided into two zones for example: zone "a," and zone "b." Zones "a" and "b" may each include one or more lighting loads. Accordingly, the graphical user interface 600 may be used by a user (e.g., an installer of a load control system) to configure the lighting loads within "Area 001," zone "a," and/or zone "b." For example, the installer may use the graphical user interface 600 to configure how the lighting loads within "Area 001" are set in response to an actuating of the actuator 605. Although not shown in FIG. 6A, different combinations of areas and/or zones may be selected for configuration, depending on which actuator of keypad 610 is selected.

The graphical user interface 600 may include a configuration panel 612 for configuring the programming/configuration data for performing lighting control in response to actuations of the actuator 605. The configuration panel 612 may include a "Press On tab" 613$a$, an "Off Level" tab 613$b$, a "Double Tap" tab 613$c$, and a "Hold" tab 613$d$. Each of the respective tabs may be used to configure the settings for controlling the lighting loads in response to different user interactions of actuator 605. For example, the "Press On" tab 613$a$ may be used to configure the control of the lighting loads in response to a "Press On" user interaction (e.g., an actuation of the actuator 605 when the lighting loads are off). The "Off Level" tab 613b may be used to configure the control of lighting loads in response to an "Off Level" user interaction (e.g., an actuation of the actuator 605 when the lighting loads are on). The "Double Tap" tab 613c may be used to configure the control of lighting loads in response to a "Double Tap" user interaction (e.g., two successive actuations of the actuator 605). The "Hold" tab 613d may be used to configure the control of lighting loads in response to a "Hold" user interaction (e.g., an actuation and hold of the actuator 605 for a predefined period of time). The "Press On" configuration is described herein. Similar configurations may be performed for the other interactions.

The configuration panel 612 may include an assignable items drop down 615a. As illustrated in FIG. 6A, if the assignable items drop down 615a is set to "Lighting—Zones," the configuration panel 612 may display the lighting control settings defined for each zone, e.g., lighting loads for zone a and zone b within the space referred to as "Area 001." In addition, although FIG. 6A illustrates an example where the assignable items drop down 615a is set to "Lighting—Zones," assignable items drop down 615a may be set to other items, such as Shade Groups, Motors, HVAC Zones, Contact Closures, Devices, Timeclocks, for example. Accordingly, the assignable items drop down 615a may be used to perform other forms of load control configuration (e.g., enable an HVAC zone, control motorized shades, etc.) in response to an actuation of the actuator 605. As described herein, the spaces, load control devices and/or zones may have been previously configured.

The display may show the current configuration of the zones when actuation of actuator 605 (e.g., in this case, for a "Press On" interaction). Here, the lighting loads in zone a may be configured to a 100% intensity level and a CCT of 3000K in response to a "Press On" user interaction of actuator 605. Similarly, zone b may be configured to a 100% intensity level and the color point (0.133, 0.342) in response to a "Press On" user interaction of actuator 605. The configuration of each zone may be a default configuration (e.g., based on the lighting control devices and/or lighting loads). The configuration of each zone may be user-defined.

The configuration panel 612 may display a "Varying Properties" indication 615b. The "Varying Properties" indication 615b may, when displayed, indicate to a user that the selected zones within a space have divergent configurations. For example, referring to FIG. 6A, as zone a and zone b are selected within the space "Area 001" (as shown by the check box) and zone a and zone b have different configurations (e.g., zone a is set to a CCT of 3000K and zone b is set to the color point [0.133, 0.342]), the configuration panel 612 may display the "Varying Properties" indication 615b. In addition, as illustrated in FIG. 6A, the check marks to the left of the respective zones may indicate that the actuator 605 is configured to control zone a and zone b. Unchecking a zone may cause the zone to be unaffected by an actuation of the actuator.

The graphical user interface 600 may include a summary panel 614. The summary panel may provide a summary of the settings configured in the configuration panel 612 for a given context. For example, when the user is configuring the actuator 605, the summary panel 614 may provide a summary of the historical configurations defined for the actuator 605. The summary may provide a user of the graphical user interface a summary of the lighting control settings that were configured for the identified actuator 605 via the configuration panel 612. As additional zones are configured for the actuator 605 in the configuration panel 612, the zones may be added in ascending or descending order to the summary panel 614. For example, zones may be added in the order that they are programmed by the user of the graphical user interface 600. In addition, after the zones are added, they may be sorted. The summary panel 614 may allow the user of the graphical user interface 612 to change and/or update the setting defined for the actuator being configured (e.g., the actuator 605 as illustrated in FIG. 6A). For example, as illustrated in FIG. 6A, the user may have previously configured the actuator 605 to control two zones: the configurations for zones a and b in Area 001 may include a 100% setting, a 2 second fade, and a 0 second delay time.

Figure 6B:
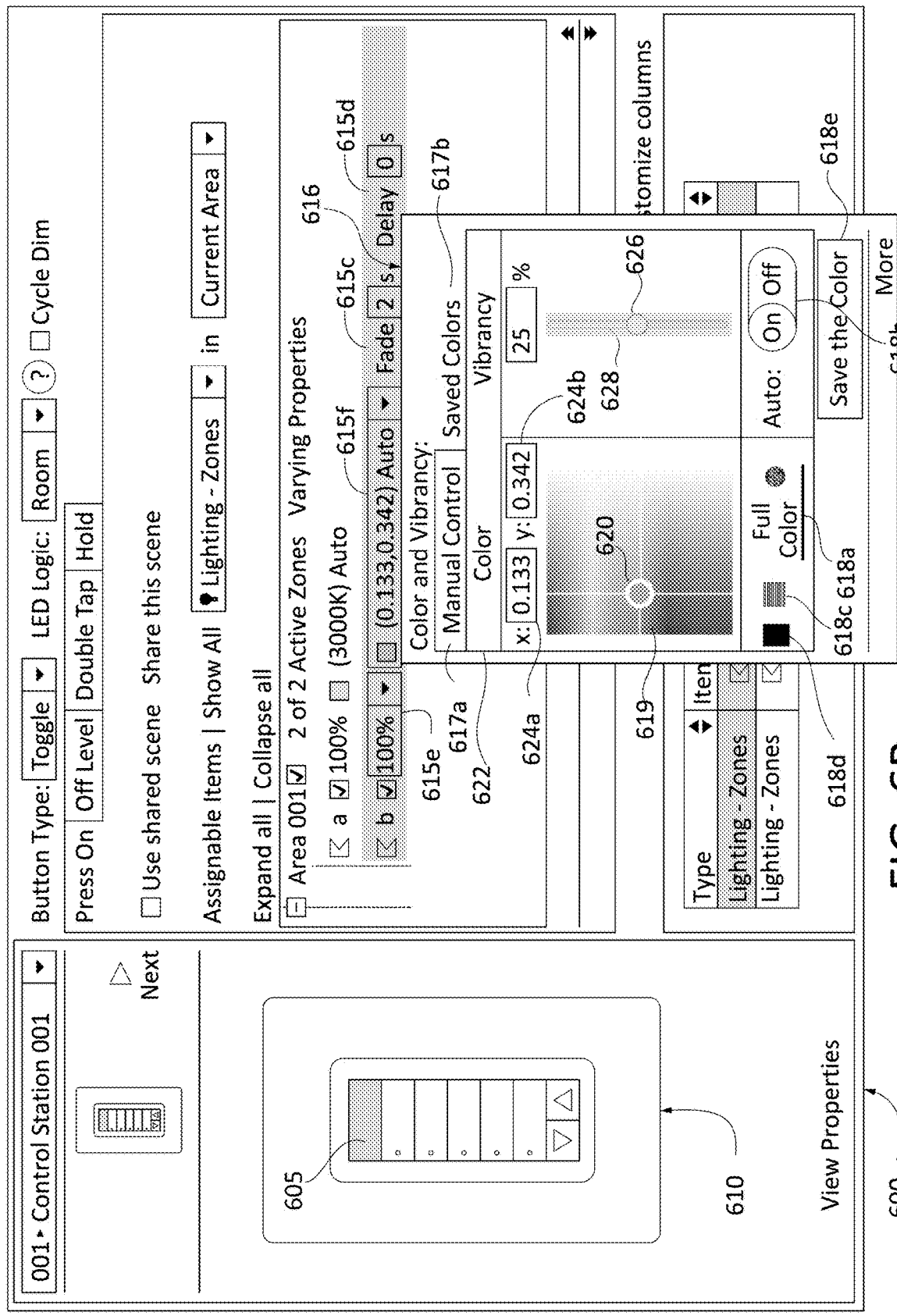

Referring now to FIG. 6B, the graphical user interface 600 may enable adjustment of the settings for configuring lighting control devices in a zone after selection of the zone by the user. For example, the user may select zone b and the graphical user interface 600 may enable configuration of the lighting intensity settings (e.g., lighting intensity value), for example via the intensity drop down 615e, color settings (e.g., x-y chromaticity or CCT values), for example, via the color drop down 615f, fade rate (e.g., via the fade rate box 615c), and/or delay (e.g., via the delay box 615d) in response to a user performing a press on of actuator 605. After selection of the color dropdown 615f for zone b, the graphical user interface 600 may display a "Color and Vibrancy" panel 616. The configuration panel 612 and/or the summary panel 614 may be overlaid by the "Color and Vibrancy" panel 616. The "Color and Vibrancy" panel 616 may be displayed when a certain zone is being configured (e.g., zone b as illustrated in FIG. 6B). The "Color and Vibrancy" panel 616 may be displayed when the color and/or vibrancy of the lighting loads within a certain zone are being configured. Although not show in FIG. 6B, the user may configure the zone by selecting a pre-defined configuration from a dropdown list of pre-defined configurations.

The "Color and Vibrancy" panel 616 may display a control interface 622. The control interface 622 may provide the user with the ability to configure a respective zone. The control interface 622 may include a "Manual Control" tab 617a and a "Saved Colors" tab 617b. When selected, the "Manual Control" tab 617a may allow the user to manually configure the settings of a respective zone manually (e.g., manually configuring the color point, CCT, vibrancy mode, vibrancy value, etc.). Similarly, when the "Saved Colors" tab 617b is selected, the user may be able to configure the settings of a respective zone using a saved color configuration.

When the "Manual Control" tab 617a is selected, the control interface 622 may include a "Color" portion and a "Vibrancy" portion. The "Color" portion may include a "Full Color" actuator 618a, a "Warm/Cool" actuator 618c, a "Warm Dim" actuator 618d and/or a "Save the Color" actuator 618e, each of which may be selectable. When the "Save the Color" actuator 618e is selected, the current configurations may be saved and, as described herein, accessible via the "Saved Colors" tab 617b.

When the "Full Color" actuator 618a is selected, the control interface 622 may include a palette 619 showing a plurality of colors that lie within the color gamut formed by the various RGBW LEDs, for example, that make up the one or more lighting loads in the defined zone (e.g., zone b, as illustrated in FIG. 6B). Superimposed over the palette 619 may be an actuator 620 that identifies a user selection within the color palette 619. The actuator 620 may be movable/slide-able by the user to any of a plurality of locations/colors within palette 619 as similarly described above for other embodiments. The graphical user interface 600 may display together with actuator 620 two perpendicular control lines that intersect at the center of the actuator 620. These control lines and the intersection point may move with the actuator 620 as it is moved by a user within palette 619 (e.g., to indicate the selected x-y coordinates), or as the user selects another location within the palette 619 independently. These control lines may assist the use in moving actuator 620 either horizontally or vertically. Accordingly, actuator 620 may allow a user to configure the zone such that the zone produces colored light at a color point that lies within the color gamut formed by the various RGBW LEDs, for example, that make up the one or more lighting loads of the defined zone.

The color gamut formed by the various RGBW LEDs that make up the lighting load may be referenced using an x-y coordinate system. Accordingly, the control interface 622 may include a coordinate indicators 624a, 624b. The coordinate indicators 624a, 624b may illustrate the x-y coordinates of the selected color. For example, referring to FIG. 5B, the color selected for zone b may be indicated by the x-y coordinates [0.133, 0.342]. Accordingly, color may be selected by manually inputting x-y coordinates into the coordinate indicators 624a, 624b

Referring now to the "Vibrancy" portion of the control interface 622, an "Auto" actuator 618b, which may be used to enable the auto vibrancy mode may be included. When the "Auto" actuator 618b is "On" (e.g., as illustrated in FIG. 6B), the control/configuration application may be configured to display the graphical user interface 600. In addition, the control/configuration application may automatically determine a vibrancy value based on the selected color settings. For example, as described herein with respect to FIG. 3A, the control/configuration application may automatically determine the vibrancy value based on a distance between the selected color setting and the black-body curve. As described herein, the distance between the selected color setting for the lighting load and the black-body curve may indicate whether the selected color setting has an equivalent CCT value on the black-body curve. If, for example, the distance is less than a distance threshold (e.g., indicating that the color setting has an equivalent CCT value), the automatically determined vibrancy value may be the automatically determined vibrancy that results in the emission of light from the lighting load at or above the target CRI value (e.g., 90) for the equivalent CCT value. In addition, when the distance between the selected colors setting for the lighting load and the black-body curve is greater than the distance threshold, the automatically determined vibrancy value may be a predefined vibrancy value (e.g., 25%) In certain instances (e.g., for a certain color point or CCT) the CRI value may be unable to be a value that is greater than or equal to the target CRI value. In those instances, the "Auto" actuator 618b being set to "On" may cause the lighting loads to increase the CRI value towards (e.g., as close as possible to) the target CRI value. In addition, when the "Auto" actuator 618b is set to "On," the automatic configurations may be transmitted as they are performed, such that the user is able to the effect of the automatic configuration at the lighting load in real time.

The user may adjust the color point of the lighting loads in a zone while the "Auto" actuator 618b is "On" (e.g., when the auto vibrancy mode is enabled), for example, by moving the actuator 620 either horizontally or vertically within the palette 620. As the user adjusts the color point, the "Auto" actuator 618b being set to "On" may automatically adjust vibrancy of the lighting loads (e.g., to achieve a CRI value that is greater than or equal to the target CRI value). As described herein, however, if the actuator 620 is adjusted to a color point or setting that farther than the distance threshold from the black-body curve, the vibrancy value of the lighting loads may be automatically adjusted to a predefined value. In addition, as described herein, the "Auto" actuator 618b being set to "On" may cause the CRI of the lighting loads to be increased to a value greater than or equal to the target CRI value as the user adjusts the color point. These configurations may be subsequently transmitted (e.g., immediately or substantially immediately) to the lighting load(s) in a manner such that the user is able to see the changes at the lighting load(s) as the user adjusts the color point (e.g., make "live" changes). As described herein, similar functionality may occur as the user adjusts the CCT of lighting loads when the "Auto" actuator 618b is "On."

As described herein, the "Auto" actuator 618b may provide the user with the option to enable the auto vibrancy mode, wherein the control/configuration application may automatically determine a vibrancy value (e.g., which may be used to adjust the RGBW color mixing for a given color setting) to emit light at a CRI value at or above a target CRI value. When the auto vibrancy mode is enabled (e.g., when the "Auto" actuator 618b is "On"), certain settings, such as adjusting vibrancy via the actuator 626, may no longer be configurable by the user, or may have a limited configuration control (e.g., vibrancy limited within certain range in which CRI value is greater than 90). Optimization of the CRI may or may not result in the highest CRI value. Rather, an optimized CRI may be a value of 90 or greater based on the selected color. In addition, in certain scenarios, optimizing the CRI value may decrease the vibrancy. As a result, when the "Auto" actuator 618b is "On," the vibrancy of the lighting loads in a zone may automatically be changed (e.g., increased or decreased) to the vibrancy level when the CRI is optimized (e.g., the CRI is at or above 90).

When the "Auto" actuator 618b is "On," the user may be provided with a limited ability to adjust vibrancy (e.g., as shown in FIG. 6B). For example, when the "Auto" actuator 618b is "On," the vibrancy control maybe disabled from user control (e.g., the "Vibrancy" portion may be grayed out, as shown in the example of FIG. 6B). Although the user may be unable to control the vibrancy, the actuator 626 may move across the control line 628 to indicate the automatically configured vibrancy. Whereas, when the "Auto" actuator 618b is "Off," the user control may be able to adjust the vibrancy via moving the actuator 626 across the control line 628. The "Auto" actuator 618b may have two settings: "On" and "Off." When the "Auto" actuator 618b is "Off," vibrancy may be controllable or adjustable by the user. When the "Auto" actuator 618b is "On" (e.g., the auto vibrancy mode is enabled) the user may be unable to control or adjust the vibrancy.

In addition, when the "Auto" actuator 618b is "On," the vibrancy of the lighting loads may be automatically determined and/or may not be configurable by the user. The graphical user interface 600 may provide the user with the ability to configure the load controls system using live updates, which may allow the user to see the effects in real time. For example, when the "Auto" actuator 618b is "On," the network device may transmit control instructions to the lighting loads in a zone such that the lighting loads may respond to the control instructions and change their respective states so that the user can see the effects of the configurations in real time.

As illustrated in FIG. 6B, the Vibrancy portion of the control interface 622 may also include an actuator 626, and/or a control line 628. And although not shown in FIG. 6B, when the "Auto" actuator 618b is "Off" (e.g., adjustable vibrancy mode is enabled), the actuator 626 may be actuated along the control line 628 to control the vibrancy of the lighting load(s) in zone b. As described herein, the actuator 626 may be used to adjust the vibrancy value, which may adjust color mixing (e.g., the relative intensities or contributions of) of the respective RGBW LEDs, which may affect the apparent color of objects within the zone (e.g., may affect the color rendering). Increasing/decreasing vibrancy value via the actuator 626 may increase/decrease the apparent saturation of the color of objects in the area without changing (or substantially without changing) the color point of the light source. As described herein, the effect that configuring or controlling vibrancy has on the light emitted by the lighting load may be based on the distance between the selected color setting and the black-body cure (e.g., or another range of predefined values, such as the color output of a white or substantially white LED within a given lighting load). Accordingly, vibrancy may be enabled for lighter or less saturated colors (e.g., colors towards the right side of the color palette 619 and/or closer to the black-body curve). Further, the effect produced by adjusting the vibrancy via the actuator 626 may decrease as the distance between the selected color setting and the black-body curve or the color saturation increases (e.g., colors towards the right side of to palette 619 and/or farther from the black-body curve). Accordingly, vibrancy control may be disabled or less controllable (e.g., the range of adjustable vibrancy values decreases), for selected color setting that are farther from the black-body curve or are more saturated (e.g., colors toward the left side of the color palette 619). For example, as the selected color point on the color palette 619 becomes more saturated (e.g., toward the left of the color palette 619, away from the black-body curve), flexibility in changing the color mixing of the RGBW LEDs to increase vibrancy while maintaining the desired color point may be reduced, as there may be fewer color mixing options of the RGBW LEDs to achieve the desired color or CCT.

Moving the actuator 626 upwards along the control line 628 may increase the vibrancy of the lighting loads in a zone for a selected color. As described herein, the lighting loads may be RGBW lighting loads, although one of ordinary skill in the art will understand that the concepts disclosed herein may be applicable to lighting loads with at least four LEDs having different spectra. For example, the embodiments described herein may be applicable to lighting loads with three discrete LEDs and a phosphor-converted LED (e.g., or combinations thereof, such as more than four LEDs of this combination). As the vibrancy of a lighting load is increased, the contribution of the white, or substantially white, LED(s) (e.g., yellow and/or mint green LED) of the lighting load in a zone may decrease (e.g., based on a given a certain color setting and/or CCT), while increasing one or more of the RGB LEDs to maintain the color point while increasing saturation. Similarly, moving the actuator 626 downwards along the control line 628 may decrease the vibrancy of the lighting loads in a zone. In addition, as the vibrancy of the lighting loads is decreased, the contribution of the white, or substantially white, LED(s) of the lighting loads in the zone may increase (e.g., given a certain color point of CCT) and correspondingly decreasing the intensity of one or more of the RGB LEDs.

As the actuator 626 moves upwards along the control line 628, the contribution of the white, or substantially white, LED(s) used to emit the color indicated by the x-y coordinates [0.133, 0.342] may decrease. Similarly, as the actuator 626 moves downwards along the control line 628, the contribution of the white, or substantially white, LED(s) used to emit the color indicated by the x-y coordinates [0.133, 0.342] may increase. The user may select a color setting for a lighting load and adjust the vibrancy value of the lighting load (e.g., by moving the actuator 626 along the control line 628) at the selected color point. Also or alternatively, the user may select the vibrancy of a lighting load and adjust the color point of the lighting load (e.g., by moving the actuator 620 across the palette 619) given the selected vibrancy. As described herein, the configuration changes may be transmitted, such that the user may see the change in configuration at the lighting loads in real time.

Figure 6C:
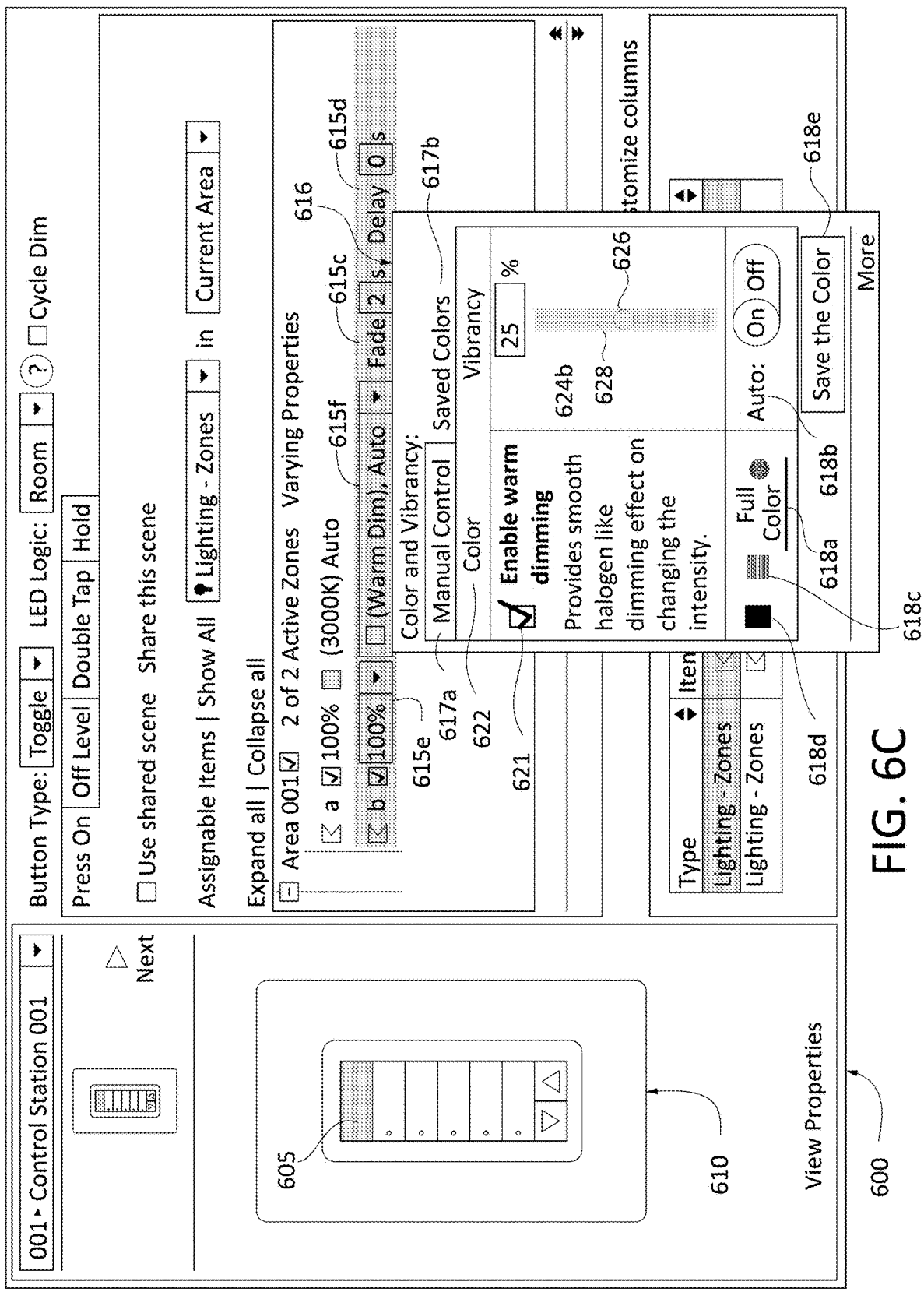
Figure 6D:
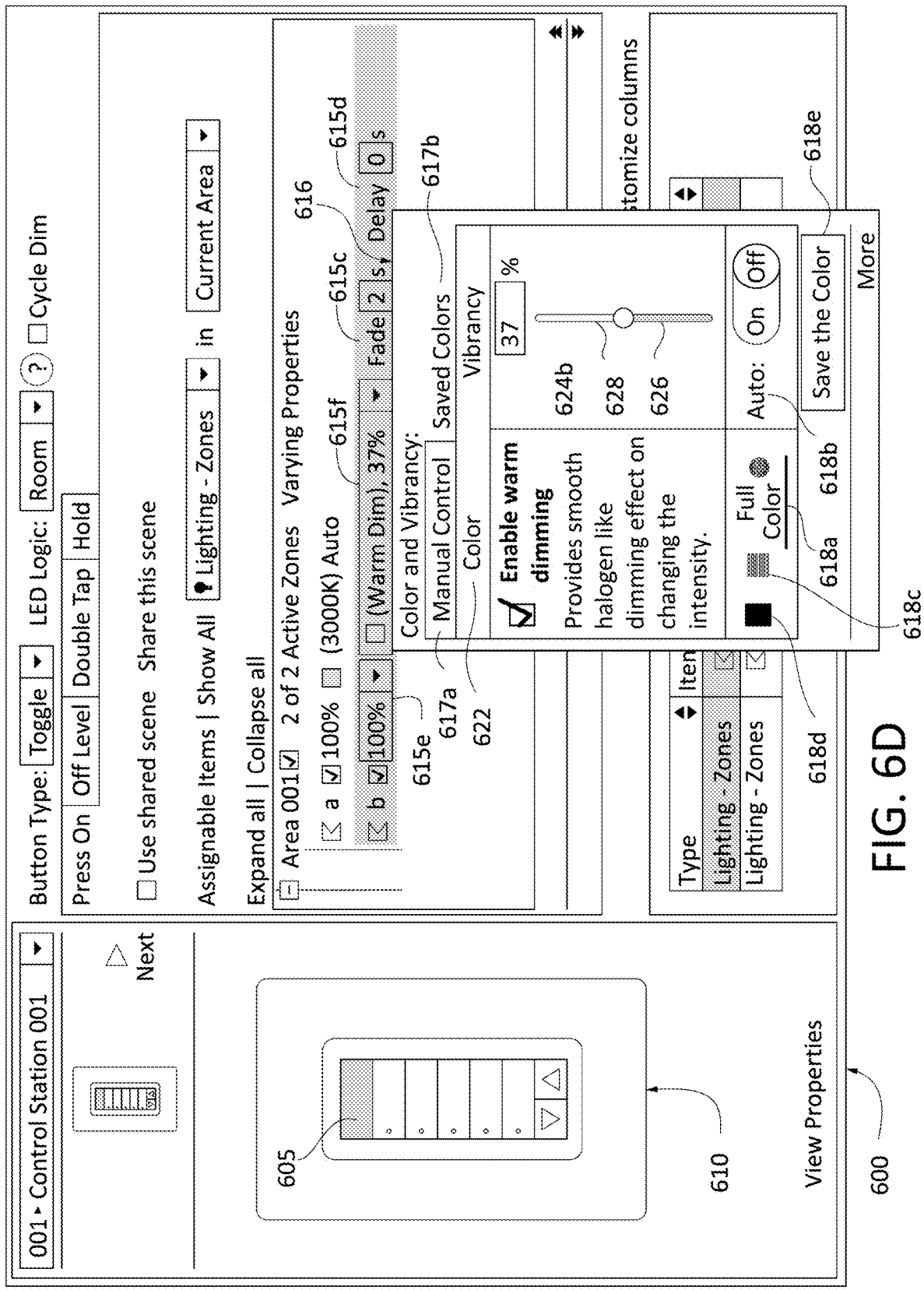

FIGS. 6C and 6D illustrate an example of the control interface 622 displayed by the graphical user interface 600 when the "Warm Dim" actuator 618d is selected. In response to the selection of the "Warm Dim" actuator 618d, the control interface 622 may display an actuator 621 for enabling/disabling warm dimming functionality at the lighting control devices for a respective zone. When warm dimming functionality is enabled, a lighting control device may receive an intensity level or an indication to adjust the intensity level and automatically control the color temperature in response to the intensity level or change in intensity level along the black body curve. Each intensity level may correspond to a given color temperature value on the black body curve. In response to selection of the "Save the Color" actuator 618e when the warm dimming functionality is enabled, a warm dimming parameter may be stored in the control/configuration information in the system configuration data. The warm dimming parameter may indicate to the lighting control device that warm dimming is enabled and the lighting control device may automatically control the color temperature along the black body curve in response to identifying an intensity level to which the lighting load is to be controlled.

When the "Warm Dim" actuator is selected, the lighting control device and respective lighting load may be configured to a warm dim mode. When a lighting control device/lighting are configured to a warm dim mode, increase or decreases to the lighting intensity settings (e.g., such as at the keypad 610 shown in FIG. 6A-6D), may cause the light emitted from the lighting load to increase or decrease along the black-body curve (e.g., increase or decrease in CCT value rather than lighting intensity value). Further, lighting control devices/lighting loads set to a warm dim mode may also be set to an auto vibrancy mode (e.g., as illustrated in FIG. 6C) and/or an adjustable vibrancy mode (e.g., as illustrated in FIG. 6D). When a lighting control devices/lighting loads set to a warm dim mode is also set to an auto vibrancy mode, a vibrancy value may be automatically determined such that the lighting load emits light at CRI value at or above a target CRI value, which, as described herein, may be a predefined value based on the CCT value of the lighting load. And when a lighting control devices/lighting loads set to a warm dim mode is also set to an adjustable vibrancy mode, an adjustable vibrancy value may be selected by the user.

As illustrated in FIGS. 6C and 6D, the control interface 622 may also include the "Auto" actuator 618b within the vibrancy setting for setting a vibrancy setting for when warm dimming functionality is enabled at the lighting control device. As described herein, when the "Auto" actuator 618b is "On" (e.g., as shown in FIG. 6C), the graphical user interface 600 may cause the vibrancy settings for a respective zone to be automatically configured when a lighting control is performing warm dimming. For example, given a certain CCT that is automatically determined in response to an intensity level, the "Auto" actuator 618b being set to "On" may cause the lighting control device to automatically determine and set a vibrancy level at the CCT that increases/attempts to achieve a target CRI value of the lighting loads in a respective zone to be greater than or equal to a target CRI value (e.g., 90). That is, the "Auto" actuator 618b may provide the user with the ability to automatically optimize the CRI value of the light emitted by the lighting loads in a zone towards or greater than the target CRI value when the lighting control device automatically selects a CCT value in response to an intensity value as it warm dims. In certain instances (e.g., for certain color point or CCT) the CRI value may be unable to be a value that is greater than or equal to the target CRI value. In those instances, the "Auto" actuator 618b being set to "On," may cause the lighting loads to increase the CRI value towards (e.g., as close as possible to) the target CRI value.

When the "Auto" actuator 618b is "On" (e.g., auto vibrancy mode is enabled), the vibrancy value of the lighting loads in a zone may be automatically determined as the intensity level in the intensity drop down 615e changes, which may be reflected in the actuator 626 being automatically moved. The control application may receive the intensity level in the intensity drop down 615e, calculate the corresponding CCT value on the black-body curve for the selected CCT value, and automatically update the vibrancy to reflect the vibrancy value for the CCT value. Similar steps may also be performed when the intensity of the lighting load is adjusted from outside of the control application (e.g., via buttons on a keypad). In addition, when the "Auto" actuator 618b is "On," the vibrancy of the lighting loads may be automatically determined and/or may not be configurable by the user, or may be limited in its configuration via actuator 626. For example, as illustrated in FIG. 6C, the "Vibrancy" portion of the control interface 622 may be disabled (e.g. grayed out and/or non-configurable) when the "Auto" actuator 618b is "On," and may be enabled (as shown in FIG. 6D) when the "Auto" actuator 618b is "Off." However, when the "Auto" actuator 618b is "On" and vibrancy control is disabled to the user, the actuator 626 may still be moved across the control line 628 by the control application to indicate the automatically selected vibrancy level based on the determined CRI value.

As illustrated in FIGS. 6C and 6D, a lighting control device/lighting load (e.g., lighting control device/lighting load 112/114) may be configured to a warm dim mode. A lighting control device in the warm dim mode may be configured to control the CCT value of the light emitted from the lighting load. That is, when a lighting control device in the warm dim mode receives indications to increase and/or decrease its intensity (e.g., in response to a button press at a remote control device or keypad), the lighting control device may respectively increase and/or decrease the CCT value of the light emitted from the lighting load to a corresponding CCT value on the black body curve. In addition, as illustrated in FIG. 6C, a lighting control device/lighting load in the warm dim mode may also be configured to the auto vibrancy mode. As a result, the lighting control device may automatically determine a vibrancy value based on the CCT value of the lighting load at the corresponding intensity value, such that the light emitted from the lighting load is at or above a target CRI value. Similarly, the lighting control device may automatically determine respective vibrancy values such that the light emitted from the lighting load is at or above a target CRI value as the CCT value is increased and/or decreased with the corresponding intensity levels. For example, in response to receiving an indication to increase its intensity, a lighting control device/lighting load configured in the warm dim and auto vibrancy modes may automatically increase the CCT value of the lighting load to a corresponding CCT value, as well as automatically determine an updated vibrancy value based on the increased CCT value, such that the light emitted from the lighting load is at or above a target CRI value. As described herein, the automatically determined vibrancy value may increase as the CCT value increases. The CCT values and vibrancy values may similarly decrease in response to decreased intensity levels.

As illustrated in FIG. 6D, the "Auto" actuator 618b is set to "Off," allowing the "Vibrancy" portion to be configurable by the user when the warm dimming functionality is enabled. For example, the "Vibrancy" portion may be used to increase and/or decrease the vibrancy of the lighting loads in a zone based on the CCT value corresponding to the selected intensity value (e.g., increase and/or decrease the contribution of the while LED based on the CCT value corresponding to the in the intensity drop down 615e). The control application and/or the lighting control device may perform the calculation of the CCT value and/or the vibrancy in response to receiving an indication that warm dimming functionality and the user defined vibrancy value.

The lighting control parameters may be updated in the control/configuration information for and stored in response to the selection of the "Save the Color" actuator 618e. The parameters may be subsequently transmitted (e.g., immediately or substantially immediately) to the lighting control device, which may generate and respectively transmit control instructions based on the lighting control parameters to the lighting load such that the user is able to see the changes at the lighting load as the user adjusts the intensity of the lighting load (e.g., make "live" changes or otherwise changes the intensity of the lighting load). As described herein, similar functionality may occur as the user adjusts the color point of lighting loads when the "Auto" actuator 618b is "On."

As illustrated in FIG. 6D, when the adjustable vibrancy mode is selected (e.g., the "Auto" actuator 618b is set to "Off"), the user may adjust the vibrancy of the lighting loads, for example, by moving the actuator 626 accords the control line 628. As described herein, increasing the vibrancy may decrease the contribution of certain LED(s) in the lighting load (e.g., yellow and/or mint green LED). Similarly, decreasing the vibrancy may increase the contribution of certain LED(s). The user may select a certain intensity level in the intensity drop down 615e and then adjust the vibrancy at the selected intensity level. Also, or alternatively, the user may select a certain vibrancy and then adjust the intensity level in the intensity drop down 615e given the selected vibrancy. As described herein, the changes made by the user may be saved in response to the "Save the Color" actuator 618e for being transmitted to the lighting control device, such that the lighting control device can control the vibrancy to the selected vibrancy level when the corresponding intensity level is received.

Figure 6F:
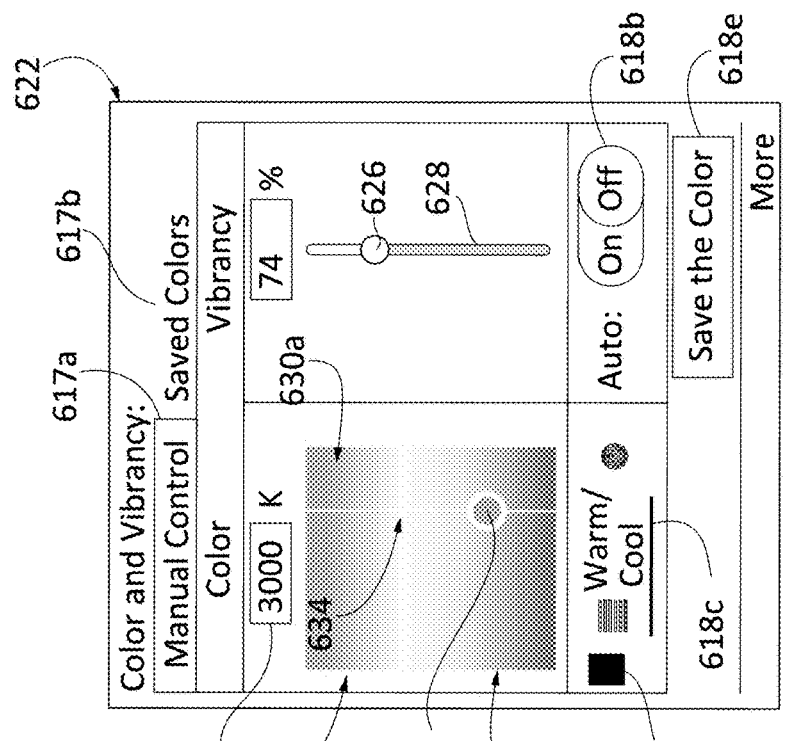
Figure 6E:
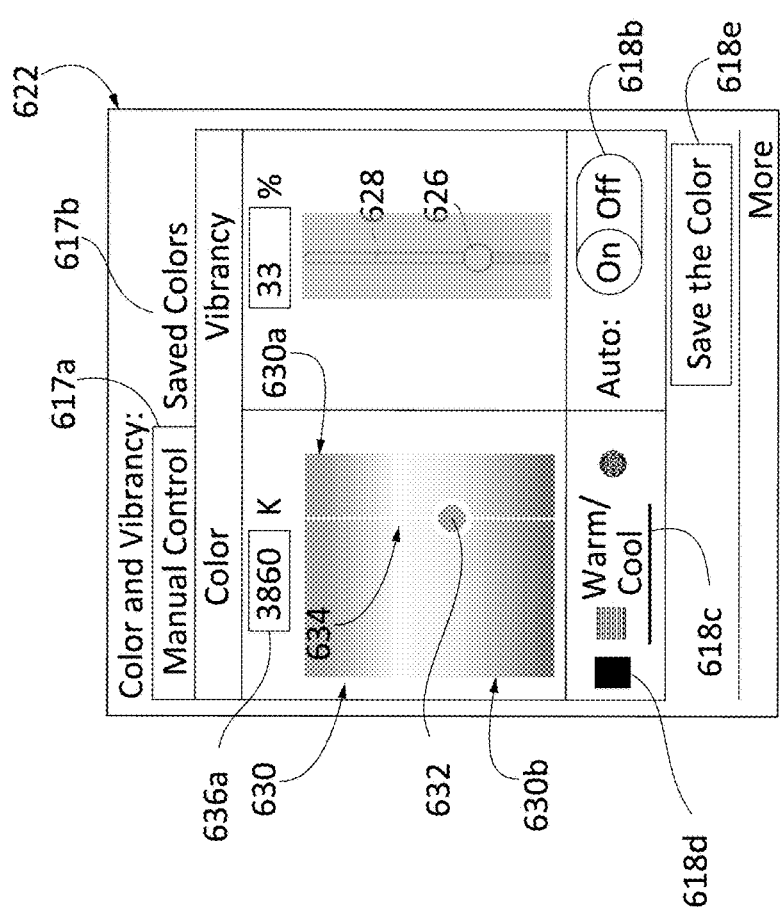

FIGS. 6E and 6F illustrate an example of the control interface 622 displayed by the graphical user interface 600 when the "Warm/Cool" tab 618c is selected. The control interface 622 may include the "Save the Color" actuator 618e. As described herein, when the "Save the Color" actuator 618e is actuated, the current configurations may be saved and, as described herein, accessible via the "Saved Colors" tab 617b. After the "Save the Color" actuator 618e is actuated, for example, the user may be prompted to name the saved configuration, which may allow the user to identify the saved configuration during subsequent configurations (e.g., the configuration of other zones and/or spaces).

As illustrated in FIGS. 6E and 6F, the control interface 622 may include a palette 630, an actuator 632, and/or a control line 634. The palette 630 may show a range of white colors ranging from cooler colors 630*a* at the top of the palette 630 to warmer colors 630*b* at the bottom of the palette 630. As described herein, these colors may correspond to colors that lie along the black-body curve. For example, the palette 630 may show colors along a range of CCTs on the black-body curve ranging from "warm white" (e.g., roughly 2600 K-3700 K) at 630*a*, to "neutral white" (e.g., 3700 K-5000 K) to "cool white" (e.g., 5000 K-8300 K) at 630*b*. The actuator 632 may be superimposed over the palette 630. The actuator 632 may be movable/slide-able (e.g., here vertically movable) along the control line 634 to select different CCTs along the black-body curve as similarly described herein for other embodiments. Also, or alternatively, a user may manually input a CCT value using the input box 636*a*. As described herein, as the user adjust the CCT, the adjustments may be transmitted to the lighting loads, such that the user is able to see the updates in real time.

As illustrated in FIG. 6F, when the adjustable vibrancy mode is selected the user may adjust the vibrancy of the lighting loads, for example, by moving the actuator 626 along the control line 628. As described herein, increasing the vibrancy may decrease the contribution of certain LED(s) in the lighting load (e.g., yellow and/or mint green LED). Similarly, decreasing the vibrancy may increase the contribution of certain LED(s). The user may select a certain CCT and then adjust the vibrancy at the selected CCT. Also, or alternatively, the user may select a certain vibrancy and then adjust the CCT given the selected vibrancy. As described herein, the changes made by the user may be transmitted to the lighting loads, such that the user can see the changes in real time.

As illustrated in FIGS. 6E and 6F, the control interface 622 may also include the "Auto" actuator 618*b* within the vibrancy setting. As described herein, when the "Auto" actuator 618*b* is "On" (e.g., as shown in FIG. 6E), the graphical user interface 600 may cause certain settings for a respective zone to be automatically configured. For example, given a certain CCT, the "Auto" actuator 618*b* being set to "On" may automatically increase the CRI value of the lighting loads in a respective zone to be greater than or equal to a target CRI value (e.g., 90). That is, the "Auto" actuator 618*b* may provide the user with the ability to automatically determine a vibrancy value to optimize the CRI value of the light emitted by the lighting loads in a zone towards or greater than the target CRI value. For example, as described herein, the control/configuration application may automatically determine the vibrancy value based on a distance between the selected color setting and the black-body curve. However, when the "Warm/Cool" tab 618*c* is selected, the selected color settings may be CCT values on the black-body curve (e.g., the distance between the select color setting and the black-body cure is zero or substantially zero). The automatically determined vibrancy value may thus be set to a predefined value that result in the emission of light from the lighting load at or above the target CRI value at the selected CCT value. In certain instances (e.g., for certain color point or CCT) the CRI value may be unable to be a value that is greater than or equal to the target CRI value. In those instances, the "Auto" actuator 618*b* being set to "On," may cause the lighting loads to increase the CRI value towards (e.g., as close as possible to) the target CRI value.

When the "Auto" actuator 618*b* is "On" (e.g., the auto vibrancy mode is enabled), the vibrancy of the lighting loads in a zone may be automatically determined, which may be reflected in the actuator 626 being automatically moved. In addition, when the "Auto" actuator 618*b* is "On," the vibrancy of the lighting loads may be automatically determined and/or may not be configurable by the user, or may be limited in its configuration via actuator 626. For example, as illustrated in FIG. 6E, the "Vibrancy" portion of the control interface 622 may be disabled (e.g. grayed out and/or non-configurable) when the "Auto" actuator 618*b* is "On," and may be enabled (as shown in FIG. 6F) when the "Auto" actuator 618*b* is "Off." However, when the "Auto" actuator 618*b* is "On" and vibrancy control is disabled to the user, the actuator 626 may still be moved across the control line 628 by the control application to indicate the automatically selected vibrancy level based on the determined CRI value. As illustrated in FIG. 6F, the "Auto" actuator 618*b* is set to "Off," allowing the "Vibrancy" portion to be configurable by the user. For example, the "Vibrancy" portion may be used to increase and/or decrease the vibrancy of the lighting loads in a zone based on the selected CCT (e.g., increase and/or decrease the contribution of the while LED based on the selected CCT).

The user may adjust the CCT of the lighting loads in a zone while the "Auto" actuator 618*b* is "On," for example, by moving the actuator 632 along the control line 634. As the user adjusts the CCT, the "Auto" actuator 618*b* being set to "On" may automatically adjust vibrancy of lighting loads based on the adjustments to the CCT value. In addition, as described herein, the "Auto" actuator 618*b* being set to "On" may cause the CRI of the lighting loads to be increased to a value greater than or equal to the target CRI value as the user adjusts the color point. These configurations may be subsequently transmitted (e.g., immediately or substantially immediately) to the lighting load in a manner such that the user is able to see the changes at the lighting load as the user adjusts the color point (e.g., make "live" changes). As described herein, similar functionality may occur as the user adjusts the color point of lighting loads when the "Auto" actuator 618*b* is "On."

Figures 6G, 6H:
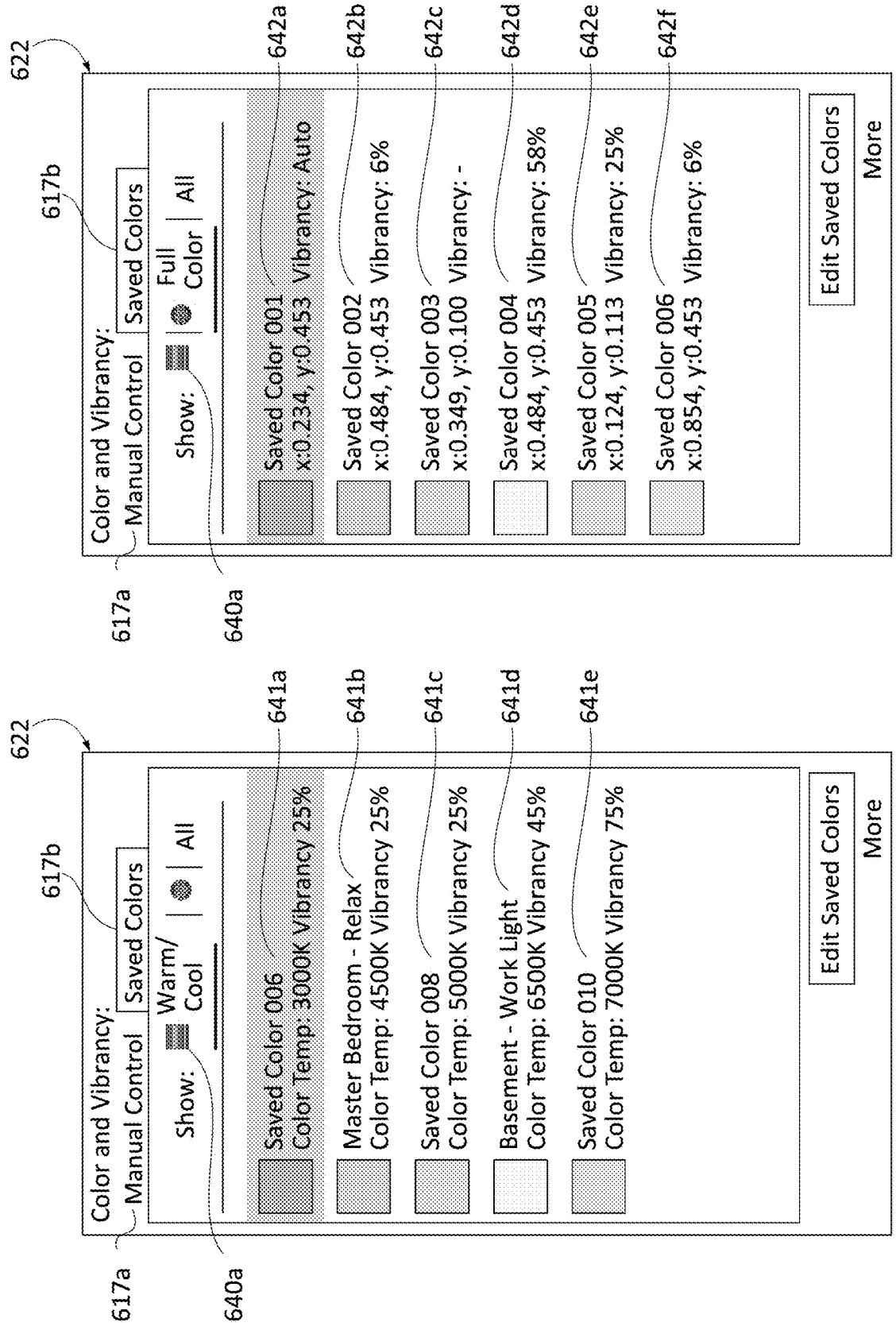
Figure 6I:
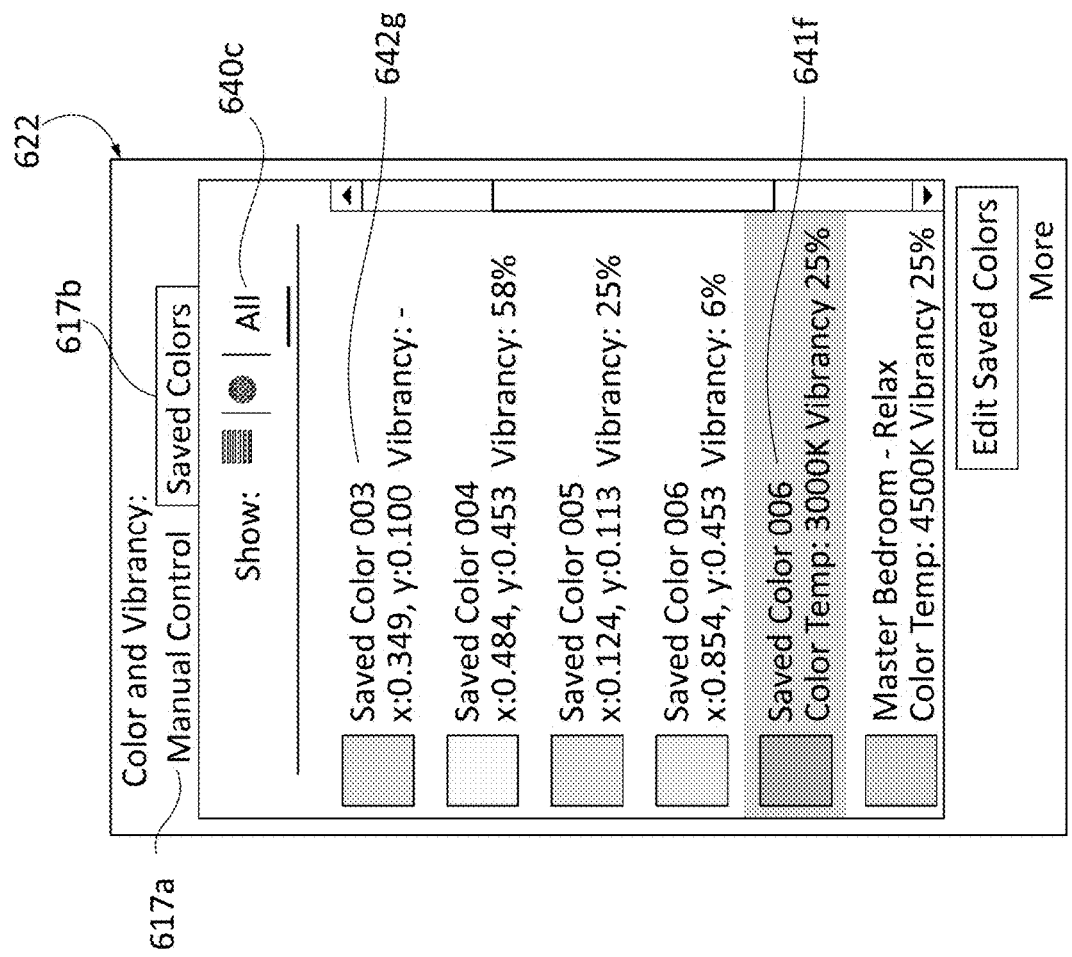

FIGS. 6G, 6H, and 6I illustrate various examples of the control interface 622 displayed by the graphical user interface 600 when the "Saved Colors" tab 617*b* is selected. As illustrated in FIGS. 6G, 6H, and 6I, when the "Saved Colors" tab 617*b* is selected, the control interface 622 may include "Warm/Cool" tab 640*a*, "Full Color" tab 640*b*, and/or "All" tab 640*c*. Referring now to FIG. 6G, when the "Warm/Cool" tab 640*a* is selected, the control interface 622 may list the saved CCT configurations (e.g., CCT configurations saved by actuating the "Save the Color" actuator 618*e*, shown in FIGS. 6E and 6F). Rather than manually setting the CCT configuration for a respective zone using the "Manual Control" tab 617*a*, the user may use the "Saved Colors" tab 617*b* to select a saved CCT configuration. For example, the user may select the "Saved Color 006" CCT configuration 641*a*, which may set the CCT of the lighting loads in a zone to 3000k and the Vibrancy of the lighting loads in a zone to 25%. Similarly, the user may select the saved configurations: "Master Bedroom—Relax" CCT configuration 641*b*, "Saved Color 008" CCT configuration 641*c*, "Basement—Work Light" CCT configuration 641*d*, or "Saved Color 010" CCT configuration 641*e*. The saved colors may be exported and imported for use in other lighting installations or areas. As such, the names of the selected color control settings may allow for consistency in similar types of areas (e.g., conference rooms, office spaces, bedrooms, etc.), as well as reduce configuration time.

FIG. 6H illustrates an example of the control interface 622 where the "Full Color" tab 640b is selected. As illustrated in FIG. 6H, the control interface 622 may list the saved color point configurations. Rather than manually configuring a color point for a respective zone using the "Manual Control" tab 617a, the user may, for example, use the "Saved Colors" tab 617b to automatically configure a color point by selecting a saved color point configuration from a list of saved color point configurations (e.g., color point configurations saved by actuating the "Save the Color" actuator 618e shown in FIG. 6B). For example, the user may select the "Saved Color 001" color point configuration 642a, which may set the light emitted from the lighting loads to the color indicated by the x-y coordinates [0.234, 0.453] and the Vibrancy set to "Auto" (e.g., the "Auto" actuator 618b is set to "On"). Similarly, the user may select the saved color point configurations: "Saved Color 002" color point configuration 642b, "Saved Color 003" color point configuration 642c, "Saved Color 004" color point configuration 642c, and "Saved Color 005" color point configuration 642d, "Saved Color 006" color point configuration 642f.

FIG. 6I illustrates an example of the control interface 622 where the "All" tab 640c is selected. As illustrated in FIG. 6I, the control interface 622 may list each of the saved configurations (e.g., including both warm/cool and full color settings). Rather than manually configuring the lighting loads in a respective zone using the "Manual Control" tab 617a, the user may, for example, use the "Saved Colors" tab 617b to automatically configure the lighting loads by selecting a saved configuration from a list of saved configurations. The list of saved configurations may include the list of saved CCT configurations and the list of saved color point configurations (e.g., color point configurations and CCT configurations saved by actuating the "Save the Color" actuator 618e as shown in FIGS. 6B to 6F). For example, the user may select the "Saved Color 003" color point configuration 642g, which may set the light emitted from the lighting loads to the color indicated by the x-y coordinated [0.349, 0.100]. Also, or alternatively, the user may select the "Saved Color 006" CCT configuration 641f, which may set the CCT of the lighting loads in a zone to 3000K and the Vibrancy of the lighting loads in the zone to 25%.

Figure 7:
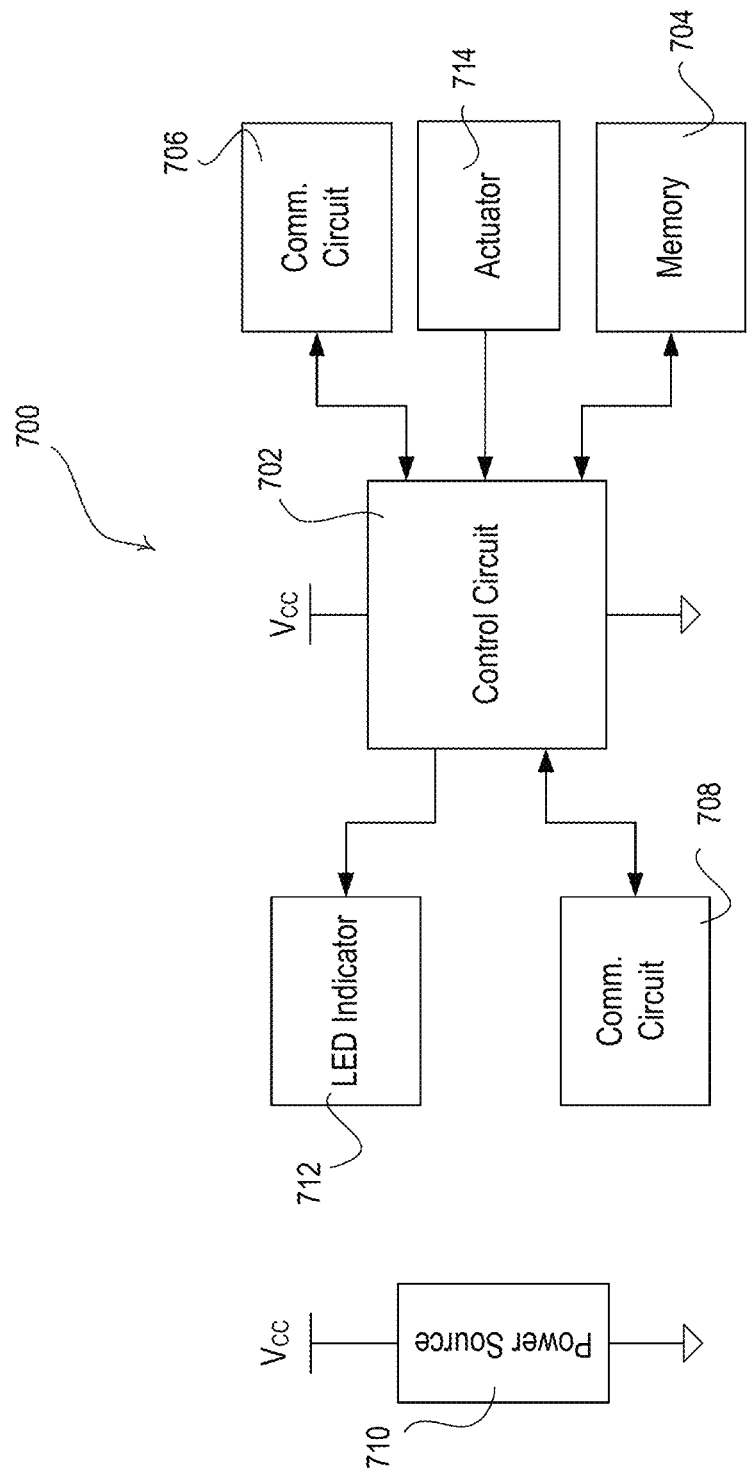
FIG. 7 is a block diagram of an example system controller.

FIG. 7 is a block diagram illustrating another example system controller 700 (such as system controller 150 described herein). The system controller 700 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 702). The control circuit 702 may be configured to execute one or more software-based applications that include instructions that when executed by the control circuit may configure the control circuit to perform signal coding, data processing, power control, input/output processing, or any other function, process, and/or operation for example that enables the system controller 700 to perform as described herein. One will recognize that functions, features, processes, and/or operations described herein of the system controller 700 may also and/or alternatively be provided by firmware and/or hardware in addition to and/or as an alternative to software-based instructions. The control circuit 702 may store information in and/or retrieve information from the memory 704, including configuration information/configuration information file(s), backup file(s), creation times, and signature(s) as described herein. Memory 704 may also store software-based instructions for execution by the control circuit 702 and may also provide an execution space as the control circuit executes instructions. Memory 704 may be implemented as an external integrated circuit (IC) or as an internal circuit of the control circuit 702. Memory 704 may include volatile and non-volatile memory and may be non-removable memory and/or a removable memory. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. One will appreciate that the memory used to store configuration information file(s), and/or backup file(s), and/or software-based instructions, etc. may be the same and/or different memory of the system controller. As one example, configuration information file(s) and software-based instructions may be stored in non-volatile memory while backup(s) may be stored in volatile and/or non-volatile memory.

The system controller 700 may include one or more communications circuits/network interface devices or cards 706 for transmitting and/or receiving information. The communications circuit 706 may perform wireless and/or wired communications. The system controller 700 may also, or alternatively, include one or more communications circuits/network interface devices/cards 708 for transmitting and/or receiving information. The communications circuit 706 may perform wireless and/or wired communications.

Communications circuits 706 and 708 may be in communication with control circuit 702. The communications circuits 706 and/or 708 may include radio frequency (RF) transceivers or other communications components configured to perform wireless communications via an antenna(s). The communications circuit 706 and communications circuit 708 may be configured to perform communications via the same communication channels or different communication channels. For example, the communications circuit 706 may be configured to communicate (e.g., with a network device, over a network, etc.) via a wireless communication channel (e.g., BLUETOOTH®, near field communication (NFC), WIFI®, WI-MAX®, cellular, etc.) and the communications circuit 708 may be configured to communicate (e.g., with control devices and/or other devices in the load control system) via another wireless communication channel (e.g., WI-FI® or a proprietary communication channel, such as CLEAR CONNECT™).

The control circuit 702 may be in communication with an LED indicator(s) 712 for providing indications to a user. The control circuit 702 may be in communication with an actuator(s) 714 (e.g., one or more buttons) that may be actuated by a user to communicate user selections to the control circuit 702. For example, the actuator 714 may be actuated to put the control circuit 702 in an association mode and/or communicate association messages from the system controller 700.

Each of the components within the system controller 700 may be powered by a power source 710. The power source 710 may include an AC power supply or DC power supply, for example. The power source 710 may generate a supply voltage $V_{CC}$ for powering the components within the system controller 700. One will recognize that system controller 700 may include other, fewer, and/or additional components.

Figure 8:
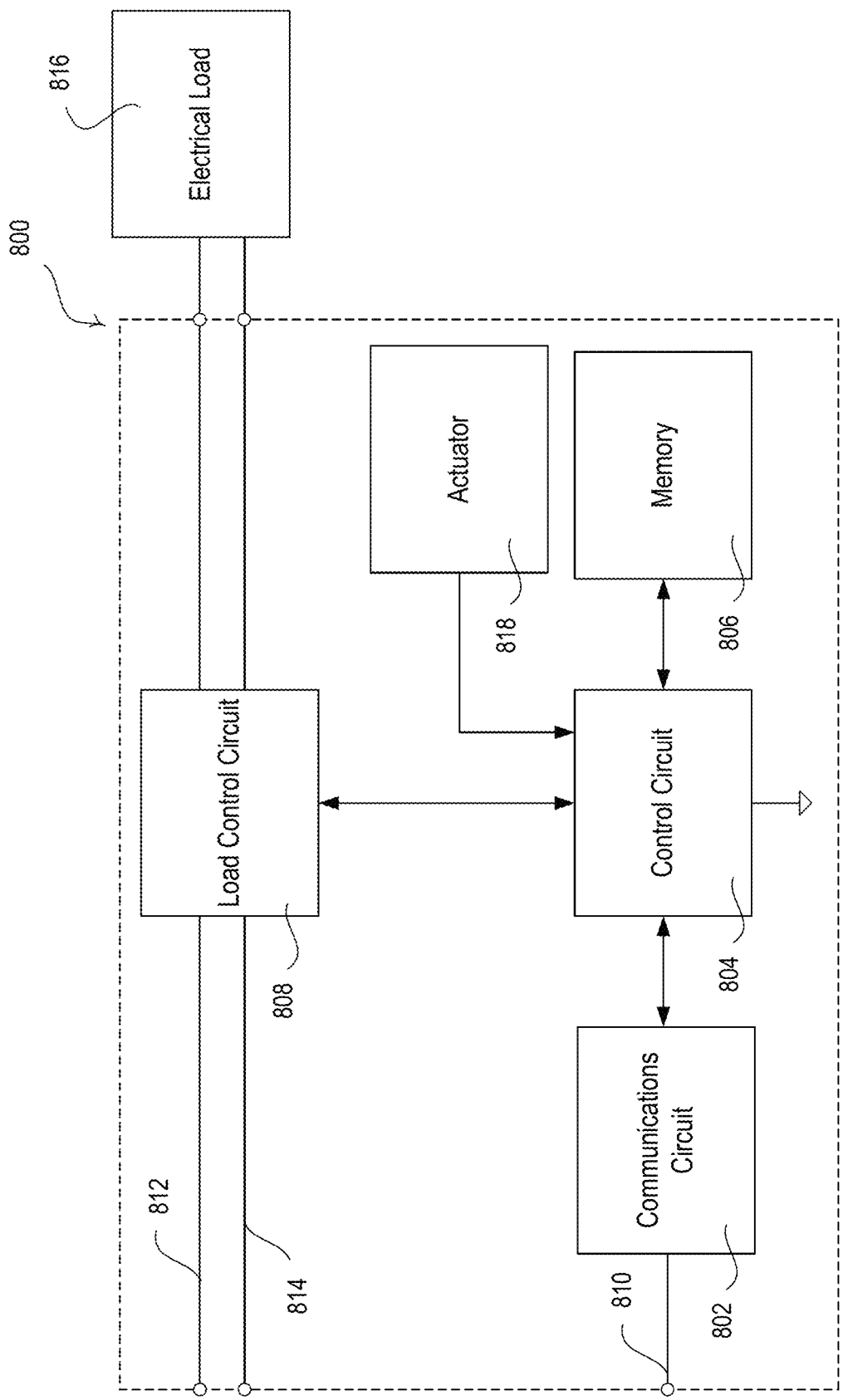
FIG. 8 is a block diagram of an example control-target device.

FIG. 8 is a block diagram illustrating an example control-target device 800, e.g., a load control device, as described herein. The control-target device 800 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The control-target device 800 may include one or more communications circuits/network interface devices or cards 802. The communications circuit 802 may include a receiver, an RF transceiver, and/or other communications component configured to perform wired and/or wireless communications via communications link 810. The control-target device 800 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 804). The control circuit 804 may be configured to execute one or more software-based applications that include instructions that when executed by the control circuit may configure the control circuit to perform signal coding, data processing, power control, input/output processing, or any other function, feature, process, and/or operation for example that enables the control-target device 800 to perform as described herein. One will recognize that functions, features, processes, and/or operations described herein for the control-target device 800 may also and/or alternatively be provided by firmware and/or hardware in addition to and/or as an alternative to software-based instructions. The control circuit 804 may store information in and/or retrieve information from the memory 806. For example, the memory 806 may maintain a registry of associated control devices and/or control configuration information. Memory 806 may also store software-based instructions for execution by the control circuit 804 and may also provide an execution space as the control circuit executes instructions. Memory 806 may be implemented as an external integrated circuit (IC) or as an internal circuit of the control circuit 804. Memory 806 may include volatile and non-volatile memory and may be non-removable memory and/or a removable memory. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. The control circuit 804 may also be in communication with the communications circuit 802.

The control-target device 800 may include a load control circuit 808. The load control circuit 808 may receive instructions from the control circuit 804 and may control an electrical load 816 based on the received instructions. The load control circuit 808 may send status feedback to the control circuit 804 regarding the status of the electrical load 816. The load control circuit 808 may receive power via a hot connection 812 and a neutral connection 814 and may provide an amount of power to the electrical load 816. The electrical load 816 may include any type of electrical load.

The control circuit 804 may be in communication with an actuator 818 (e.g., one or more buttons) that may be actuated by a user to communicate user selections to the control circuit 804. For example, the actuator 818 may be actuated to put the control circuit 804 in an association mode or discovery mode and may communicate association messages or discovery messages from the control-target device 800. One will recognize that control-target device 800 may include other, fewer, and/or additional components.

Figure 9:
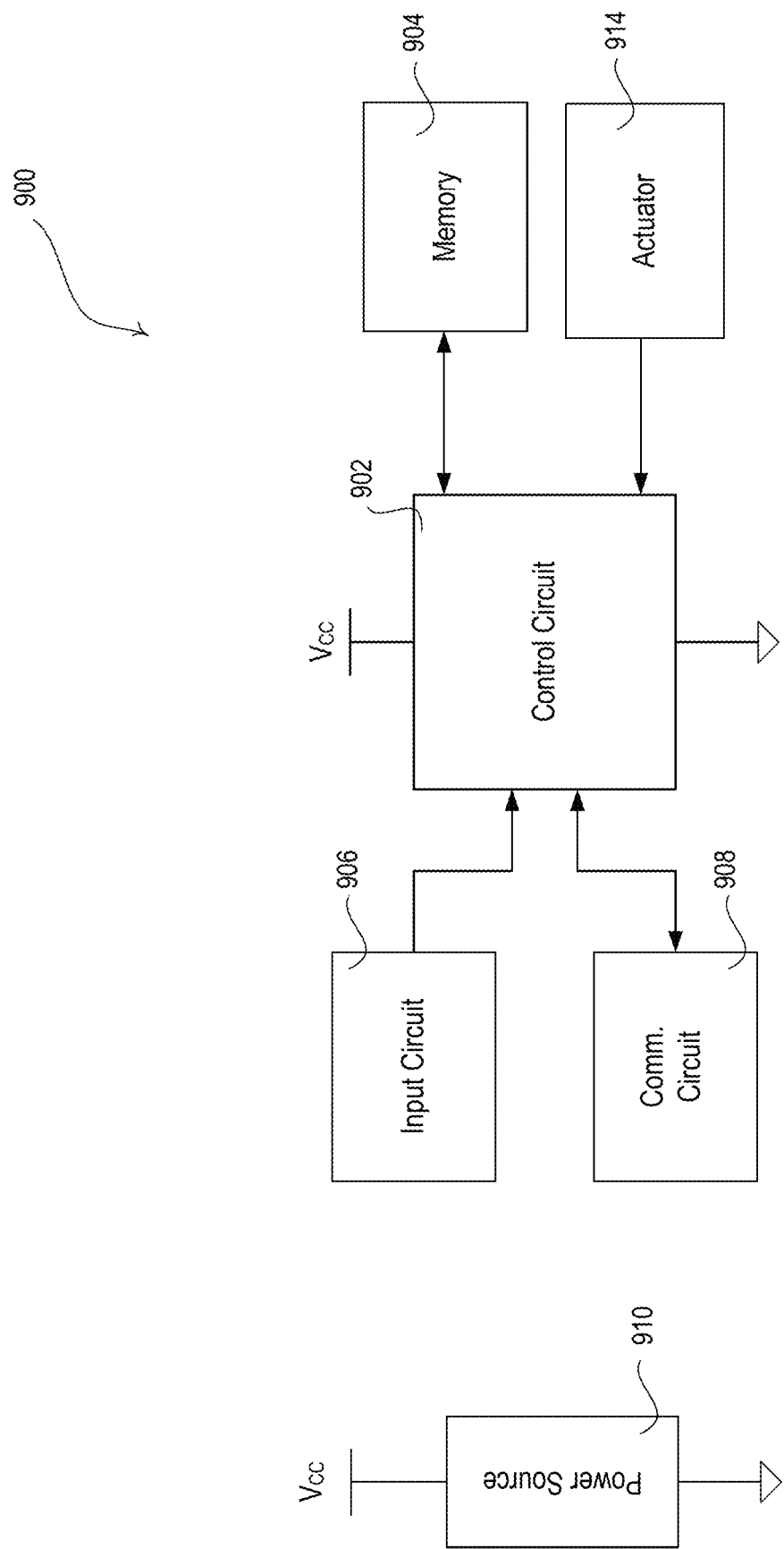
FIG. 9 is a block diagram of an example control-source device.

FIG. 9 is a block diagram illustrating an example control-source device 900 as described herein. The control-source device 900 may be a remote control device, an occupancy sensor, a daylight sensor, a window sensor, a temperature sensor, and/or the like. The control-source device 900 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 902). The control circuit 902 may be configured to execute one or more software-based applications that include instructions that when executed by the control circuit may configure the control circuit to perform signal coding, data processing, power control, input/output processing, or any other function, feature, process, and/or operation for example that enables the control-source device 900 to perform as described herein. One will recognize that functions, features, processes, and/or operations described herein for the control-source device 900 may also and/or alternatively be provided by firmware and/or hardware in addition to and/or as an alternative to software-based instructions. The control circuit 902 may store information in and/or retrieve information from the memory 904. Memory 904 may also store software-based instructions for execution by the control circuit 902 and may also provide an execution space as the control circuit executes instructions. Memory 904 may be implemented as an external integrated circuit (IC) or as an internal circuit of the control circuit 902. Memory 904 may include volatile and non-volatile memory and may be non-removable memory and/or a removable memory. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory.

The control-source device 900 may include one or more communications circuits/network interface devices or cards 908 for transmitting and/or receiving information. The communications circuit 908 may transmit and/or receive information via wired and/or wireless communications via communications circuit 908. The communications circuit 908 may include a transmitter, an RF transceiver, and/or other circuit configured to perform wired and/or wireless communications. The communications circuit 908 may be in communication with control circuit 902 for transmitting and/or receiving information.

The control circuit 902 may also be in communication with an input circuit(s) 906. The input circuit 906 may include an actuator(s) (e.g., one or more buttons) and/or a sensor circuit (e.g., an occupancy sensor circuit, a daylight sensor circuit, or a temperature sensor circuit) for receiving input that may be sent to a control-target device for controlling an electrical load. For example, the control-source device may receive input from the input circuit 906 to put the control circuit 902 in an association mode and/or communicate association messages from the control-source device. The control circuit 902 may receive information from the input circuit 906 (e.g. an indication that a button has been actuated or sensed information). Each of the components within the control-source device 900 may be powered by a power source 910.

The control circuit 902 may be in communication with an actuator(s) 914 (e.g., one or more buttons) that may be actuated by a user to communicate user selections to the control circuit 902. For example, the actuator 914 may be actuated to put the control circuit 902 in an association mode and/or communicate association messages to and/or from a system controller (e.g., the system controller 150, 700). One will recognize that control-source device 900 may include other, fewer, and/or additional components.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A method comprising:
   receiving, via a graphical user interface, a selection of a lighting intensity for controlling a lighting load, wherein the lighting load comprises a plurality of light emitting diodes (LEDs);
   displaying a palette on the graphical user interface for identifying a color setting for controlling the lighting load;
   receiving, via the graphical user interface, a selection of the color setting on the palette for controlling the lighting load;
   displaying a vibrancy control interface on the graphical user interface for identifying a vibrancy mode for controlling the lighting load;
   receiving a selection of the vibrancy mode for the lighting load, wherein the selection of the vibrancy mode comprises one of an adjustable vibrancy mode that is configured to receive an adjustable vibrancy value at which to control the lighting load, or an auto vibrancy mode that is configured to automatically determine a vibrancy value at which to control the lighting load;
   determining a vibrancy value of the lighting load based on one or more of:
      the selection of the vibrancy mode, and
      the selection of the color setting;
   generating control instructions for controlling the lighting load, wherein the control instructions indicate the selection of the lighting intensity, the selection of the color setting, and the determined vibrancy value; and
   controlling the lighting load according to the generated control instructions.

2. The method of claim 1, wherein the selection of the vibrancy mode is the auto vibrancy mode, and wherein the method further comprises:
   determining a distance between the received selection of the color setting and a black-body curve, wherein the black-body curve is comprised within a color gamut of colors formed by the plurality of LEDs of the corresponding lighting load; and
   automatically identifying a vibrancy value for emitting light at the received selection of the color setting based on the distance between the received selection of the color setting and the black-body curve, wherein the automatically identified vibrancy value is configured to emit light from the lighting load at a target color rendering index (CRI) value, and wherein the vibrancy value of the corresponding lighting load is determined to be the automatically identified vibrancy value.

3. The method of claim 2, further comprising receiving a selection to enable a warm dim mode for the lighting load, wherein the received selection of the color setting comprises a correlated color temperature (CCT) value, and wherein the selection to enable the warm dim mode for the lighting load causes a selection to increase the lighting intensity to increase the CCT value.

4. The method of claim 3, wherein the automatically identified vibrancy value increases as the CCT value increases.

5. The method of claim 2, wherein the palette is configured to display different correlated color temperature (CCT) values at which the plurality of LEDs of the corresponding lighting load are capable of being controlled, and wherein the received selection of the color setting comprises a correlated color temperature (CCT) value.

6. The method of claim 5, wherein the automatically identified vibrancy value increases as the CCT value increases.

7. The method of claim 2, wherein the distance between the received selection of the color setting is greater than a predefined distance threshold, and wherein the automatically identified vibrancy value is a predefined vibrancy value.

8. The method of claim 2, wherein the palette is configured to separately display the color gamut of colors at which the plurality of LEDs of the corresponding lighting load are capable of being controlled, and wherein the received color setting comprises x-y chromaticity coordinates corresponding to a given color of the color gamut formed by the plurality of LEDs of the lighting load.

9. The method of claim 2, wherein the target CRI value is 90.

10. The method of claim 1, wherein the selection of the vibrancy mode is the adjustable vibrancy mode, wherein the vibrancy control interface comprises a vibrancy control line for receiving the adjustable vibrancy value for controlling the corresponding lighting load of a zone, and wherein the method further comprises:
    receiving, via the graphical user interface, a selection of the adjustable vibrancy value, wherein the vibrancy value of the corresponding lighting load is determined to be the received selection of the adjustable vibrancy value.

11. The method of claim 10, wherein a contribution of at least one LED of the plurality of LEDs in the corresponding lighting load decreases as the received selection of the adjustable vibrancy value increases.

12. The method of claim 11, wherein the at least one LED is a white or substantially white LED.

13. The method of claim 10 further comprising:
saving the control instructions for the corresponding lighting load of the zone; and
receiving an indication to apply the saved control instructions to another zone.

14. The method of claim 1, further comprising:
displaying, on the graphical user interface, a lighting intensity control bar for identifying the lighting intensity.

15. The method of claim 1, wherein controlling the lighting load comprises transmitting the generated control instructions to a lighting control device configured to control the lighting load.

16. A method comprising:
receiving, via a graphical user interface, correlated color temperature (CCT) values for controlling a lighting load to define a scene over a period of time, and wherein the lighting load comprises a plurality of light emitting diodes (LEDs); and
receiving a selection to control the lighting load in an auto vibrancy mode that is configured to automatically determine a vibrancy value at which to control the lighting load, wherein controlling the lighting load in the auto vibrancy mode comprises:
automatically identifying vibrancy values over the period of time for emitting light at the each of the received CCT values over the period of time, wherein each of the automatically identified vibrancy values are configured to emit light from the lighting load at or above a respective target color rendering index (CRI) value; and
generating control instructions for controlling the lighting load over the period of time according to the automatically identified vibrancy values, the CCT values, and lighting intensities.

17. The method of claim 16, wherein the automatically identified vibrancy values increase as the respectively received CCT values increase.

18. The method of claim 16, wherein the target CRI value is 95.

19. The method of claim 16, further comprising:
receiving a selection to control the lighting load in an adjustable vibrancy mode that is configured to receive an adjustable vibrancy value at which to control the lighting load, wherein controlling the lighting load in the adjustable vibrancy mode comprises:
displaying a vibrancy control line on the graphical user interface for controlling the lighting load over the period of time;
receiving, via the graphical user interface, a selection of the adjustable vibrancy value; and
generating control instructions for controlling the lighting load over the period of time according to the selection of the adjustable vibrancy value, the CCT values, and the lighting intensities.

20. The method of claim 19, wherein the selection of the adjustable vibrancy value is configured to decrease a contribution of at least one LED of the plurality of LEDs in the lighting load as the respectively received CCT values increase over the period of time.

21. The method of claim 20, wherein the at least one LED is a white or substantially white LED.

22. The method of claim 16, wherein the color settings and the lighting intensities emulate sunrise and sunset over the period of time.

23. The method of claim 16, wherein the period of time corresponds to a local period of time from sunrise to sunset.

24. The method of claim 16, further comprising:
receiving an indication to save the generated control instructions for the scene to control a lighting load of a zone; and
receiving an indication to apply the saved control instructions for the scene to another zone.

25. The method of claim 16, further comprising displaying a graph on a graphical user interface on a network device, wherein the graph comprises a color temperature axis that indicates CCT values of a black-body curve at which a lighting control device is configured to control the lighting load, an intensity axis that indicates lighting intensity values at which the lighting control device is configured to control the lighting load, and a time axis that includes the period of time over which the lighting intensity and the color temperatures are controlled.

26. The method of claim 16, further comprising transmitting the generated control instructions to a lighting control device configured to control the lighting load.

27. A method comprising:
receiving a selection to control a lighting load in a warm dim mode that is configured to control a correlated color temperature (CCT) value of the lighting load, wherein the lighting load comprises a plurality of light emitting diodes (LEDs); and
receiving a selection to control the lighting load in an auto vibrancy mode that is configured to automatically determine a vibrancy value at which to control the lighting load based on the CCT value of the lighting load, wherein controlling the lighting load in the auto vibrancy mode comprises:
receiving an indication to change an intensity value for controlling the lighting load,
automatically identifying the CCT value that corresponds to the intensity value, and
automatically identifying a vibrancy value based on the CCT value for emitting light from the lighting load at or above a target color rendering index (CRI) value; and
controlling the lighting load according to the intensity value, the CCT value, and the vibrancy value.

28. The method of claim 27, further comprising:
receiving an indication to increase the intensity value for the lighting load;
automatically identifying an updated CCT value based on the increased intensity value for the lighting load; and
automatically identifying an updated vibrancy value based on the updated CCT value for the lighting load, wherein the updated vibrancy value is higher than the vibrancy value.

29. The method of claim 27, further comprising:
receiving an indication to decrease the intensity value for the lighting load;
automatically identifying an updated CCT value based on the decreased intensity value for the lighting load; and
automatically identifying an updated vibrancy value based on the updated CCT value for the lighting load, wherein the updated vibrancy value is lower than the vibrancy value.

30. The method of claim 27, wherein the target CRI value is 90.

* * * * *